(12) United States Patent
Archetti et al.

(10) Patent No.: US 10,131,841 B2
(45) Date of Patent: Nov. 20, 2018

(54) LIQUID-CRYSTALLINE MEDIUM

(71) Applicant: Merck Patent GmbH, Darmstadt (DE)

(72) Inventors: Graziano Archetti, Darmstadt (DE); Izumi Saito, Darmstadt (DE); Rocco Fortte, Frankfurt am Main (DE); Timo Uebel, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/570,268

(22) Filed: Dec. 15, 2014

(65) Prior Publication Data

US 2015/0166890 A1    Jun. 18, 2015

(30) Foreign Application Priority Data

Dec. 16, 2013  (EP) .................... 13005833

(51) Int. Cl.
| | | |
|---|---|---|
| *C09K 19/30* | (2006.01) | |
| *C09K 19/04* | (2006.01) | |
| *C09K 19/10* | (2006.01) | |
| *C09K 19/14* | (2006.01) | |
| *C09K 19/18* | (2006.01) | |
| *C09K 19/20* | (2006.01) | |
| *C09K 19/12* | (2006.01) | |

(52) U.S. Cl.
CPC ...... *C09K 19/3098* (2013.01); *C09K 19/0403* (2013.01); *C09K 19/10* (2013.01); *C09K 19/12* (2013.01); *C09K 19/14* (2013.01); *C09K 19/18* (2013.01); *C09K 19/20* (2013.01); *C09K 19/3001* (2013.01); *C09K 19/3003* (2013.01); *C09K 19/3048* (2013.01); *C09K 19/3059* (2013.01); *C09K 19/3066* (2013.01); *C09K 19/3068* (2013.01); *C09K 2019/0437* (2013.01); *C09K 2019/0448* (2013.01); *C09K 2019/0466* (2013.01); *C09K 2019/123* (2013.01); *C09K 2019/183* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3051* (2013.01); *C09K 2019/3063* (2013.01); *C09K 2019/3075* (2013.01)

(58) Field of Classification Search
None
See application file for complete search history.

(56) References Cited

U.S. PATENT DOCUMENTS

| | | | |
|---|---|---|---|
| 7,001,647 B2 | 2/2006 | Shinano et al. | |
| 7,790,929 B2 | 9/2010 | Reiffenrath et al. | |
| 9,726,933 B2 | 8/2017 | Archetti et al. | |
| 2005/0161637 A1 | 7/2005 | Shinano et al. | |
| 2006/0011888 A1* | 1/2006 | Reiffenrath | C07C 39/06 252/299.63 |
| 2014/0138581 A1 | 5/2014 | Archetti et al. | |
| 2015/0275086 A1 | 10/2015 | Kuriyama et al. | |
| 2015/0301368 A1 | 10/2015 | Archetti et al. | |

FOREIGN PATENT DOCUMENTS

| | | | |
|---|---|---|---|
| WO | 2004033406 A1 | 4/2004 | |
| WO | 2013004372 A1 | 1/2013 | |
| WO | WO 2013004372 A1 * | 1/2013 | ............. C09K 19/56 |
| WO | 2014094959 A1 | 6/2014 | |
| WO | 2014065230 A1 | 9/2016 | |

OTHER PUBLICATIONS

Liu et al. "Long Range Chirality Transfer in Free Radical Polymerization of Journal of Polymerization of Vinylterphenyl Monomers Bearing Chiral Alkoxy Groups" , Journal of Polymer Science, Part A: Polymer Chemistry 2013, 51, 3674-3687.*
Liu et al. "Tuning Mesomorphic Properties and Handedness of Chiral Calamitic Liquid Crystals by Minimal Modification of the Effective Core", Chirality 23:E74-E83 (2011).*
European Search Report from European Patent Application No. EP14004231 dated Apr. 30, 2015.
Office Action for related European Patent Application No. 14004231 dated Feb. 27, 2017.
Notification of the First Office Action Corresponding to Chinese Patent Application No. 201410858531.4—dated May 2, 2018.

* cited by examiner

*Primary Examiner* — Chanceity N Robinson
(74) *Attorney, Agent, or Firm* — Millen White Zelano and Branigan, PC; John Sopp

(57) ABSTRACT

The invention relates to the compounds of the formula I and to a liquid-crystalline medium based on a mixture of polar compounds which contains at least one compound of the formula I

I $$R^1-\!\!\!\fbox{A^1}\!\!\!-Z^1-\!\!\!\underset{L^7\;L^6\;L^3\;L^2}{\overset{L^8\;L^5\;L^4\;L^1}{\fbox{\phantom{XXXXX}}}}\!\!-(CH_2)_m OH$$

in which $R^1$, ring $A^1$, $L^1$, $L^2$, $L^3$, $L^4$, $L^5$, $L^6$, $L^7$, $L^8$, $Z^1$ and m have the meanings indicated in claim 1 and to the use of the LC mixtures in electro-optical displays, especially for the self-aligning VA mode.

25 Claims, No Drawings

LIQUID-CRYSTALLINE MEDIUM

The invention relates to a liquid-crystalline medium which comprises at least one self-aligning additive especially for VA- and PS-VA applications.

The self-aligning additives are selected from the compounds of the formula I

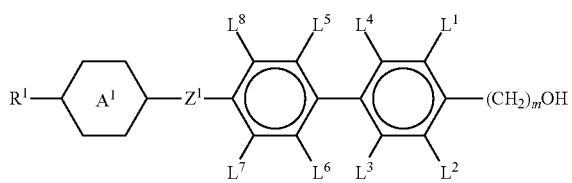

in which $R^1$ denotes an alkyl or alkoxy radical having 1 to 15 C atoms, where, in addition, one or more $CH_2$ groups in these radicals may each be replaced, independently of one another, by —CH=CH—, —C≡C—, —$CF_2$O—, —CH=CH—,

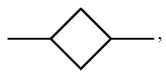, ,

—O—, —CO—O—, —O—CO— in such a way that O atoms are not linked directly to one another, and in which, in addition, one or more H atoms may be replaced by halogen,

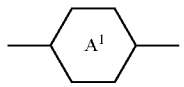

denotes

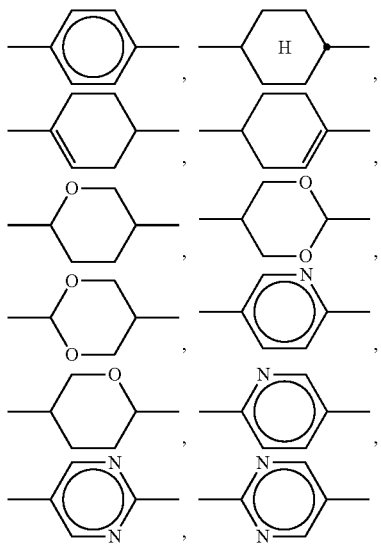

$Z^1$ denotes a single bond, —$CH_2CH_2$—, —CH=CH—, —$CF_2$O—, —$OCF_2$—, —$CH_2$O—, —OC$H_2$—, —COO—, —OCO—, —$C_2F_4$—, —CF=CF—, —$C_2F_4$—, —CHFCHF—, —$CH_2$CHF—, —CFHCF$_2$—, —$CF_2$CHF—, —CHFCH$_2$—, —$CH_2CF_2$O—, —CH=CHCH$_2$O—, $L^1$ to $L^8$ each, independently of one another, denote H or alkyl with 1-8 carbon atoms, but at least of $L^1$ to $L^8$ denotes alkyl with 1-8, preferably 1-5, carbon atoms.

m denotes 0, 1, 2, 3, 4, 5 or 6.

Media of this type can be used, in particular, for electro-optical displays having active-matrix addressing based on the ECB effect.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of Δε≤–0.5 in order to be suitable for use in high-information display elements based on the ECB effect. Electro-optical display elements based on the ECB effect have a homeotropic edge alignment (VA technology= vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive matrix (PM displays).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The reliability of liquid crystal (LC) mixtures is one of the major issues in today's LCD industry. A main aspect is the stability of the liquid crystal molecules towards the light emitted from the backlight unit of the LCD. Light induced reactions of the LC material can cause display defects known as image sticking. This strongly reduces the lifetime of the LCD and is one of the main reliability criterions in LCD industry.

For example, liquid crystal mixtures containing LC materials with alkenyl-moieties often show some kind of degradation during long term backlight irradiation. This degradation can be observed by measuring the Voltage Holding Ratio (VHR) of the LC mixtures which have been objected to backlight irradiation for a defined time period.

Also other kind of irradiation, like the UV-light, necessary for the curing of reactive mesogens (RMs), especially for the PS-VA technology, may lead to a reduction of the VHR values of a test-cell or of a display. The use of cut-filters in order to reduce this effect is of limited applicability. By increasing the wavelength of the curing-light the VHR is improved, but at the same time the reaction speed of the RMs is reduced and this effect does not fit with the requirements of the LCD industry.

Thus, a solution is needed by which the light induced degradation of a LC mixture is strongly reduced. Especially, in terms of LCD performance, there is an interest to use liquid-crystalline compounds containing an alkenyl side chain in order to achieve faster switching times and hence better moving picture performances. Especially since the trend for LCD TC clearly is to go to higher frame rates, e.g. 200 Hz or higher, also including 3D applications.

The invention thus has an object of providing self-aligning additives and liquid-crystal mixtures, in particular for monitor and TV applications, which are based on the ECB effect especially for VA, PSA and PS-VA applications, which do not have the above-mentioned disadvantages or only do so to a reduced extent. In particular, it must be ensured for monitors and televisions that they also operate at extremely high and extremely low temperatures and have short response times and at the same time have improved reliability behaviour, in particular have no or significantly reduced image sticking after long operating times.

In conventional VA-displays a polyimide (PI) layer is needed for inducing the required homeotropic orientation of the LC. Besides of the significant costs due to its production, unfavourable interaction between PI and LC often leads to a reduction of the electric resistance of the VA-display. The number of useful LC molecules is thus significantly reduced, at the expenses of the overall switching performances (e.g. higher switching times) of the display. Getting rid of PI is thus desirable, while providing for the required homeotropic orientation.

It has now been found that these and other objects can be achieved if LC media according to the invention are used in LC displays, especially in displays without any orientation layer (polyimide layer).

The invention thus relates to the compounds of the formula I and to a liquid crystalline medium, preferably having a negative dielectrically anisotropy ($\Delta\epsilon$), with improved degradation which contains at least one compound of the formula I.

Such kind of mixtures are highly suitable for the use in displays which do not contain any orientation layer. Liquid crystal display devices, in general have a structure in which a liquid crystal mixture is sealed between a pair of insulating substrates, such as glass substrates, in such a manner that the liquid crystal molecules thereof are orientated in a predetermined direction, and an orientation film is formed on the respective substrates on the side of the liquid crystal mixture. As a material of an orientation film, there is usually used a polyimide (PI). Homeotropic orientation of the LC molecules is especially necessary for LC modes like PVA, PS-VA, VA, etc., and can be achieved by the use of self-aligning additives, without the need of an orientation film. The mixtures according to the invention show an improved light and temperature stability compared to LC mixtures without any self-aligning additives.

In a preferred embodiment, the LC mixture according to the invention contains at least one self-aligning additive and at least one polymerisable compound (also called reactive mesogen (RM)). Such kind of LC mixtures are highly suitable for PI-free PS-VA displays. The alignment of the LC molecules is induced by the self-aligning additives and the induced orientation (pre-tilt) may be additionally tuned or stabilized by the polymerization of the RMs, under conditions suitable for a multidomain switching. By the tuning of the UV-curing conditions it is possible in one single step to improve simultaneously SWT and contrast ratio. Reliability of the mixture (VHR) after light stress (both UV-curing and Backlight (BLT)) is improved compared to LC mixtures without any self-aligning additive filled in a "classic" PI-coated test cell. Furthermore, the UV-curing may be performed by using cut-filters at a wavelength by which the polymerization of the RMs is still reasonably fast and the VHR values are on an acceptable level.

The mixtures according to the invention preferably exhibit very broad nematic phase ranges having clearing points ≥70° C., preferably ≥75° C., in particular ≥80° C., very favourable values for the capacitive threshold, relatively high values for the holding ratio and at the same time very good low-temperature stabilities at −20° C. and −30° C., as well as very low rotational viscosities and short response times. The mixtures according to the invention are furthermore distinguished by the fact that, in addition to the improvement in the rotational viscosity $\gamma_1$, relatively high values of the elastic constant $K_{33}$ for improving the response times can be observed.

Some preferred embodiments of the mixtures according to the invention are indicated below.

In the compounds of the formulae I $R^1$ preferably denotes straight-chain or branched alkyl, in particular $CH_3$, $C_2H_5$, n-$C_3H_7$, n-$C_4H_9$, n-$C_5H_{11}$, n-$C_6H_{13}$ or $CH_2C(C_2H_5)C_4H_9$, furthermore alkenyloxy, in particular $OCH_2CH=CH_2$, $OCH_2CH=CHCH_3$, $OCH_2CH=CHC_2H_5$, alkoxy, in particular $OC_2H_5$, $OC_3H_7$, $OC_4H_9$, $OC_5H_{11}$ and $OC_6H_{13}$.

In the compounds of the formulae I $Z^1$ preferably denotes a single bond, —$C_2H_4$— or —$CH_2O$—. In a specifically preferred embodiment $Z^1$ denotes a single bond.

In the compounds of the formula I $L^{1-8}$ denotes each independently H or alkyl with 1-8 carbon atoms. In a preferred embodiment only one or two of $L^{1-8}$ denote alkyl and the remaining substituents of $L^{1-8}$ denote H. In a further preferred embodiment $L^1$, $L^2$ and $L^3$ denote each independently denote most preferably H.

m is preferably 2 or 3.

The ring A preferably denotes preferably a 1,4-cyclohexylene ring or a 1,4-phenylene ring.

Preferred compounds of the formula I are the compounds of the sub-formulae I-1 to I-9,

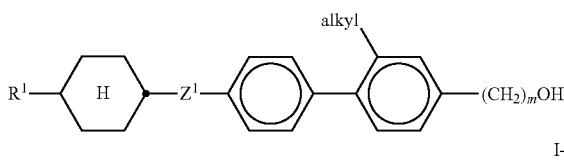

I-1

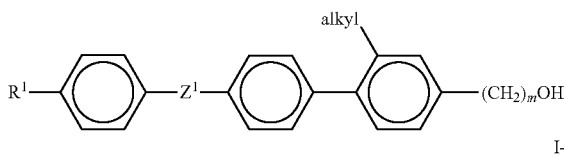

I-2

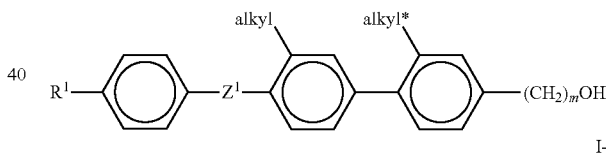

I-3

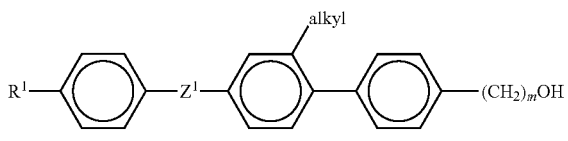

I-4

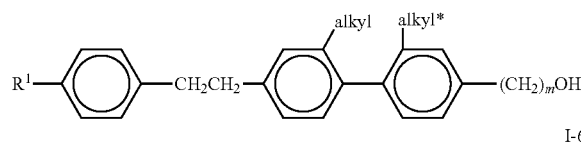

I-5

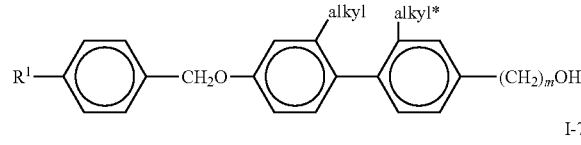

I-6

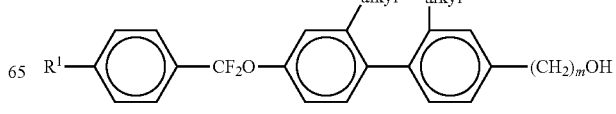

I-7

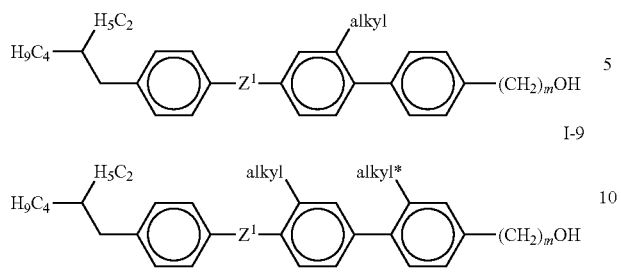

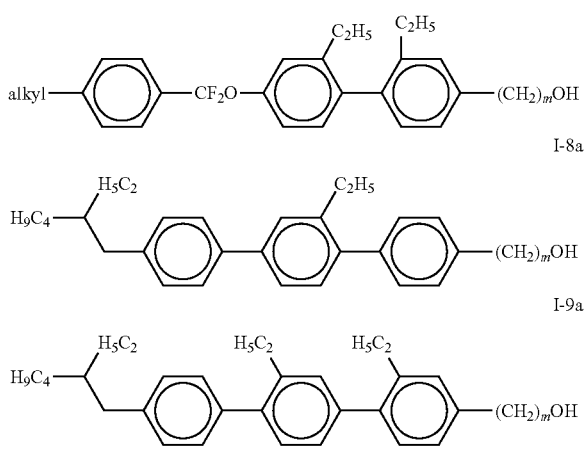

in which $R^1$, $Z^1$ and m has the meanings as given above and alkyl and alkyl* each independently denote straight chain or branched alkyl having 1 to 8 carbon atoms. In a preferred embodiment alkyl and alkyl* each independently denote a straight-chain alkyl with 1 to 5 carbon atoms, most preferably $C_2H_5$ or n-$C_3H_7$.

In the formula I and in the sub-formulae of the formula I $R^1$ preferably denotes a straight-chain alkyl or branched alkyl radical having 1-8 C atoms.

The mixture according to the invention very particularly contains at least one self-aligning additive selected from the following group of compounds of the sub-formulae I-1a to I-9a:

in which
alkyl denotes a straight-chain alkyl radical having 1 to 8 carbon atoms, preferably $C_2H_5$, n-$C_3H_7$, n-$C_4H_9$, n-$C_5H_{11}$, n-$C_6H_{13}$ or n-$C_7H_{15}$, most preferably n-$C_5H_{11}$.

Especially preferred mixtures contain a compound of the following subformulae: I-1a-1 to I-9a-5:

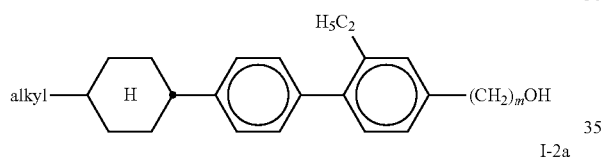

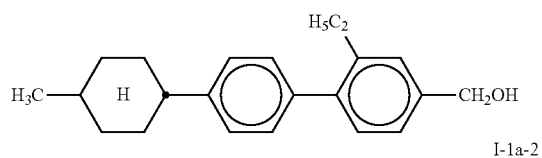

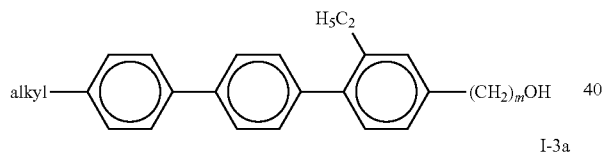

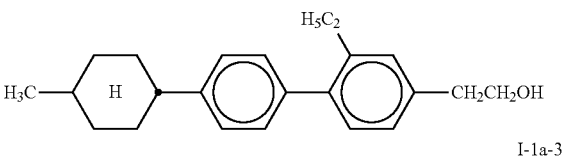

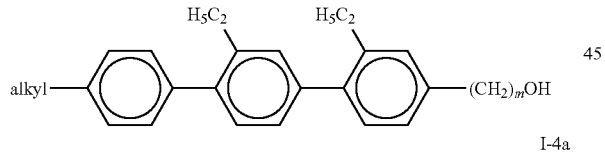

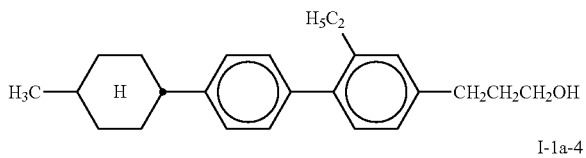

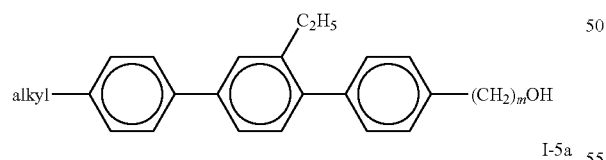

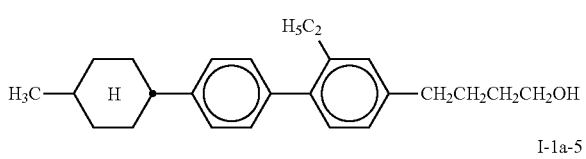

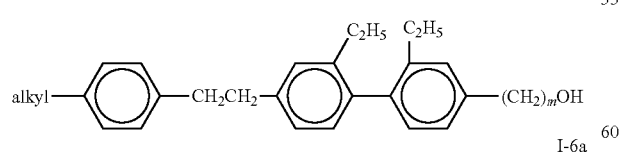

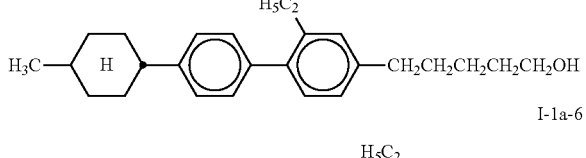

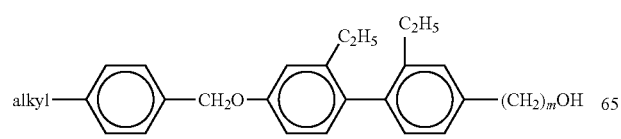

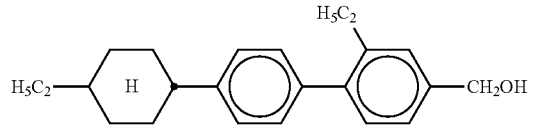

-continued

I-1a-7: H₅C₂–[H]–⌬–⌬(H₅C₂)–CH₂CH₂OH

I-1a-8: H₅C₂–[H]–⌬–⌬(H₅C₂)–CH₂CH₂CH₂OH

I-1a-9: H₅C₂–[H]–⌬–⌬(H₅C₂)–CH₂CH₂CH₂CH₂OH

I-1a-10: H₅C₂–[H]–⌬–⌬(H₅C₂)–CH₂CH₂CH₂CH₂CH₂OH

I-1a-11: H₇C₃–[H]–⌬–⌬(H₅C₂)–CH₂OH

I-1a-12: H₇C₃–[H]–⌬–⌬(H₅C₂)–CH₂CH₂OH

I-1a-13: H₇C₃–[H]–⌬–⌬(H₅C₂)–CH₂CH₂CH₂OH

I-1a-14: H₇C₃–[H]–⌬–⌬(H₅C₂)–CH₂CH₂CH₂CH₂OH

I-1a-15: H₇C₃–[H]–⌬–⌬(H₅C₂)–CH₂CH₂CH₂CH₂CH₂OH

I-1a-16: H₉C₄–[H]–⌬–⌬(H₅C₂)–CH₂OH

I-1a-17: H₉C₄–[H]–⌬–⌬(H₅C₂)–CH₂CH₂OH

I-1a-18: H₉C₄–[H]–⌬–⌬(H₅C₂)–CH₂CH₂CH₂OH

I-1a-19: H₉C₄–[H]–⌬–⌬(H₅C₂)–CH₂CH₂CH₂CH₂OH

I-1a-20: H₉C₄–[H]–⌬–⌬(H₅C₂)–CH₂CH₂CH₂CH₂CH₂OH

I-1a-21: H₁₁C₅–[H]–⌬–⌬(H₅C₂)–CH₂OH

I-1a-22: H₁₁C₅–[H]–⌬–⌬(H₅C₂)–CH₂CH₂OH

I-1a-23: H₁₁C₅–[H]–⌬–⌬(H₅C₂)–CH₂CH₂CH₂OH

I-1a-24: H₁₁C₅–[H]–⌬–⌬(H₅C₂)–CH₂CH₂CH₂CH₂OH

I-1a-25: H₁₁C₅–[H]–⌬–⌬(H₅C₂)–CH₂CH₂CH₂CH₂CH₂OH

I-1a-26: H₁₃C₆–[H]–⌬–⌬(H₅C₂)–CH₂OH

-continued

I-1a-27

I-1a-28

I-1a-29

I-1a-30

I-2a-1

I-2a-2

I-2a-3

I-2a-4

I-2a-5

I-2a-6

-continued

I-2a-7

I-2a-8

I-2a-9

I-2a-10

I-2a-11

I-2a-12

I-2a-13

I-2a-14

I-2a-15

I-2a-16

Compounds (structures shown)

- I-2a-17: H$_9$C$_4$–[C$_6$H$_4$]–[C$_6$H$_4$]–[C$_6$H$_3$(2-C$_2$H$_5$)]–CH$_2$CH$_2$OH
- I-2a-18: H$_9$C$_4$–[C$_6$H$_4$]–[C$_6$H$_4$]–[C$_6$H$_3$(2-C$_2$H$_5$)]–CH$_2$CH$_2$CH$_2$OH
- I-2a-19: H$_9$C$_4$–[C$_6$H$_4$]–[C$_6$H$_4$]–[C$_6$H$_3$(2-C$_2$H$_5$)]–CH$_2$CH$_2$CH$_2$CH$_2$OH
- I-2a-20: H$_9$C$_4$–[C$_6$H$_4$]–[C$_6$H$_4$]–[C$_6$H$_3$(2-C$_2$H$_5$)]–CH$_2$CH$_2$CH$_2$CH$_2$CH$_2$OH
- I-2a-21: H$_{11}$C$_5$–[C$_6$H$_4$]–[C$_6$H$_4$]–[C$_6$H$_3$(2-C$_2$H$_5$)]–CH$_2$OH
- I-2a-22: H$_{11}$C$_5$–[C$_6$H$_4$]–[C$_6$H$_4$]–[C$_6$H$_3$(2-C$_2$H$_5$)]–CH$_2$CH$_2$OH
- I-2a-23: H$_{11}$C$_5$–[C$_6$H$_4$]–[C$_6$H$_4$]–[C$_6$H$_3$(2-C$_2$H$_5$)]–CH$_2$CH$_2$CH$_2$OH
- I-2a-24: H$_{11}$C$_5$–[C$_6$H$_4$]–[C$_6$H$_4$]–[C$_6$H$_3$(2-C$_2$H$_5$)]–CH$_2$CH$_2$CH$_2$CH$_2$OH
- I-2a-25: H$_{11}$C$_5$–[C$_6$H$_4$]–[C$_6$H$_4$]–[C$_6$H$_3$(2-C$_2$H$_5$)]–CH$_2$CH$_2$CH$_2$CH$_2$CH$_2$OH
- I-2a-26: H$_{13}$C$_6$–[C$_6$H$_4$]–[C$_6$H$_4$]–[C$_6$H$_3$(2-C$_2$H$_5$)]–CH$_2$OH
- I-2a-27: H$_{13}$C$_6$–[C$_6$H$_4$]–[C$_6$H$_4$]–[C$_6$H$_3$(2-C$_2$H$_5$)]–CH$_2$CH$_2$OH
- I-2a-28: H$_{13}$C$_6$–[C$_6$H$_4$]–[C$_6$H$_4$]–[C$_6$H$_3$(2-C$_2$H$_5$)]–CH$_2$CH$_2$CH$_2$OH
- I-2a-29: H$_{13}$C$_6$–[C$_6$H$_4$]–[C$_6$H$_4$]–[C$_6$H$_3$(2-C$_2$H$_5$)]–CH$_2$CH$_2$CH$_2$CH$_2$OH
- I-2a-30: H$_{13}$C$_6$–[C$_6$H$_4$]–[C$_6$H$_4$]–[C$_6$H$_3$(2-C$_2$H$_5$)]–CH$_2$CH$_2$CH$_2$CH$_2$CH$_2$OH
- I-3a-1: H$_3$C–[C$_6$H$_4$]–[C$_6$H$_3$(2-C$_2$H$_5$)]–[C$_6$H$_3$(2-C$_2$H$_5$)]–CH$_2$OH
- I-3a-2: H$_3$C–[C$_6$H$_4$]–[C$_6$H$_3$(2-C$_2$H$_5$)]–[C$_6$H$_3$(2-C$_2$H$_5$)]–CH$_2$CH$_2$OH
- I-3a-3: H$_3$C–[C$_6$H$_4$]–[C$_6$H$_3$(2-C$_2$H$_5$)]–[C$_6$H$_3$(2-C$_2$H$_5$)]–CH$_2$CH$_2$CH$_2$OH
- I-3a-4: H$_3$C–[C$_6$H$_4$]–[C$_6$H$_3$(2-C$_2$H$_5$)]–[C$_6$H$_3$(2-C$_2$H$_5$)]–CH$_2$CH$_2$CH$_2$CH$_2$OH
- I-3a-5: H$_3$C–[C$_6$H$_4$]–[C$_6$H$_3$(2-C$_2$H$_5$)]–[C$_6$H$_3$(2-C$_2$H$_5$)]–CH$_2$CH$_2$CH$_2$CH$_2$CH$_2$OH
- I-3a-6: H$_5$C$_2$–[C$_6$H$_4$]–[C$_6$H$_3$(2-C$_2$H$_5$)]–[C$_6$H$_3$(2-C$_2$H$_5$)]–CH$_2$OH

I-3a-7
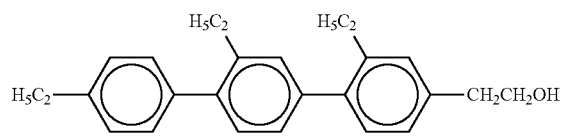
I-3a-8
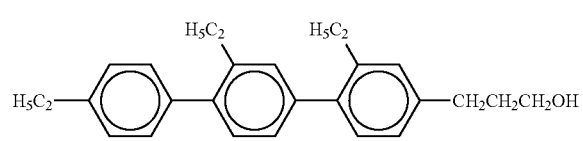
I-3a-9
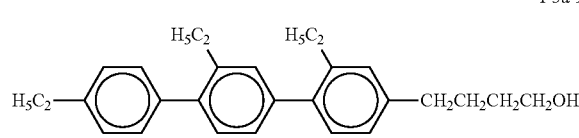
I-3a-10
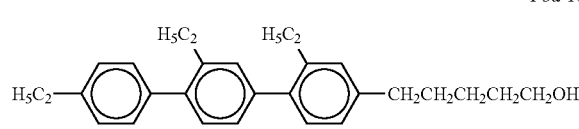
I-3a-11
I-3a-12
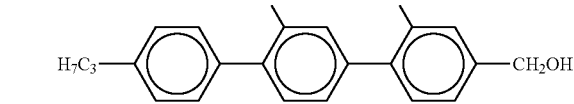
I-3a-13
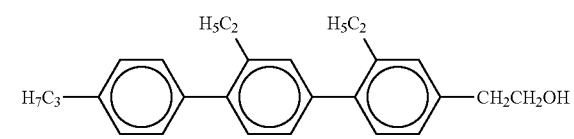
I-3a-14
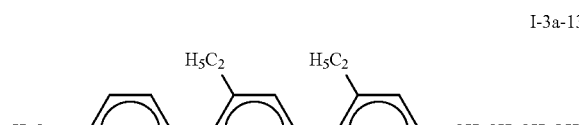
I-3a-15
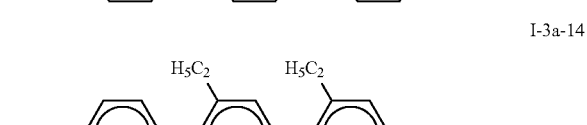
I-3a-16
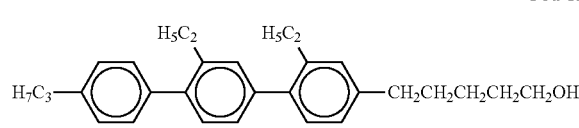
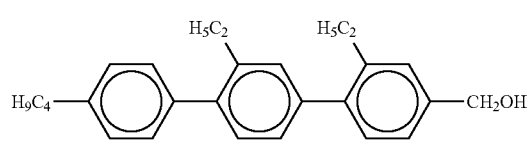
I-3a-17
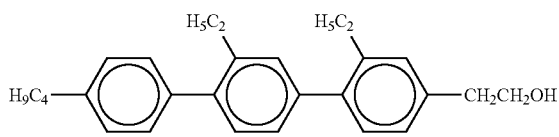
I-3a-18
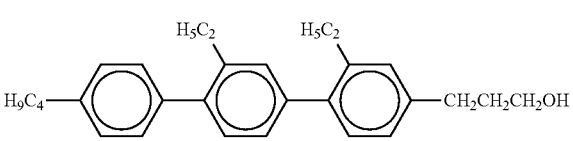
I-3a-19
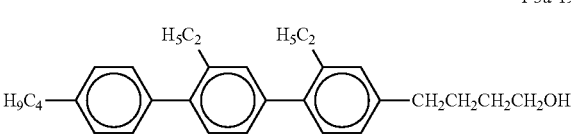
I-3a-20
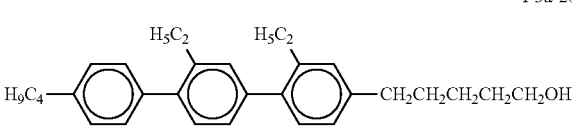
I-3a-21
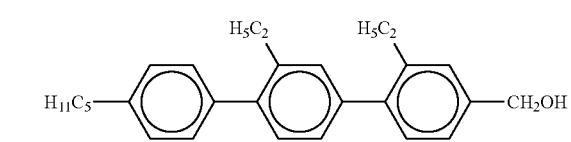
I-3a-22
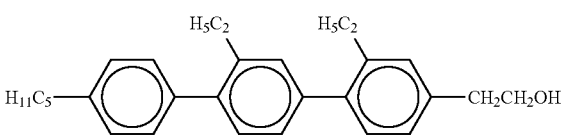
I-3a-23
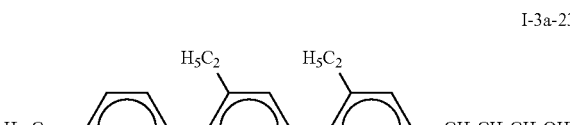
I-3a-24
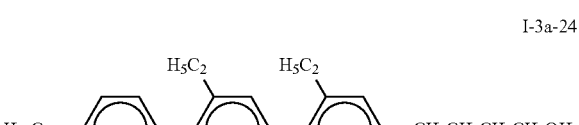
I-3a-25
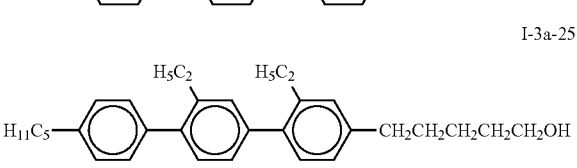
I-3a-26
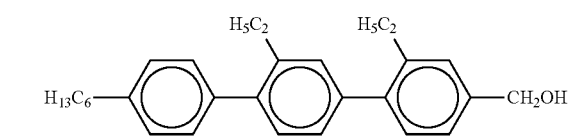

I-3a-27
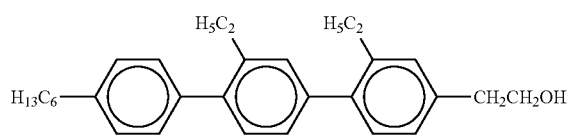
I-3a-28
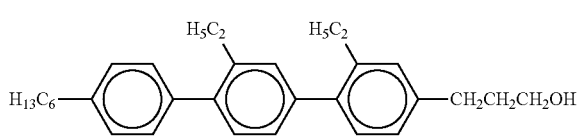
I-3a-29
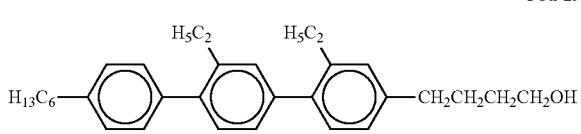
I-3a-30
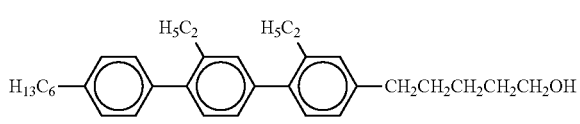
I-4a-1
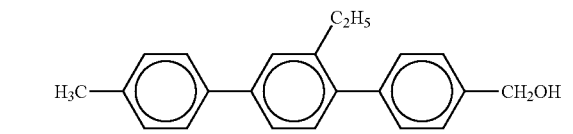
I-4a-2
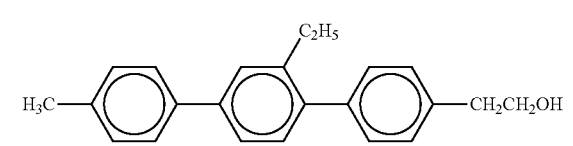
I-4a-3
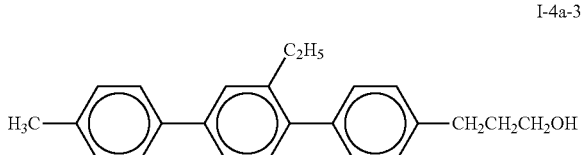
I-4a-4
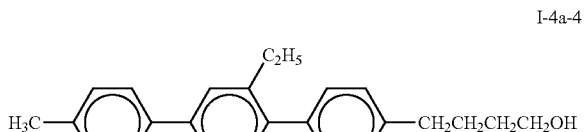
I-4a-5
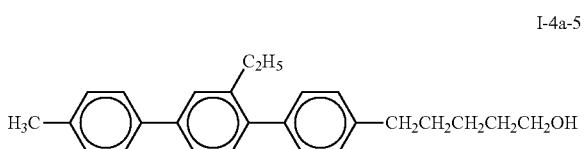
I-4a-6
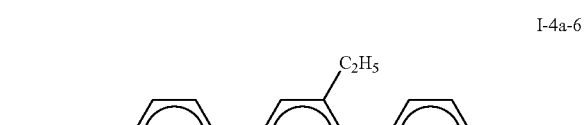
I-4a-7
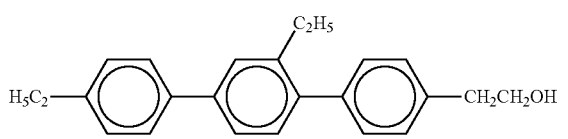
I-4a-8
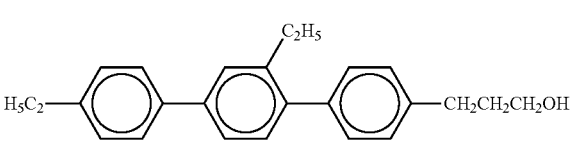
I-4a-9
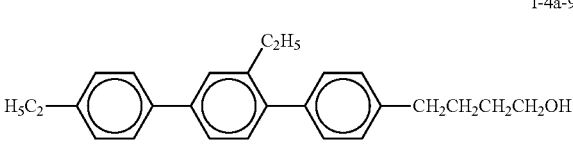
I-4a-10
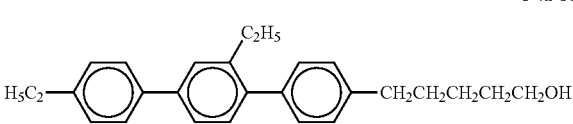
I-4a-11
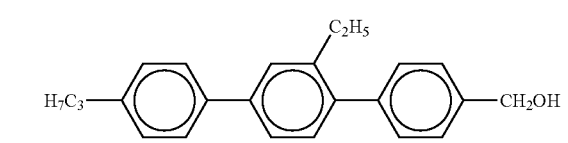
I-4a-12
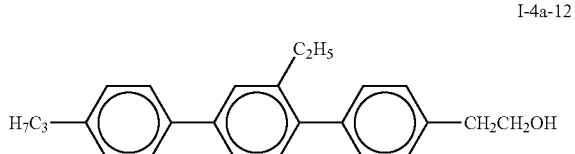
I-4a-13
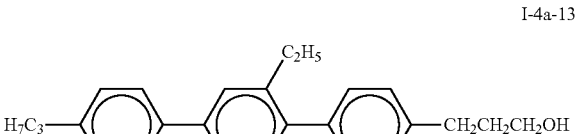
I-4a-14
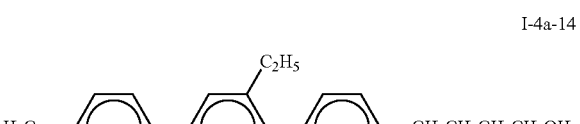
I-4a-15
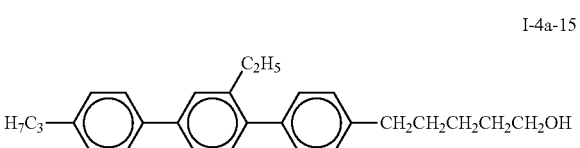
I-4a-16
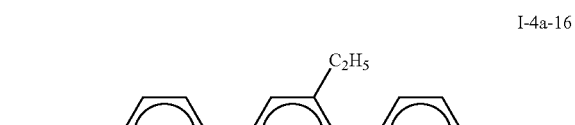

I-4a-17
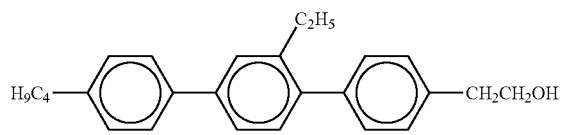
I-4a-18
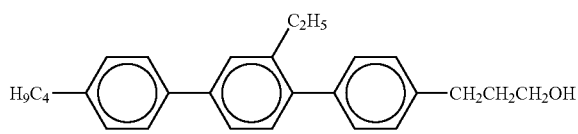
I-4a-19
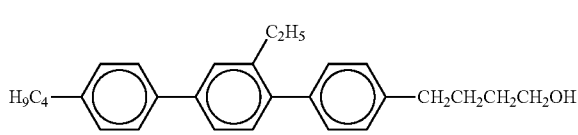
I-4a-20
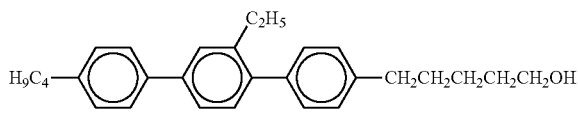
I-4a-21
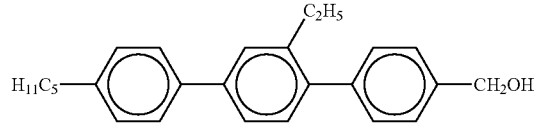
I-4a-22
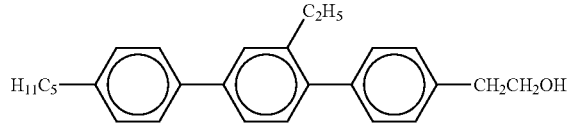
I-4a-23
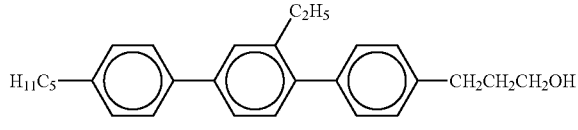
I-4a-24
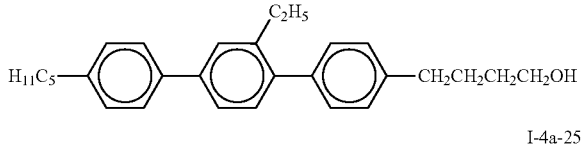
I-4a-25
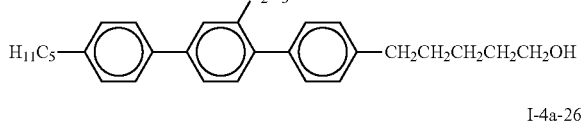
I-4a-26
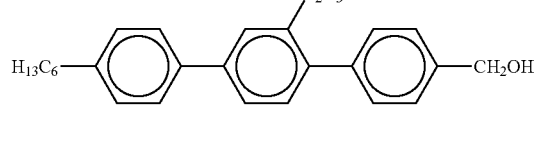
I-4a-27
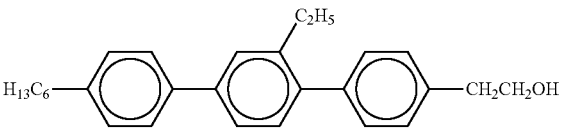
I-4a-28
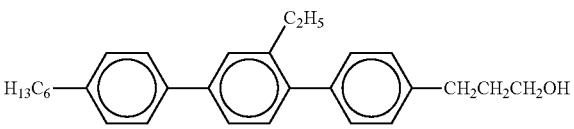
I-4a-29
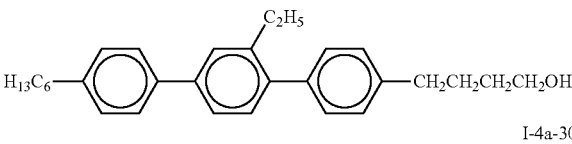
I-4a-30
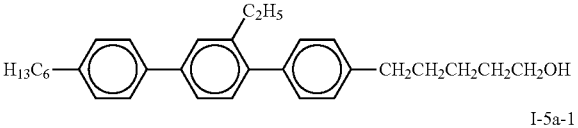
I-5a-1
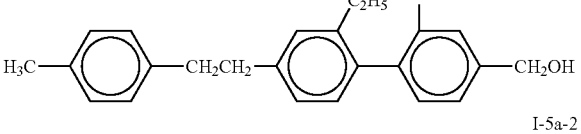
I-5a-2
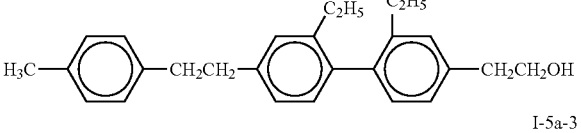
I-5a-3
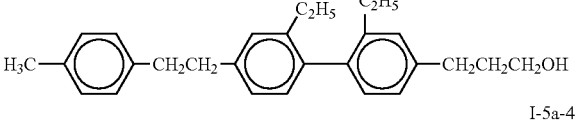
I-5a-4
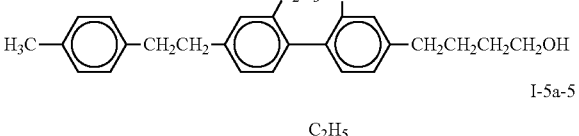
I-5a-5
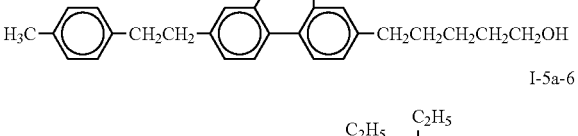
I-5a-6
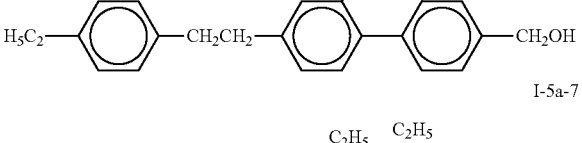
I-5a-7
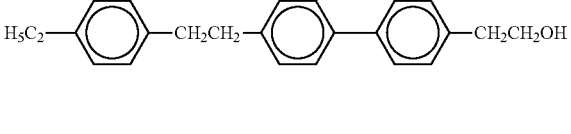

Chemical structure diagrams of compounds I-5a-8 through I-5a-29.

Page contains chemical structure diagrams only (compounds I-5a-30, I-6a-1 through I-6a-20).

I-6a-21
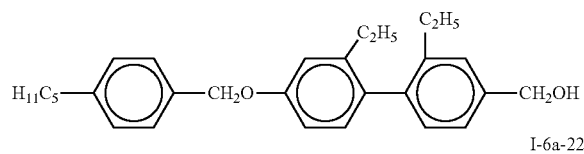
I-6a-22
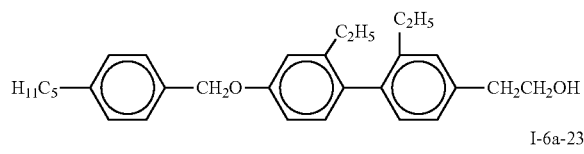
I-6a-23
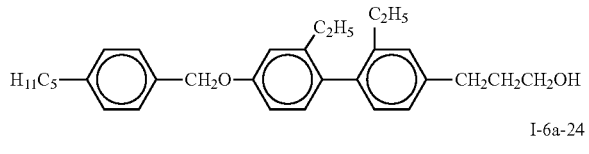
I-6a-24
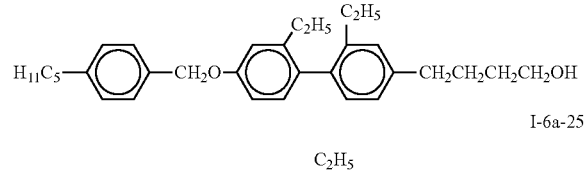
I-6a-25
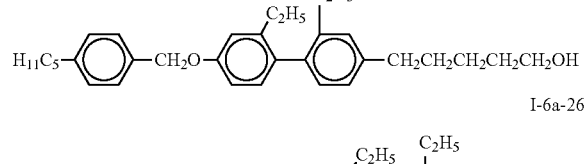
I-6a-26
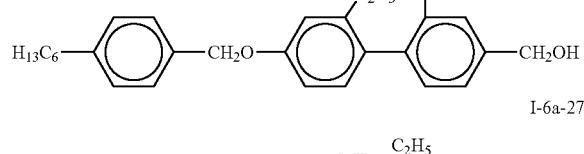
I-6a-27
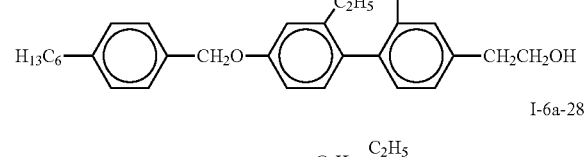
I-6a-28
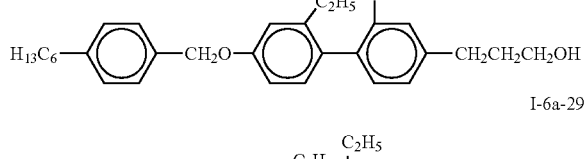
I-6a-29
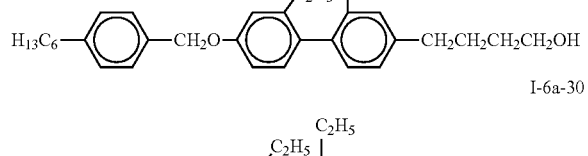
I-6a-30
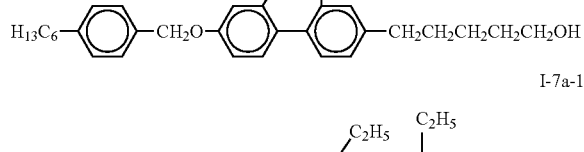
I-7a-1
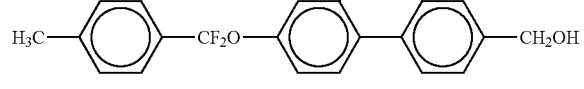
I-7a-2
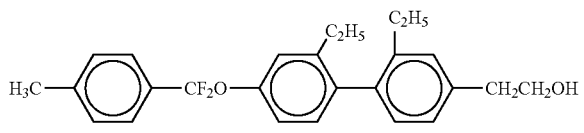
I-7a-3
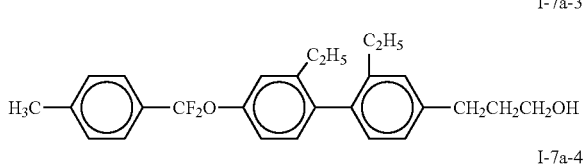
I-7a-4
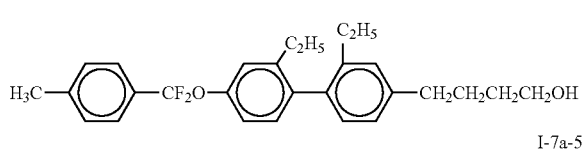
I-7a-5
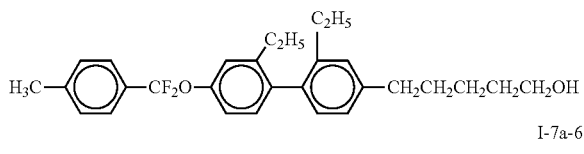
I-7a-6
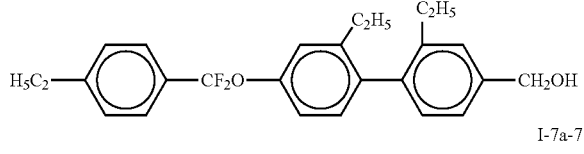
I-7a-7
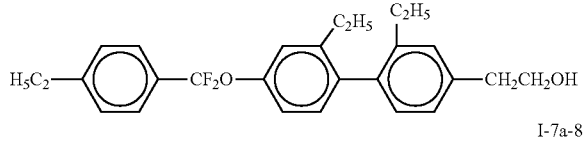
I-7a-8
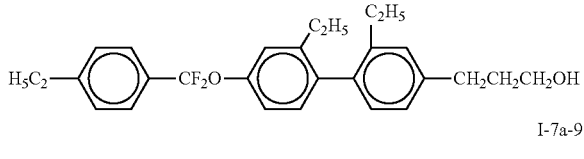
I-7a-9
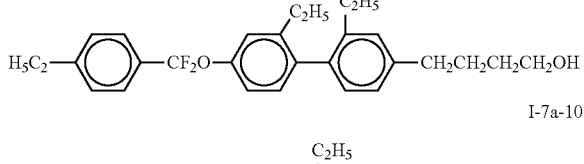
I-7a-10
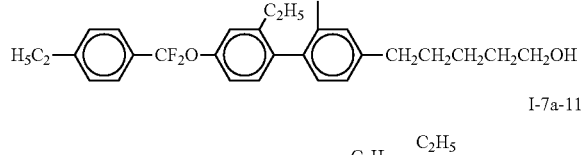
I-7a-11
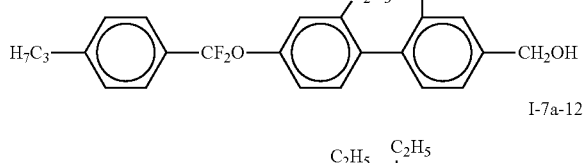
I-7a-12
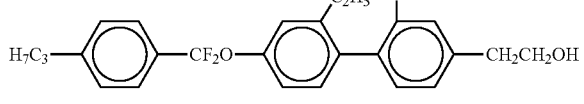

-continued

I-7a-13: H₇C₃–⌬–CF₂O–⌬(2-C₂H₅)–⌬(2-C₂H₅)–CH₂CH₂OH

I-7a-14: H₇C₃–⌬–CF₂O–⌬(2-C₂H₅)–⌬(2-C₂H₅)–CH₂CH₂CH₂OH

I-7a-15: H₇C₃–⌬–CF₂O–⌬(2-C₂H₅)–⌬(2-C₂H₅)–CH₂CH₂CH₂CH₂OH

I-7a-16: H₉C₄–⌬–CF₂O–⌬(2-C₂H₅)–⌬(2-C₂H₅)–CH₂OH

I-7a-17: H₉C₄–⌬–CF₂O–⌬(2-C₂H₅)–⌬(2-C₂H₅)–CH₂CH₂OH

I-7a-18: H₉C₄–⌬–CF₂O–⌬(2-C₂H₅)–⌬(2-C₂H₅)–CH₂CH₂CH₂OH

I-7a-19: H₉C₄–⌬–CF₂O–⌬(2-C₂H₅)–⌬(2-C₂H₅)–CH₂CH₂CH₂CH₂OH

I-7a-20: H₉C₄–⌬–CF₂O–⌬(2-C₂H₅)–⌬(2-C₂H₅)–CH₂CH₂CH₂CH₂CH₂OH

I-7a-21: H₁₁C₅–⌬–CF₂O–⌬(2-C₂H₅)–⌬(2-C₂H₅)–CH₂OH

I-7a-22: H₁₁C₅–⌬–CF₂O–⌬(2-C₂H₅)–⌬(2-C₂H₅)–CH₂CH₂OH

I-7a-23: H₁₁C₅–⌬–CF₂O–⌬(2-C₂H₅)–⌬(2-C₂H₅)–CH₂CH₂CH₂OH

I-7a-24: H₁₁C₅–⌬–CF₂O–⌬(2-C₂H₅)–⌬(2-C₂H₅)–CH₂CH₂CH₂OH

I-7a-25: H₁₁C₅–⌬–CF₂O–⌬(2-C₂H₅)–⌬(2-C₂H₅)–CH₂CH₂CH₂CH₂OH

I-7a-26: H₁₃C₆–⌬–CF₂O–⌬(2-C₂H₅)–⌬(2-C₂H₅)–CH₂OH

I-7a-27: H₁₃C₆–⌬–CF₂O–⌬(2-C₂H₅)–⌬(2-C₂H₅)–CH₂CH₂OH

I-7a-28: H₁₃C₆–⌬–CF₂O–⌬(2-C₂H₅)–⌬(2-C₂H₅)–CH₂CH₂CH₂OH

I-7a-29: H₁₃C₆–⌬–CF₂O–⌬(2-C₂H₅)–⌬(2-C₂H₅)–CH₂CH₂CH₂OH

I-7a-30: H₁₃C₆–⌬–CF₂O–⌬(2-C₂H₅)–⌬(2-C₂H₅)–CH₂CH₂CH₂CH₂OH

I-8a-1: H₉C₄–CH(C₂H₅)–CH₂–⌬–⌬(2-C₂H₅)–⌬–CH₂OH

I-8a-2: H₉C₄–CH(C₂H₅)–CH₂–⌬–⌬(2-C₂H₅)–⌬–CH₂CH₂OH

I-8a-3: H₉C₄–CH(C₂H₅)–CH₂–⌬–⌬(2-C₂H₅)–⌬–CH₂CH₂CH₂OH

I-8a-4: H₉C₄–CH(C₂H₅)–CH₂–⌬–⌬(2-C₂H₅)–⌬–CH₂CH₂CH₂CH₂OH

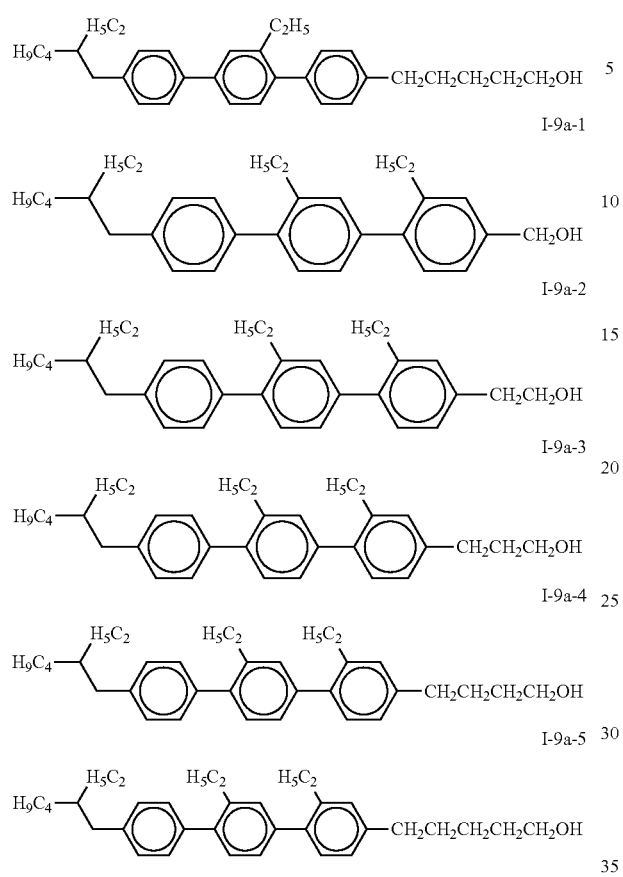

Preferred LC mixtures contain at least one self-alignment additive of the formula I and at least one self-alignment additive of the formula A.

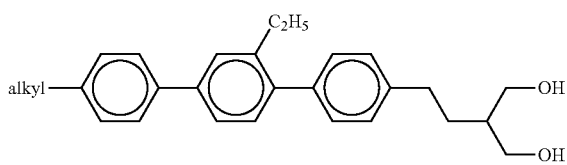

wherein R¹ has the meanings given for formula I in claim 1 and alkyl denotes straight-chained or branched alkyl with 1-8 C atoms.

Especially preferred is the compound of the formula A-1

$$A-1$$

wherein alkyl denotes straight-chained or branched alkyl with 1-8 C atoms.

The compound of the formula A is well-known from the patent application PCT/EP2013/003563. In a preferred range the compound of the formula A is used in concentrations of 0.01 to 5% based on the total LC mixture.

The compounds of the formula I can be prepared by methods known per se, which are described in standard works for organic chemistry as such, for example, Houben-Weyl, Methoden der organischen Chemie, Thieme-Verlag, Stuttgart.

The compounds of the formula I can be prepared for example as follows:

Scheme 1

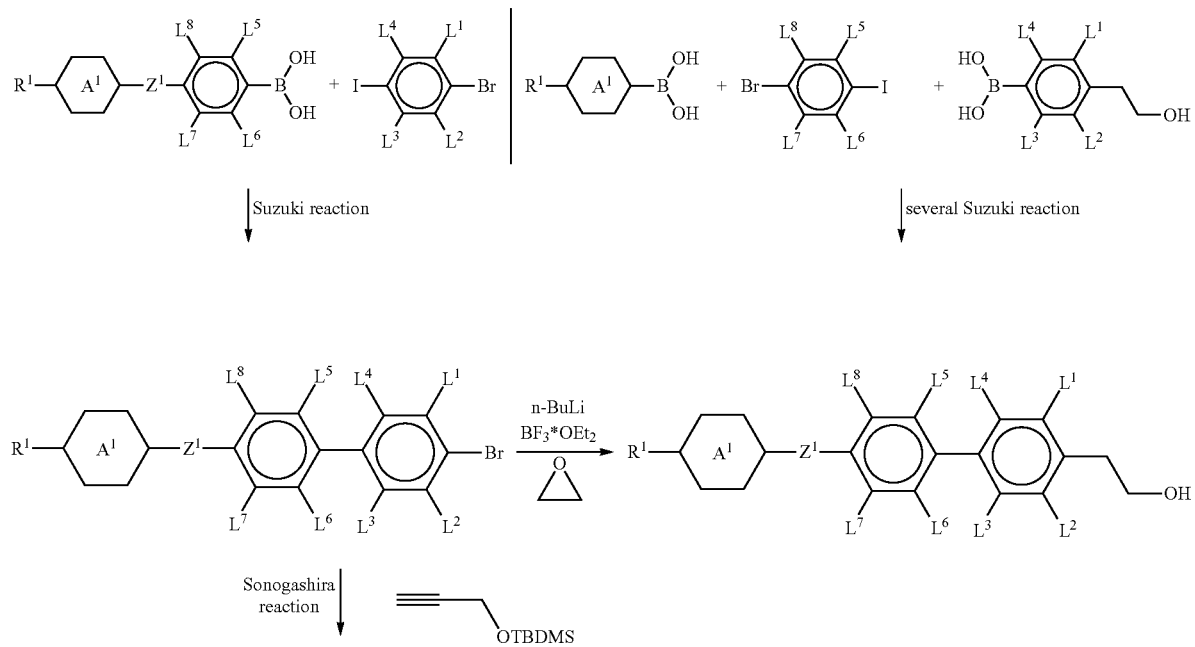

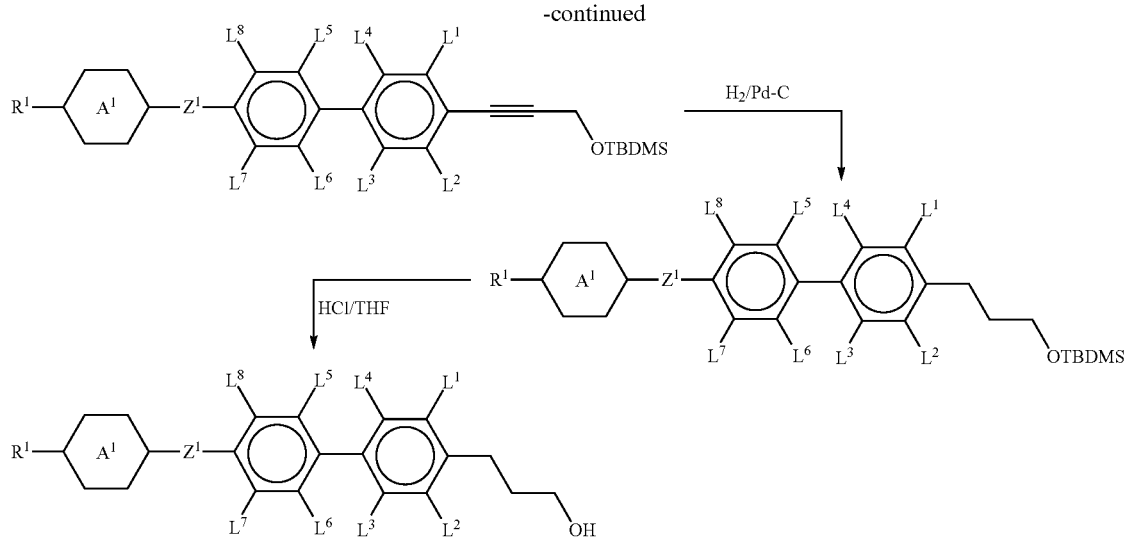

The media according to the invention preferably contain one, two, three, four or more, preferably one, self-aligning additive, preferably selected from the compounds of the formulae I-1 to I-9.

The self-aligning additives of the formula I are preferably employed in the liquid-crystalline medium in amounts of ≥0.01% by weight, preferably 0.1-10% by weight, based on the mixture as a whole. Particular preference is given to liquid-crystalline media which contain 0.1-5%, preferably 1.0-3%, by weight of one or more self-aligning additives, based on the total mixture, especially additives which are selected from the group of compounds of the formula I-1 to I-9.

The use of preferably 1.0 to 3% by weight of one or more compounds of the formula I results in a complete homeotropic alignment of the LC layer for conventional LC thickness (3 to 4 μm) and for the substrate materials used in the display industrie. Special surface treatment may allow to significantly reduce the amount of the compound(s) of the formula I which means less than 1.0% by weight.

Preferred embodiments of the liquid-crystalline medium according to the invention are indicated below:

a) Liquid-crystalline medium which additionally comprises one or more compounds selected from the group of the compounds of the formulae IIA, IIB and IIC:

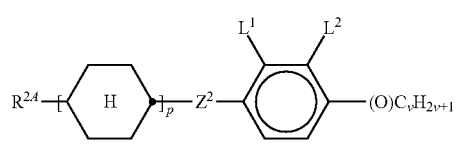

IIA

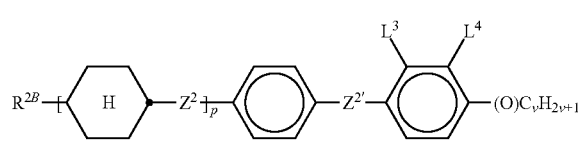

IIB

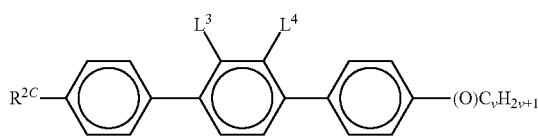

IIC in which
R$^{2A}$, R$^{2B}$ and R$^{2C}$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

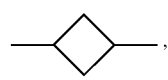

—C≡C—, —CF$_2$O—, —OCF$_2$—, —OC—O— or —O—CO— in such a way that O atoms are not linked directly to one another,
L$^{1-4}$ each, independently of one another, denote F, Cl, CF$_3$ or CHF$_2$,
Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
p denotes 0, 1 or 2,
q denotes 0 or 1, and
v denotes 1 to 6.

In the compounds of the formulae IIA and IIB, Z$^2$ may have identical or different meanings. In the compounds of the formula IIB, Z$^2$ and Z$^{2'}$ may have identical or different meanings.

In the compounds of the formulae IIA, IIB and IIC, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, L$^1$, L$^2$, L$^3$ and L$^4$ preferably denote L$^1$=L$^2$=F and L$^3$=L$^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— or —$CH_2O$— bridge.

If in the formula IIB $Z^2$=—$C_2H_4$— or —$CH_2O$—, $Z^{2'}$ is preferably a single bond or, if $Z^{2'}$=—$C_2H_4$— or —$CH_2O$—, $Z^2$ is preferably a single bond. In the compounds of the formulae IIA and IIB, (O)$C_vH_{2v+1}$ preferably denotes O$C_vH_{2v+1}$, furthermore $C_vH_{2v+1}$. In the compounds of the formula IIC, (O)$C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

IIA-1
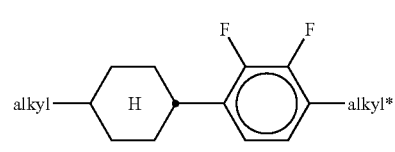

IIA-2
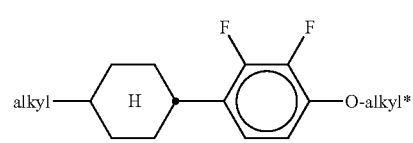

IIA-3
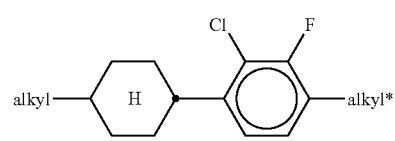

IIA-4
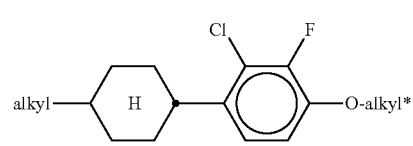

IIA-5
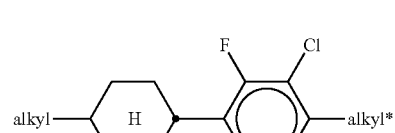

IIA-6
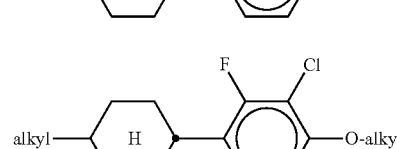

IIA-7
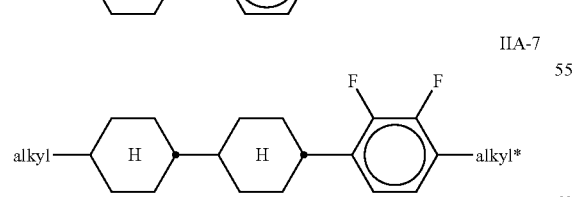

IIA-8
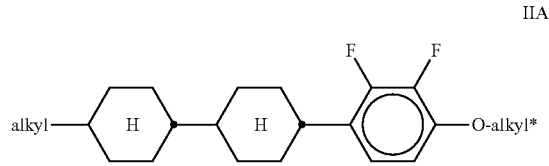

-continued

IIA-9
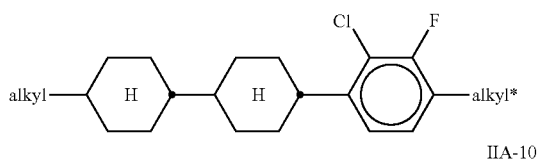

IIA-10
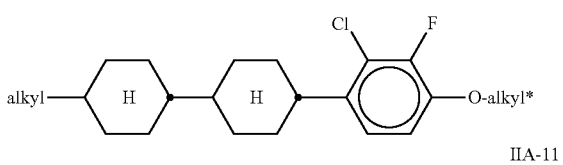

IIA-11
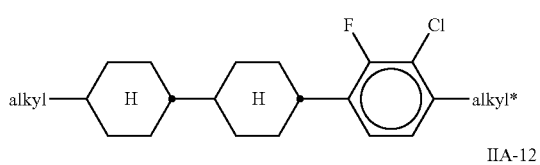

IIA-12
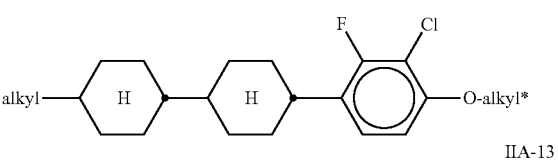

IIA-13
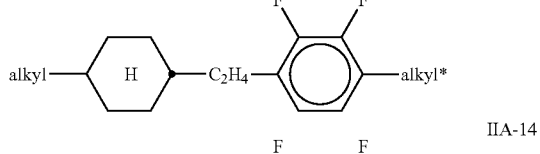

IIA-14
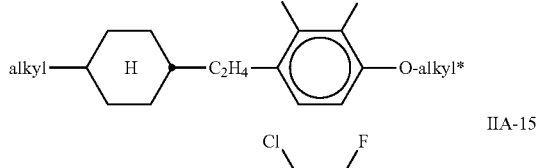

IIA-15
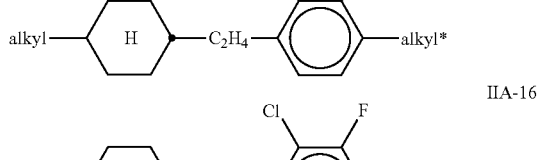

IIA-16
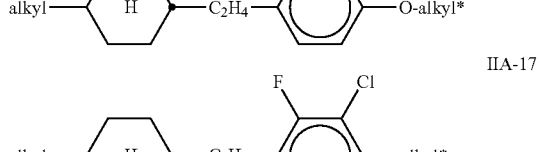

IIA-17
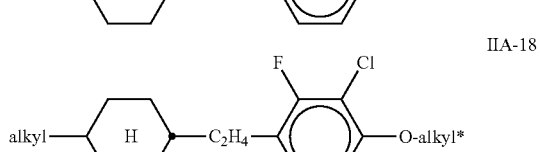

IIA-18
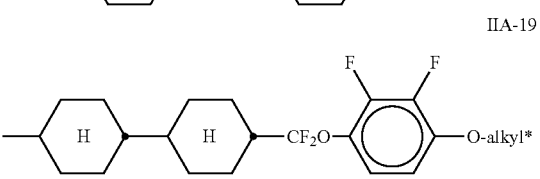

IIA-19

IIA-20
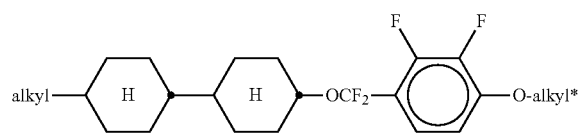
IIA-21
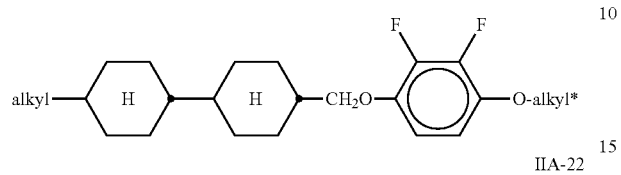
IIA-22
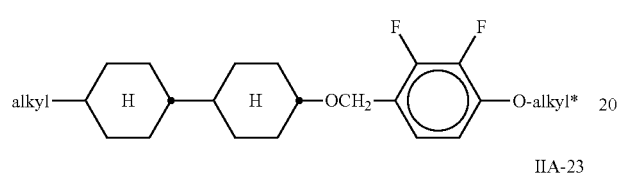
IIA-23
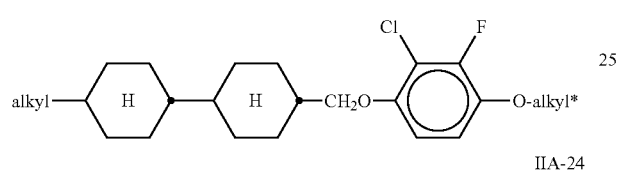
IIA-24
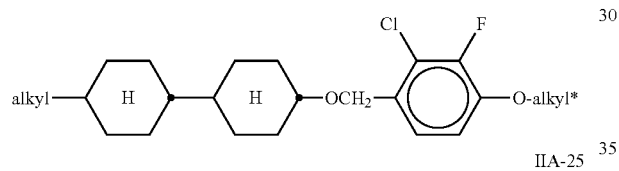
IIA-25
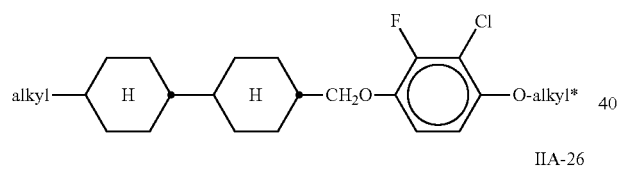
IIA-26
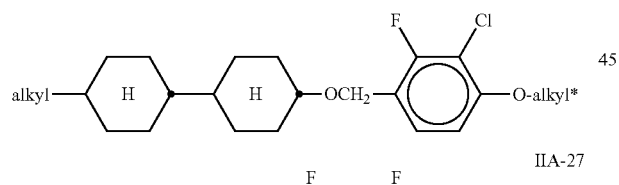
IIA-27
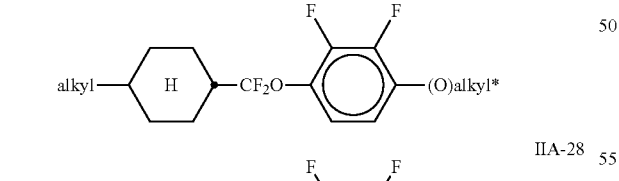
IIA-28
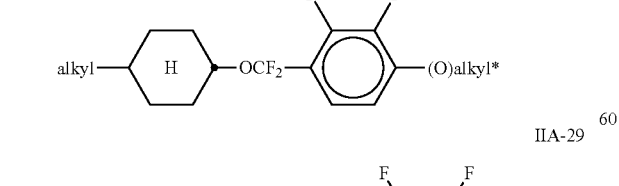
IIA-29
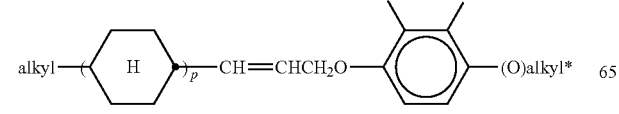
IIA-30
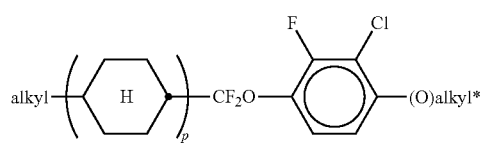
IIA-31
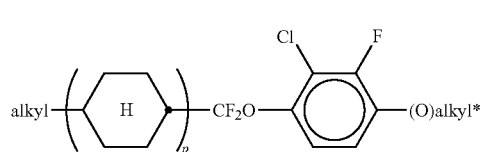
IIA-32
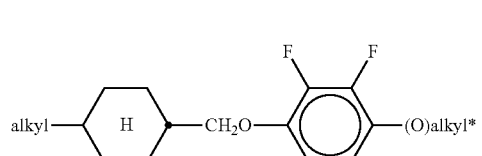
IIA-33
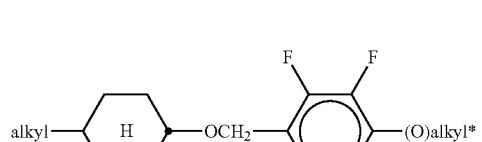
IIA-34
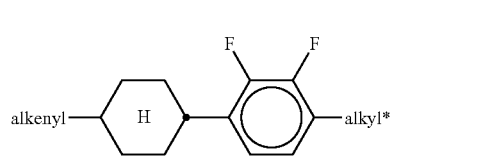
IIA-35
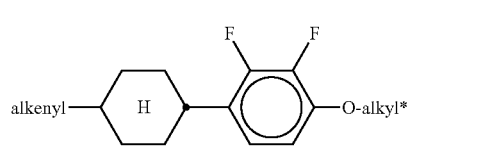
IIA-36
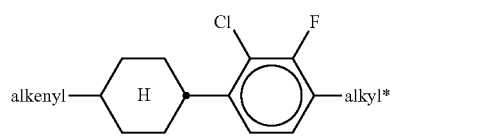
IIA-37
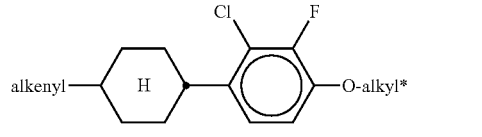
IIA-38
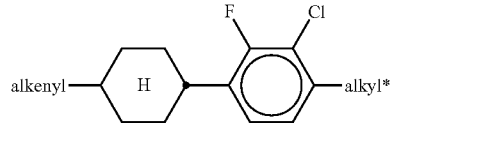
IIA-39
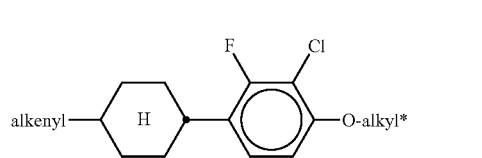

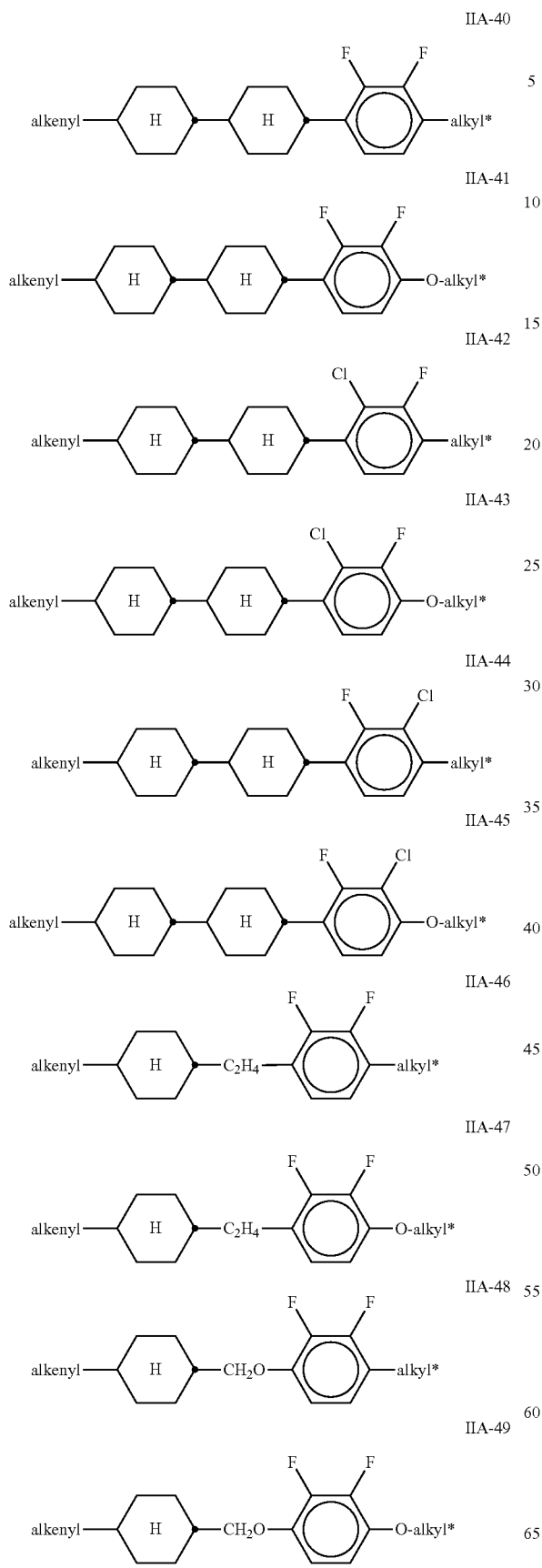
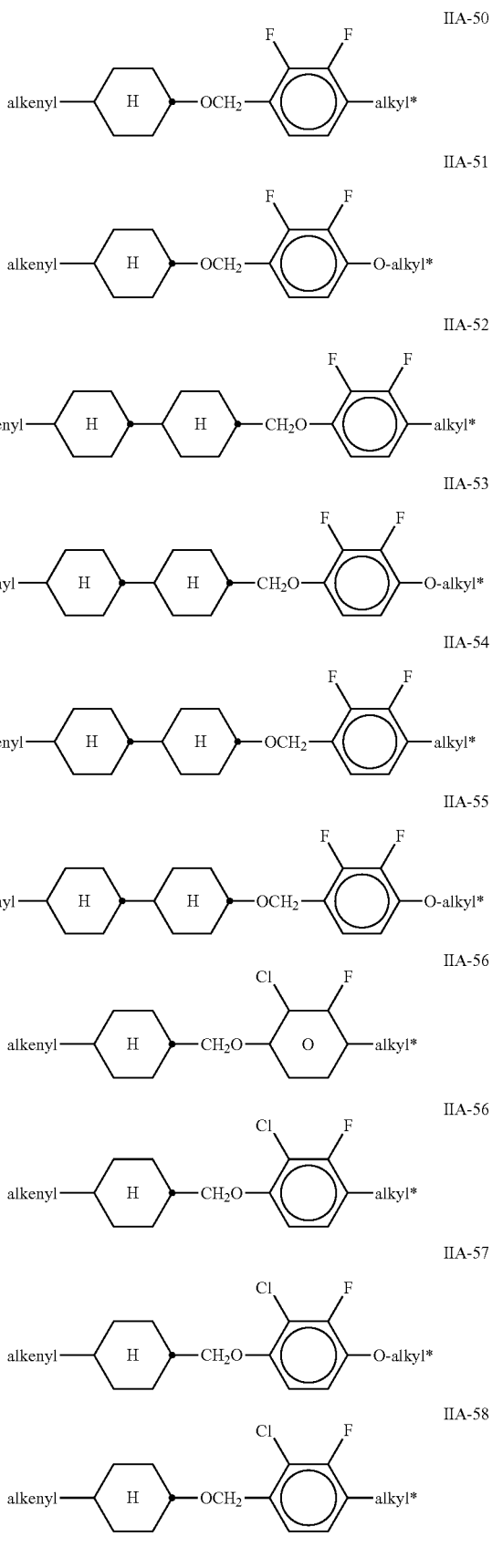

IIA-59
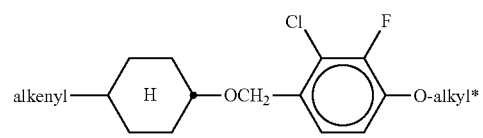
IIA-60
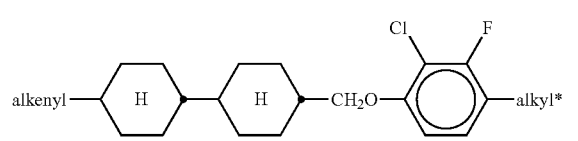
IIA-61
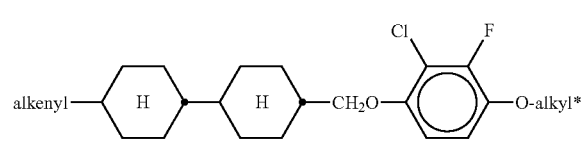
IIA-62
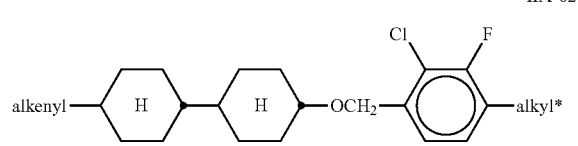
IIA-63
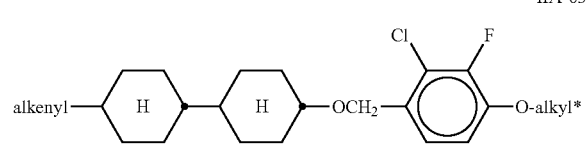
IIA-64
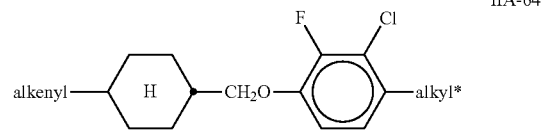
IIA-65
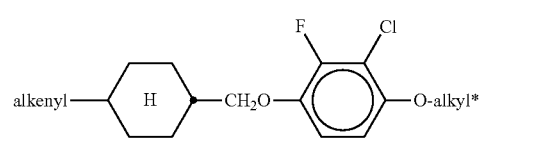
IIA-66
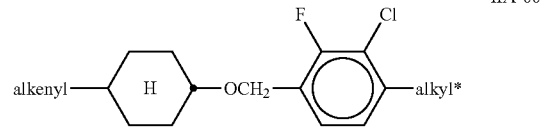
IIA-67
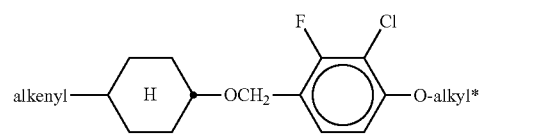
IIA-68
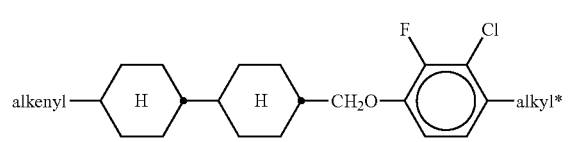
IIA-69
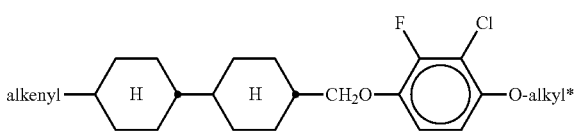
IIA-70
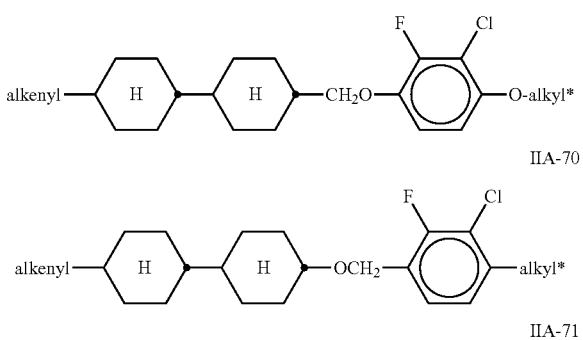
IIA-71
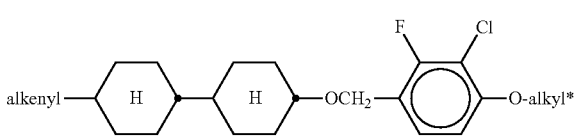
IIA-72
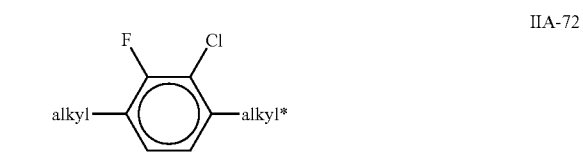
IIA-73
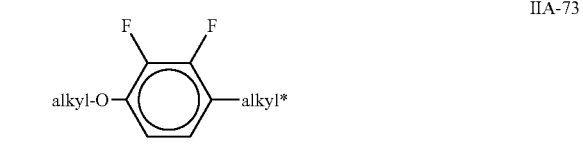
IIA-74
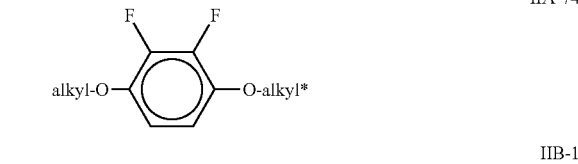
IIB-1
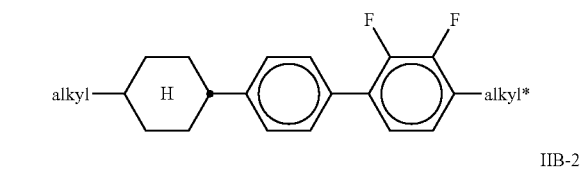
IIB-2
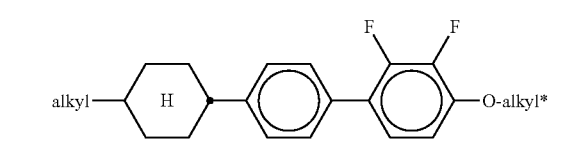
IIB-3
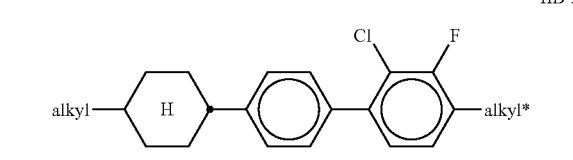
IIB-4
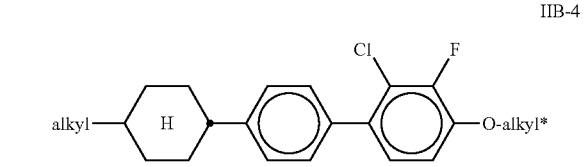

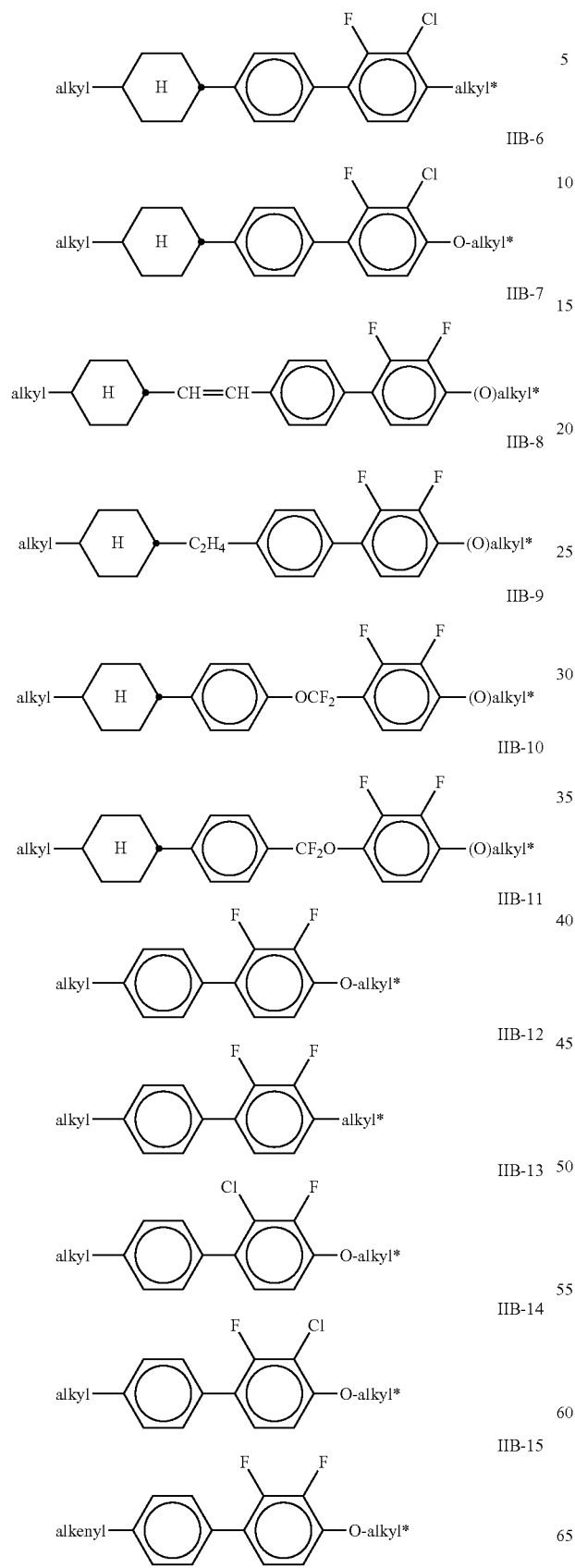

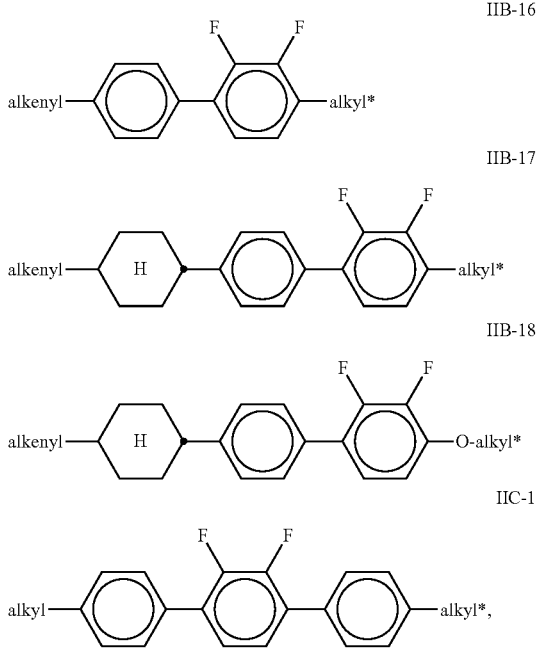

in which alkyl and alkyl* each, independently of one another, denote a straight-chain alkyl radical having 1-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

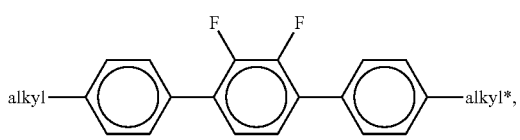

in which alkyl and alkyl* have the meanings indicated above, preferably in amounts of ≥3% by weight, in particular ≥5% by weight and particularly preferably 5-25% by weight.

b) Liquid-crystalline medium which additionally comprises one or more compounds of the formula III,

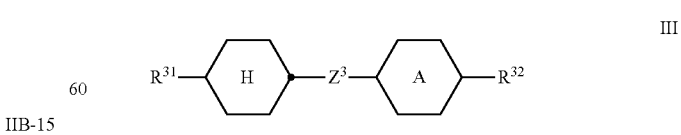

in which $R^{31}$ and $R^{32}$ each, independently of one another, denote a straight-chain alkyl, alkoxyalkyl or alkoxy radical having up to 12 C atoms, ―⟨A⟩― denotes ―⟨○⟩―,

―⟨◯⟩―, ―⟨◯⟩―,

―⟨○_O⟩― or ―⟨○_O⟩―

$Z^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of the formula III are indicated below:

alkyl―⟨H⟩―⟨○⟩―alkyl*    IIIa alkyl―⟨H⟩―⟨○⟩―O-alkyl*    IIIb alkyl―⟨H⟩―⟨H⟩―alkyl*    IIIc alkyl―⟨H⟩―⟨H⟩―alkyl*    IIId in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising a compound of the formula

H$_7$C$_3$―⟨H⟩―⟨H⟩―CH═CH$_2$   and/or

H$_9$C$_4$―⟨H⟩―⟨H⟩―CH═CH$_2$   and/or

H$_{11}$C$_5$―⟨H⟩―⟨H⟩―CH═CH$_2$, preferably in total amounts of ≥5% by weight, in particular ≥10% by weight.

Preference is furthermore given to mixtures according to the invention comprising the compound

H$_7$C$_3$―⟨H⟩―⟨H⟩―CH═CH$_2$.

d) Liquid-crystalline medium which additionally comprises one or more tetracyclic compounds of the formulae V-1
$R^7$―⟨H⟩―⟨○⟩―⟨○$_{F,F}$⟩―⟨H⟩―(O)C$_w$H$_{2w+1}$ V-2
$R^8$―⟨H⟩―⟨○$_F$⟩―⟨○$_{F,F}$⟩―⟨H⟩―(O)C$_x$H$_{2x+1}$ V-3
$R^9$―⟨H⟩―⟨○$_F$⟩―⟨○$_{F,F}$⟩―⟨H⟩―(O)C$_x$H$_{2x+1}$ V-4
$R^{10}$―⟨H⟩―⟨○$_{F,F}$⟩―⟨○$_{F,F}$⟩―⟨H⟩―(O)C$_x$H$_{2x+1}$ V-5
$R^{10}$―⟨H⟩―⟨○$_F$⟩―⟨○$_{F,F}$⟩―⟨○⟩―(O)C$_x$H$_{2x+1}$ V-6
$R^{10}$―⟨H⟩―⟨○$_F$⟩―⟨○$_{F,F}$⟩―⟨H⟩―(O)C$_x$H$_{2x+1}$ V-7
$R^{10}$―⟨H⟩―⟨○$_F$⟩―⟨○$_{F,F}$⟩―⟨○⟩―(O)C$_x$H$_{2x+1}$ V-8
$R^{10}$―⟨H⟩―⟨○$_{F,F}$⟩―⟨○$_{F,F}$⟩―⟨○⟩―(O)C$_x$H$_{2x+1}$ V-9
$R^{10}$―⟨○⟩―⟨○$_F$⟩―⟨○$_{F,F}$⟩―⟨○⟩―(O)C$_x$H$_{2x+1}$ in which
$R^{7-10}$ each, independently of one another, have one of the meanings indicated for $R^{2A}$ in claim 7, and w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6,

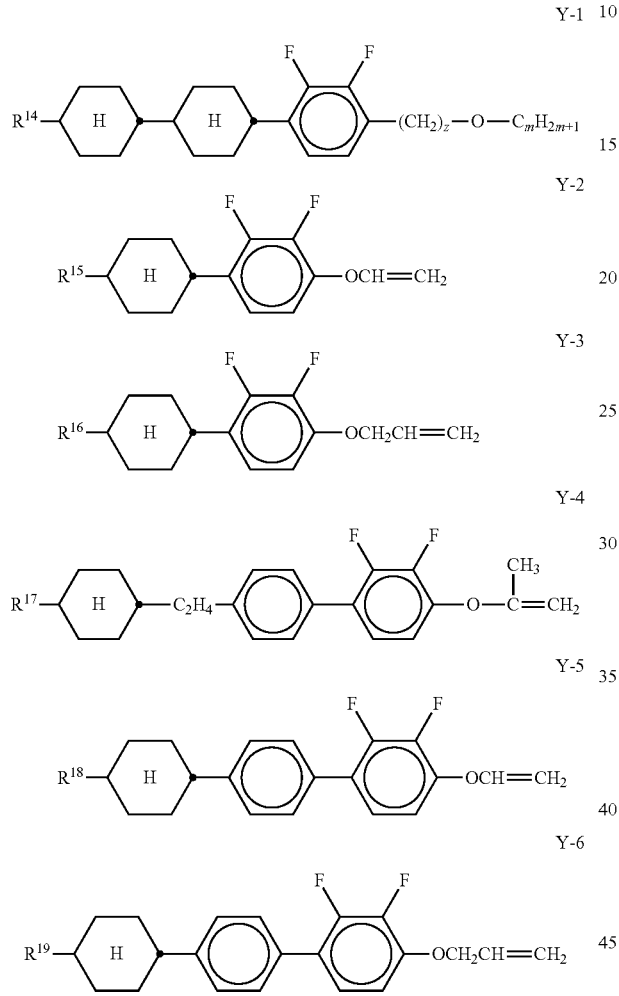

in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-23,

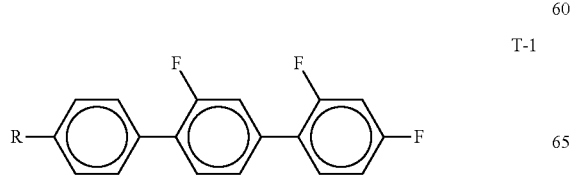

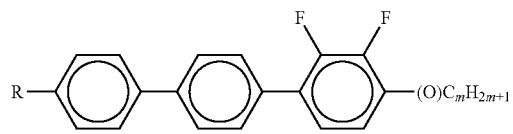

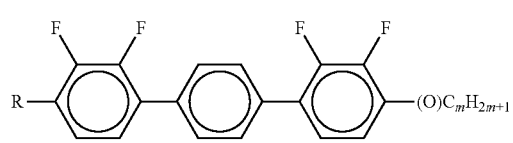

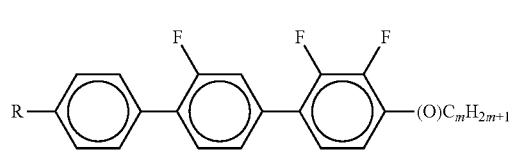

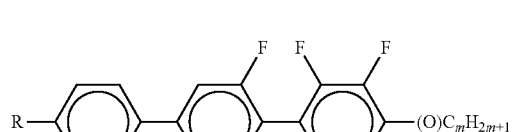

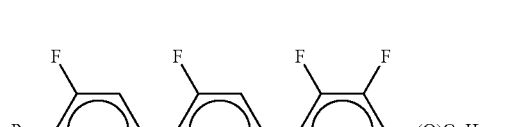

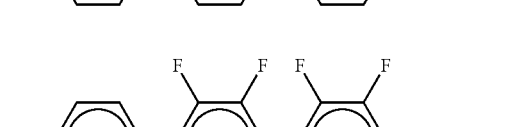

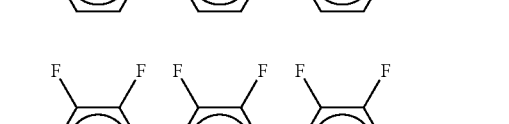

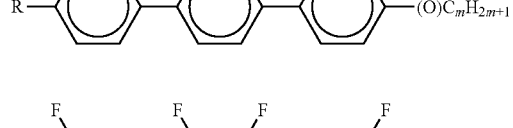

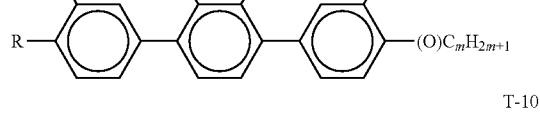

T-12 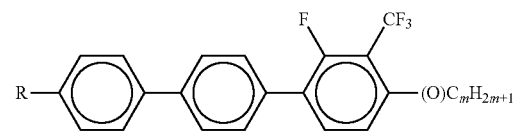

T-13 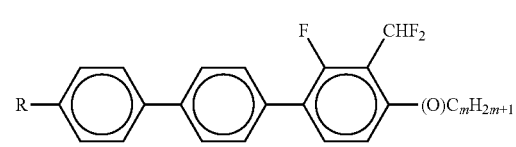

T-14 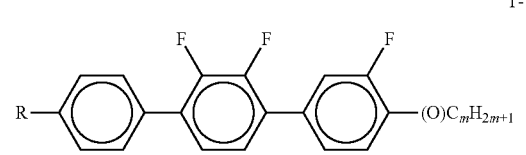

T-15 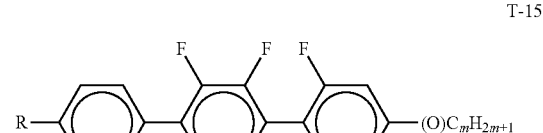

T-16 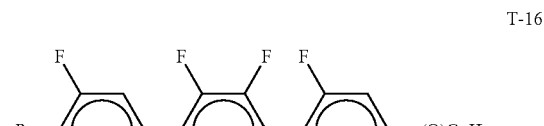

T-17 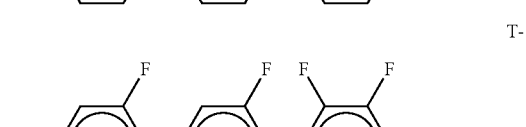

T-18 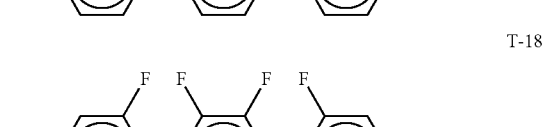

T-19 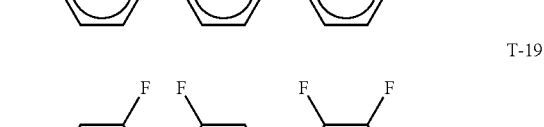

T-20 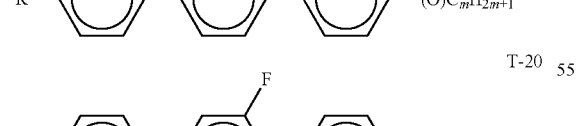

T-21 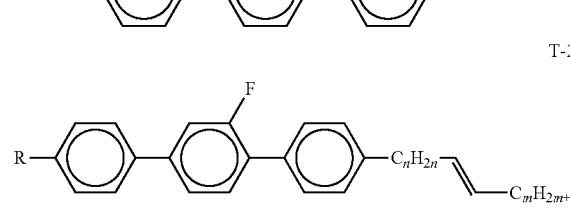

T-22 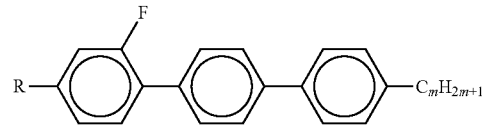

T-23 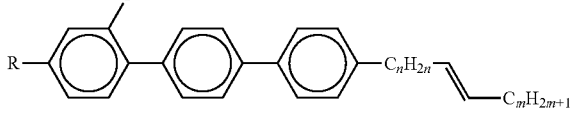

in which

R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-23 in amounts of 2-30% by weight, in particular 5-20% by weight.

Particular preference is given to compounds of the formulae T-1, T-2, T-20, T-21 and T-22. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-23.

g) Liquid-crystalline medium additionally comprising one or more biphenyls of the formulae B-1 to B-3, B-1 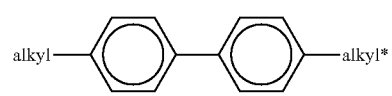

B-2 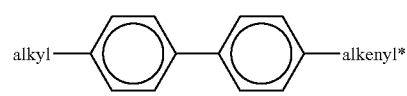

B-3 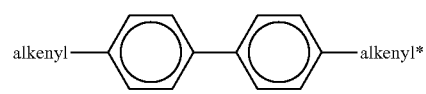

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

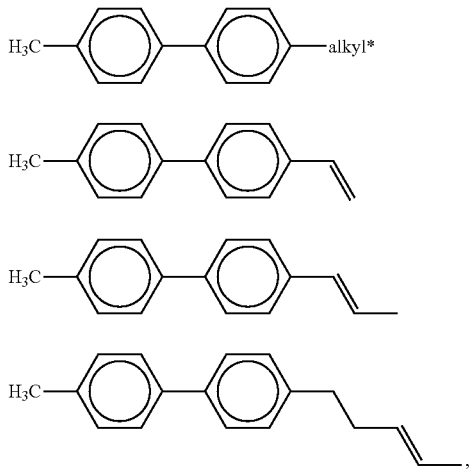

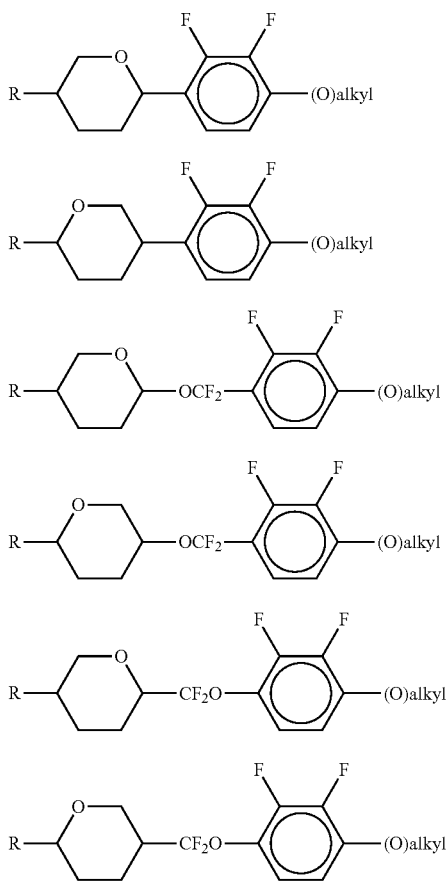

in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-9,

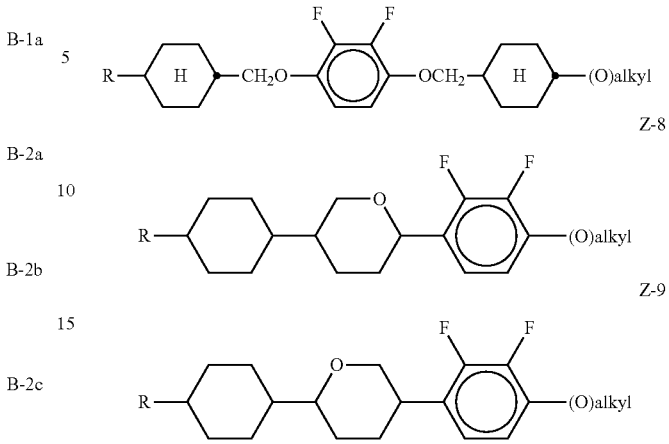

in which R and alkyl have the meanings indicated above.

i) Liquid-crystalline medium comprising at least one compound of the formulae O-1 to O-17,

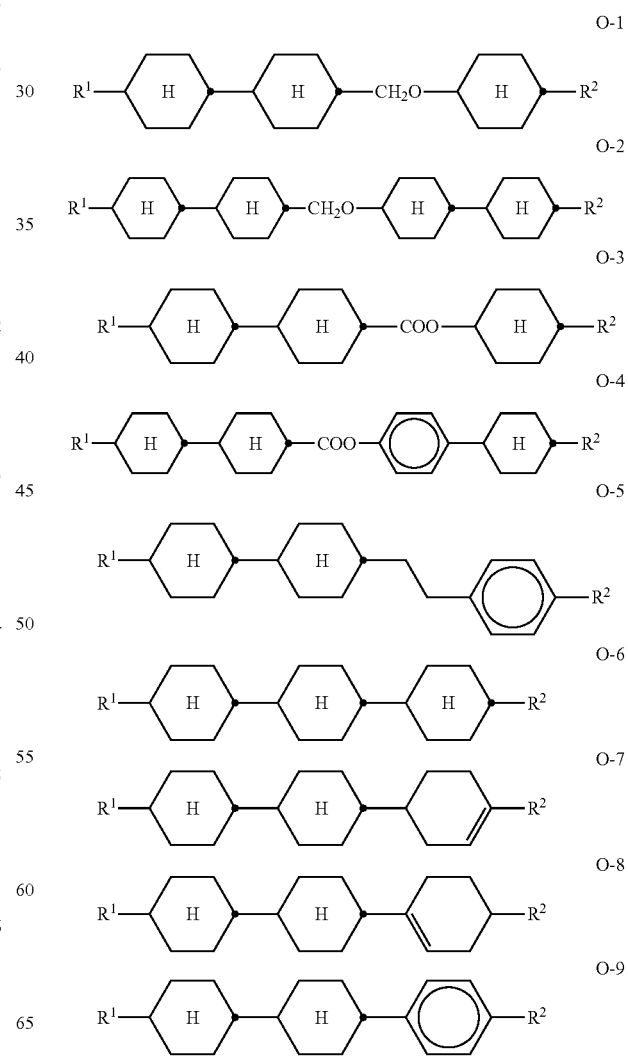

-continued

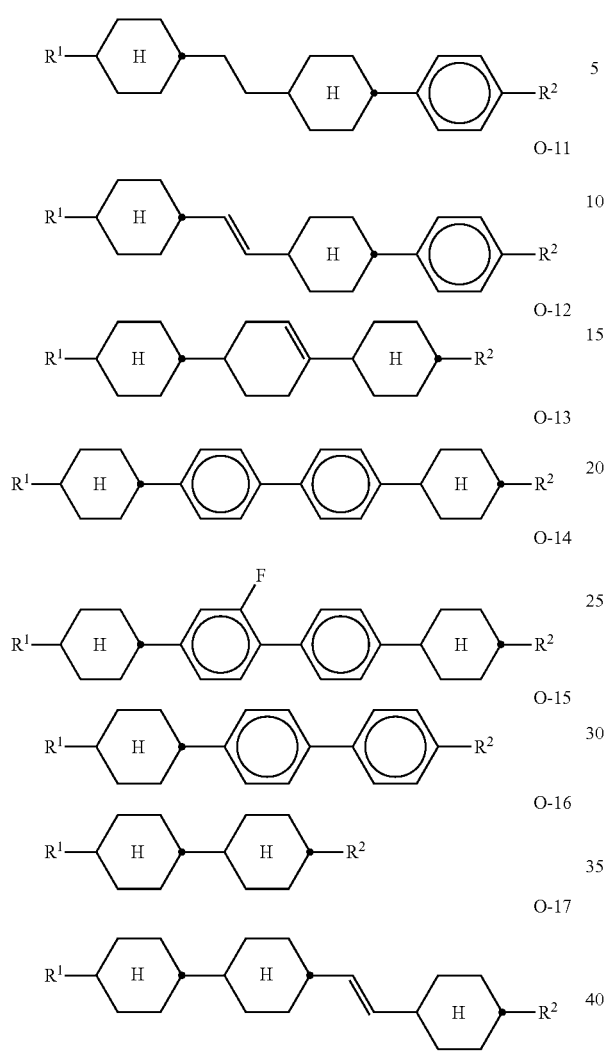

in which $R^1$ and $R^2$ have the meanings indicated for $R^{2A}$. $R^1$ and $R^2$ preferably each, independently of one another, denote straight-chain alkyl.

Preferred media comprise one or more compounds of the formulae O-1, O-3, O-4, O-5, O-9, O-13, O-14, O-15, O-16 and/or O-17.

Mixtures according to the invention very particularly preferably comprise the compounds of the formula O-9, O-15, O-16 and/or O-17, in particular in amounts of 5-30%.

Preferred compounds of the formulae O-9 and O-16 are indicated below:

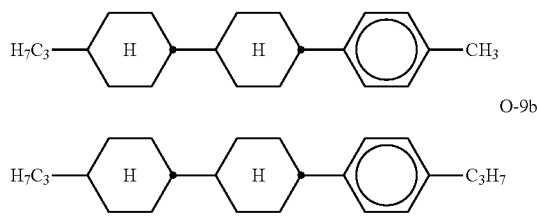

-continued

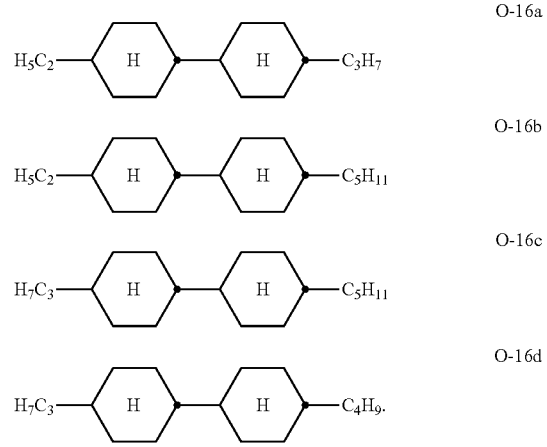

The medium according to the invention particularly preferably comprises the tricyclic compounds of the formula O-9a and/or of the formula O-9b in combination with one or more bicyclic compounds of the formulae O-16a to O-16d. The total proportion of the compounds of the formulae O-9a and/or O-9b in combination with one or more compounds selected from the bicyclic compounds of the formulae O-16a to O-16d is 5-40%, very particularly preferably 15-35%.

Very particularly preferred mixtures comprise compounds O-9a and O-16a:

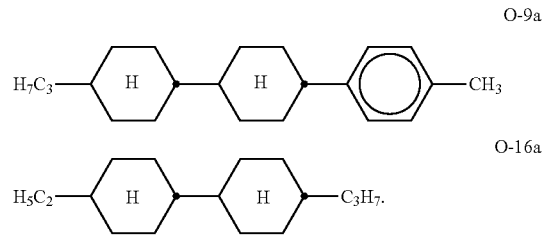

Compounds O-9a and O-16a are preferably present in the mixture in a concentration of 15-35%, particularly preferably 15-25% and especially preferably 18-22%, based on the mixture as a whole.

Very particularly preferred mixtures comprise compounds O-9b and O-16a:

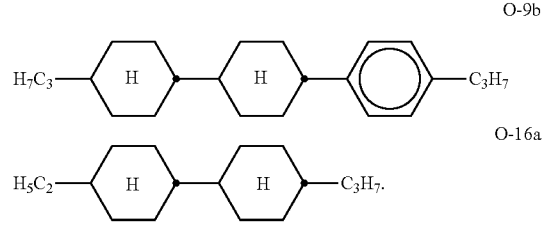

Compounds O-9b and O-16a are preferably present in the mixture in a concentration of 15-35%, particularly preferably 15-25% and especially preferably 18-22%, based on the mixture as a whole.

Very particularly preferred mixtures comprise the following three compounds:

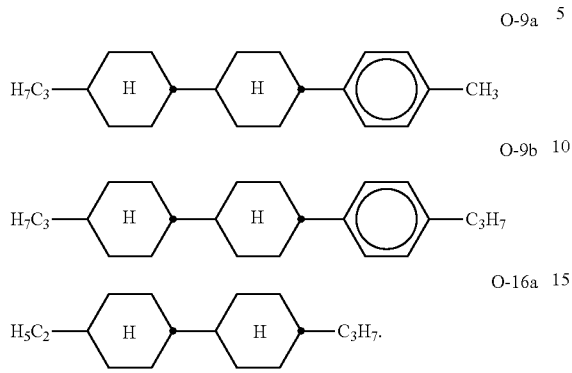

O-9a

O-9b

O-16a

Compounds O-9a, O-9b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

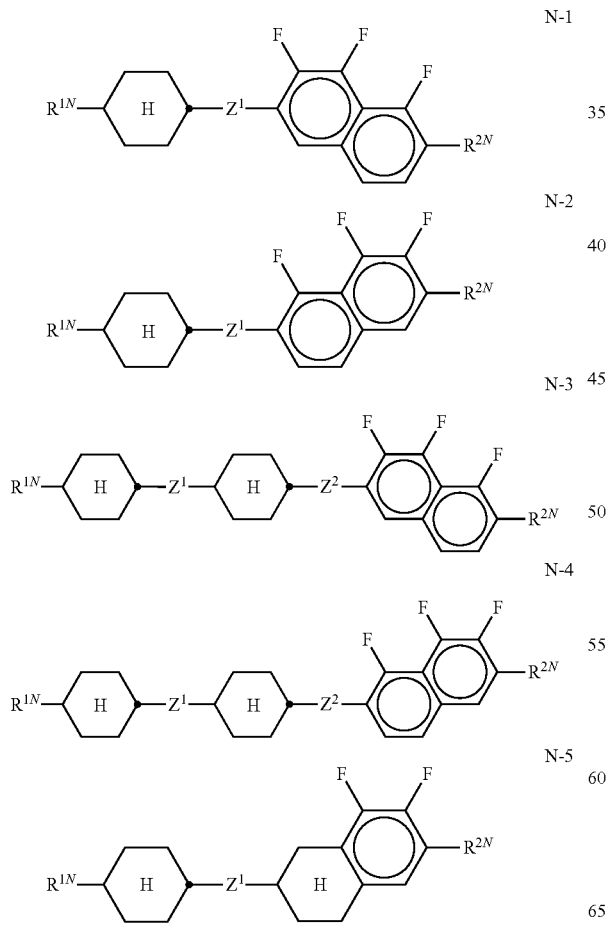

N-1

N-2

N-3

N-4

N-5 in which $R^{1N}$ and $R^{2N}$ each, independently of one another, have the meanings indicated for $R^{2A}$ in claim 7, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CHCH$_2$CH$_2$—, —CH$_2$CH$_2$CH═CH—, —CH$_2$O—, —OCH$_2$—, —COO—, —OCO—, —C$_2$F$_4$—, —CF═CF—, —CF═CH—, —CH═CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

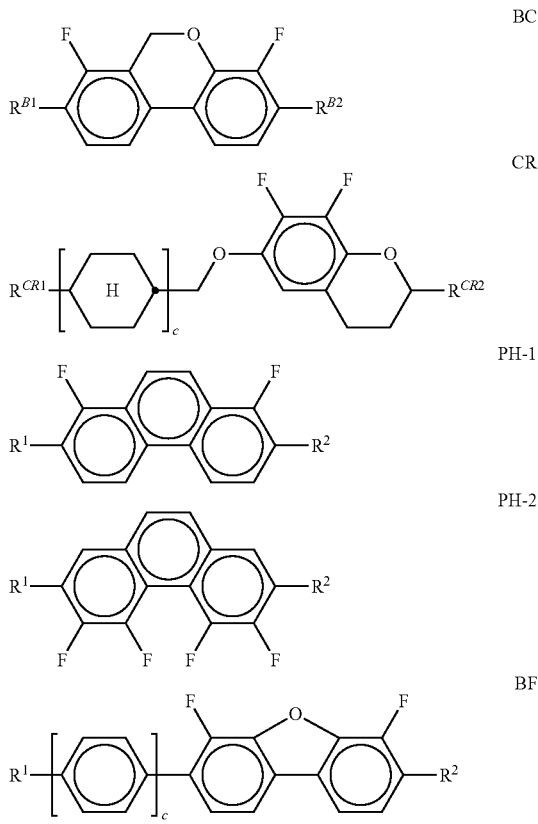

BC

CR

PH-1

PH-2

BF in which
$R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight.

Particularly preferred compounds of the formulae BC and CR are the compounds BC-1 to BC-7 and CR-1 to CR-5,

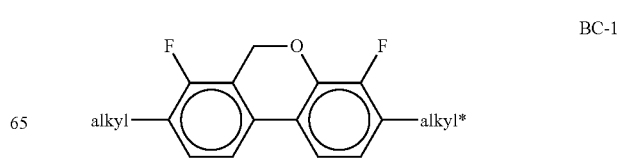

BC-1

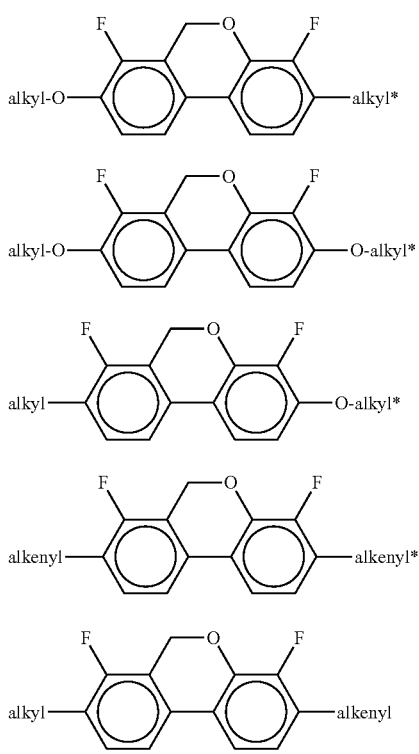

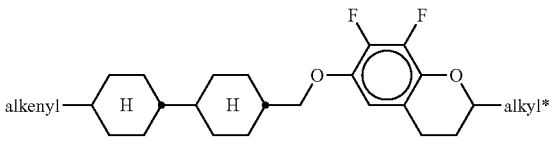

in which
alkyl and alkyl* each, independently of one another, denote a straight-chain alkyl radical having 1-6 C atoms, and
alkenyl and
alkenyl* each, independently of one another, denote a straight-chain alkenyl radical having 2-6 C atoms.

Very particular preference is given to mixtures comprising one, two or three compounds of the formula BC-2.

l) Preferred mixtures comprise one or more indane compounds of the formula In,

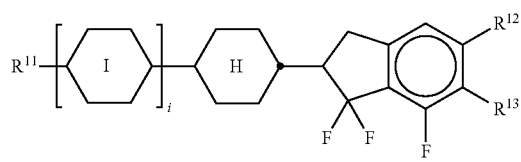

in which
$R^{11}$, $R^{12}$,
$R^{13}$ each, independently of one another, denote a straight-chain alkyl, alkoxy, alkoxyalkyl or alkenyl radical having 1-6 C atoms,
$R^{12}$ and $R^{13}$ additionally denote H or halogen,

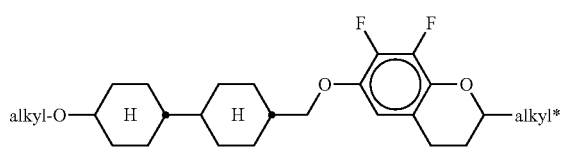

i denotes 0, 1 or 2.
In the case that $R^{12}$ and/or $R^{13}$ denote halogen, halogen is preferably F.
Preferred compounds of the formula In are the compounds of the formulae In-1 to In-16 indicated below:

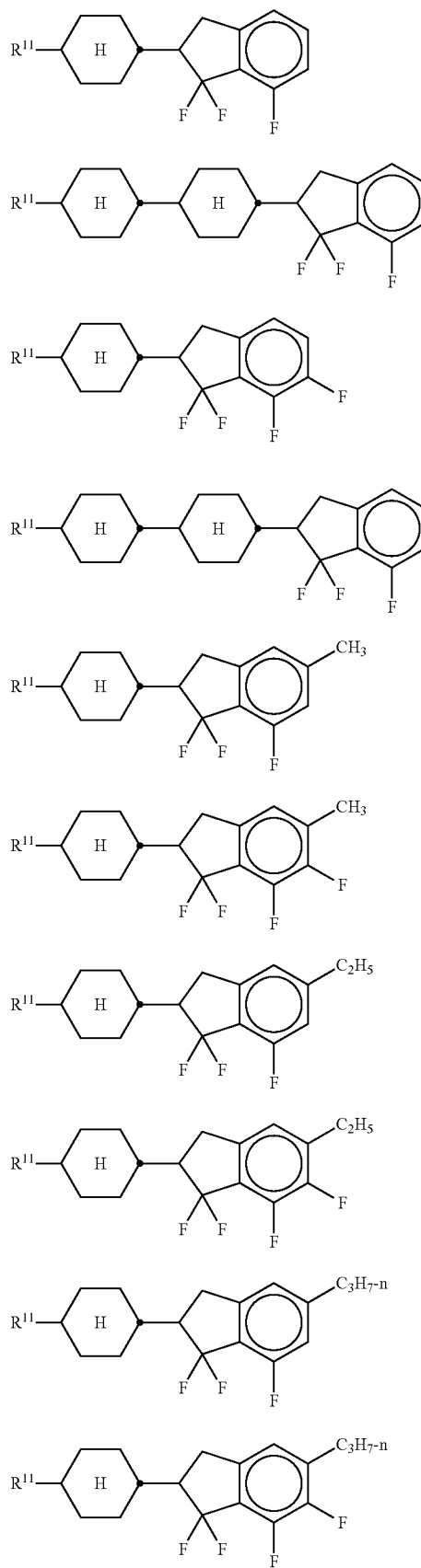

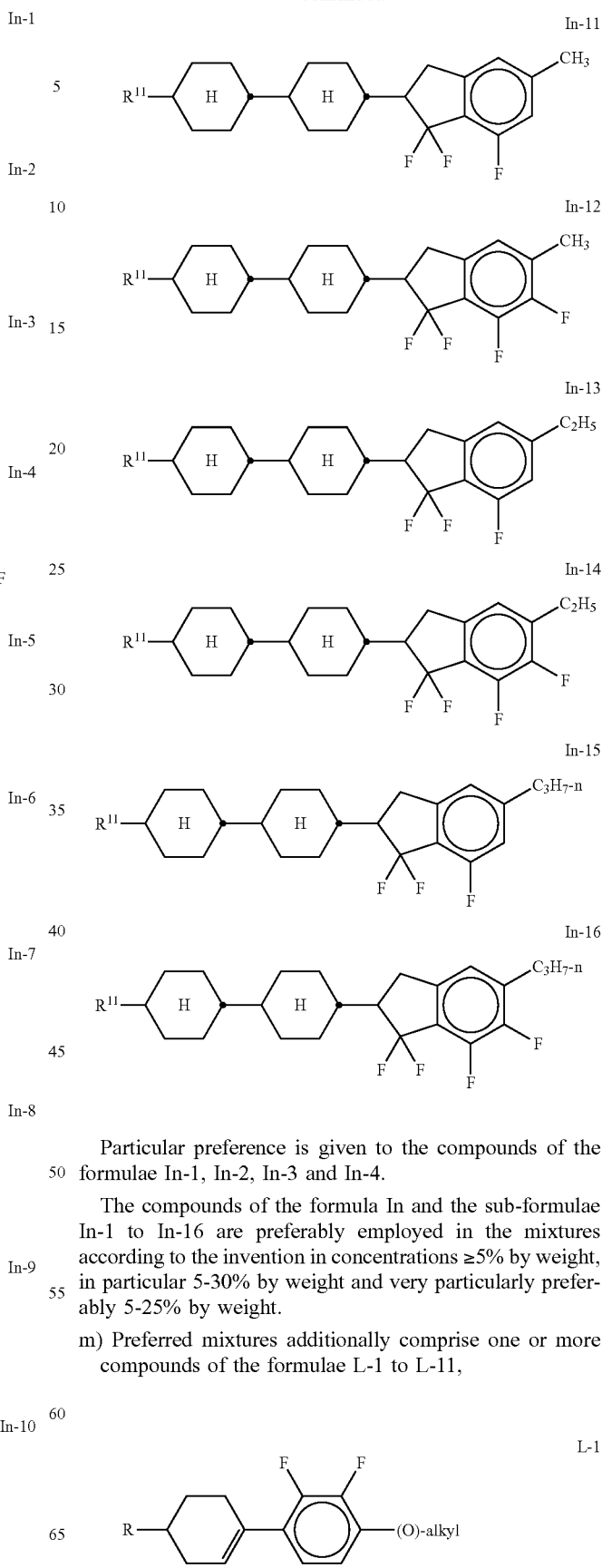

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11,

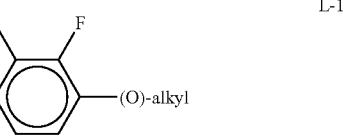

-continued

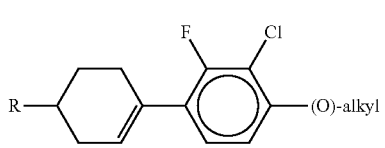
L-2

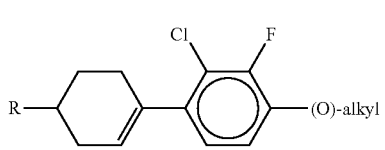
L-3

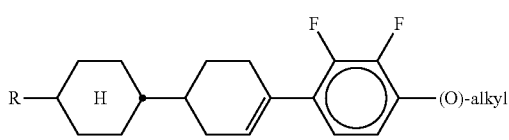
L-4

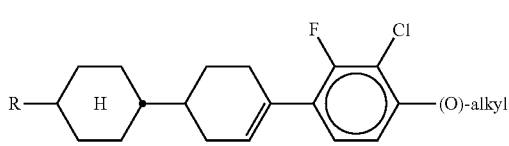
L-5

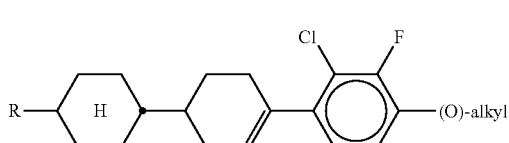
L-6

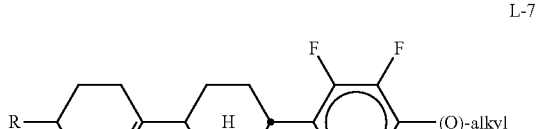
L-7

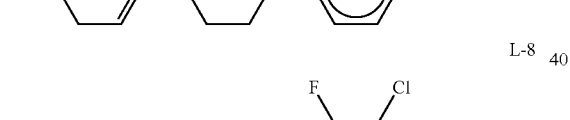
L-8

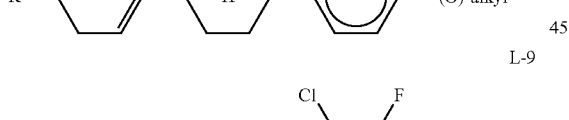
L-9

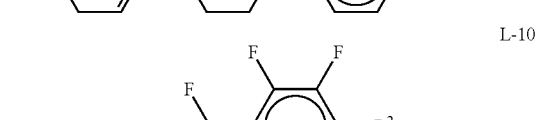
L-10

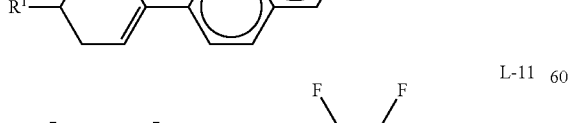
L-11

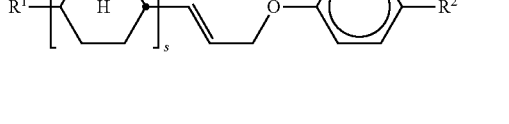

in which

R, $R^1$ and $R^2$ each, independently of one another, have the meanings indicated for $R^{2A}$ in claim 7, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

n) Preferred mixtures additionally comprise one or more tolan compounds of the formula To-1 and To-2,

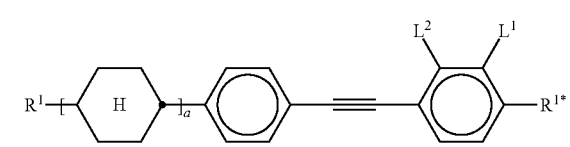
To-1

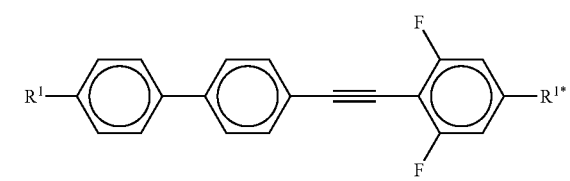
To-2 in which $R^1$ and $R^{1*}$ each, independently of one another, denote an alkyl or alkoxy radical having 1 to 15 C atoms, where, in addition, one or more $CH_2$ groups in these radicals may each be replaced, independently of one another, by —C≡C—, —$CF_2$O—, —CH=CH—,

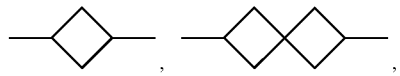

—O—, —CO—O—, —O—CO— in such a way that O atoms are not linked directly to one another, and in which, in addition, one or more H atoms may be replaced by halogen, a 0 or 1, $L^1$ and $L^2$ each, independently of one another, denote H, F, Cl, $CF_3$ or $CHF_2$, preferably H or F.

Preferred compounds of the formulae To-1 and To-2 are the compounds of the formula

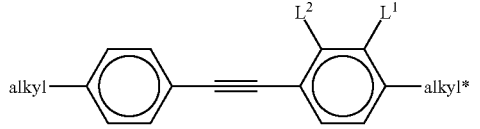
To-1a

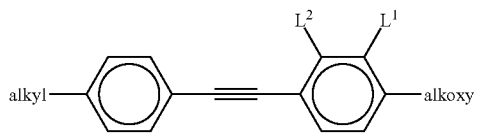
To-1b

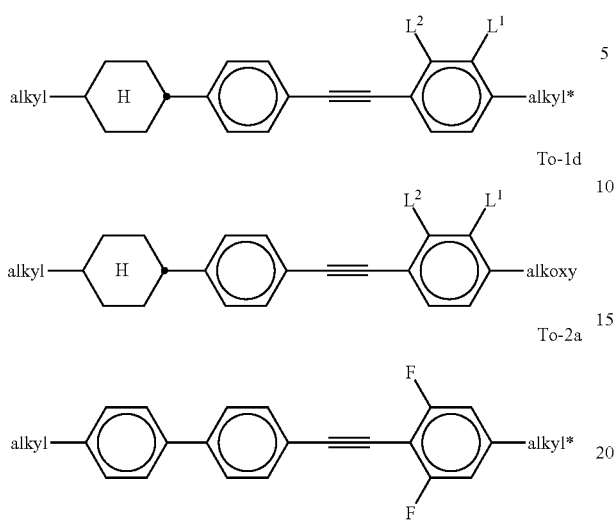

To-1c

To-1d

To-2a in which alkyl and alkyl* each, independently of one another, denote a straight-chain alkyl radical having 1-6 C atoms, alkoxy or O-alkyl denotes a straight-chain alkoxy radical having 1-6 C atoms, and $L^1$ and $L^2$ each, independently of one another, denote H, F, Cl, $CF_3$ or $CHF_2$, preferably H or F.

In particular, the following compounds of the formula To-1 are preferred:

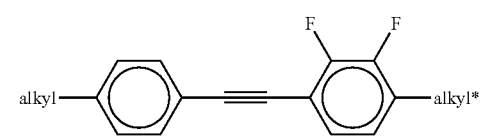

To-1a-1

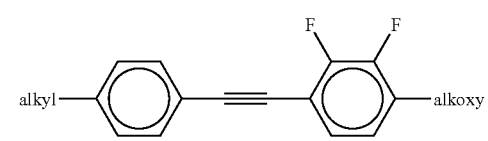

To-1b-1

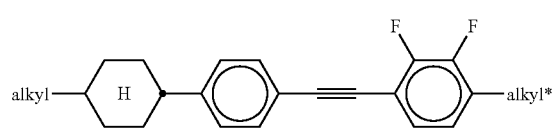

To-1c-1

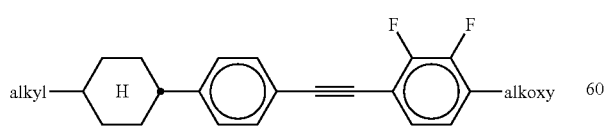

To-1d-1

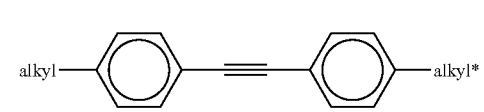

To-1a-2

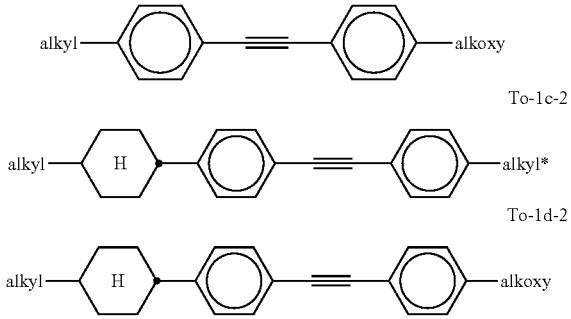

T-1b-2

To-1c-2

To-1d-2 where
alkyl, alkyl* and alkoxy have the meanings indicated above.

o) Preferred mixtures contain at least one compound of the formula P,

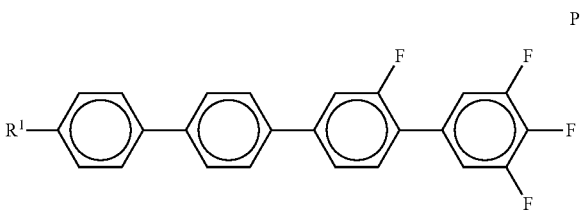

P preferably in amounts of 0.01-10% by weight, in particular 0.01-5% by weight.

Particularly preferred mixture concepts are indicated below: (the acronyms used are explained in Table A. n and m here each denote, independently of one another, 1-6). The preferred mixtures contain at least one self-aligning additive selected from the following group of compounds:

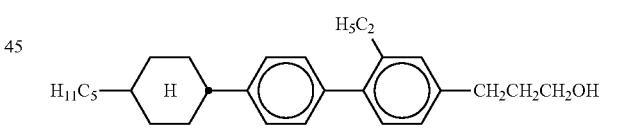

I-1a-23

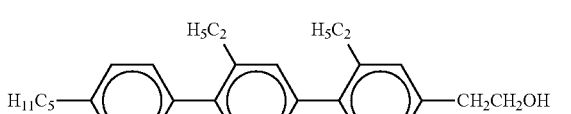

I-3a-22

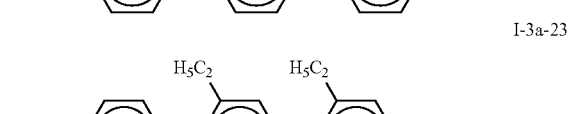

I-3a-23

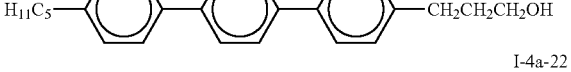

I-4a-22

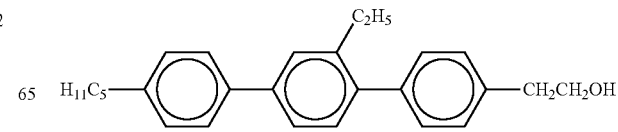

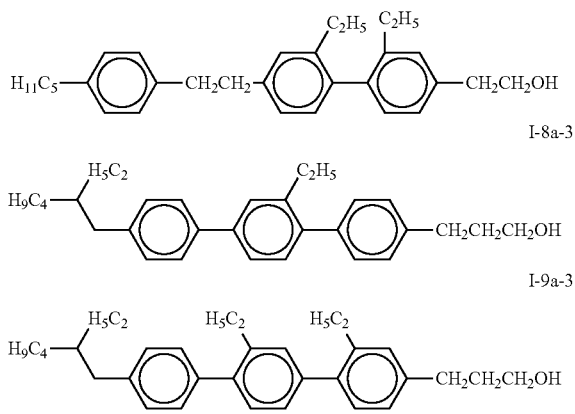

preferably in amounts of 0.1-10 wt. %, in particular 1-3 wt. %.

CPY-n-Om, in particular CPY-2-O2, CPY-3-O2 and/or CPY-5-O2, preferably in concentrations >5%, in particular 10-30%, based on the mixture as a whole, and/or CY-n-Om, preferably CY-3-O2, CY-3-O4, CY-5-O2 and/or CY-5-O4, preferably in concentrations >5%, in particular 15-50%, based on the mixture as a whole, and/or CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole, and/or CLY-n-Om, preferably CLY-2-O4, CLY-3-O2 and/or CLY-3-O3, preferably in concentrations >5%, in particular 10-30%, based on the mixture as a whole, and/or CK-n-F, preferably CK-3-F, CK-4-F and/or CK-5-F, preferably in concentrations of >5%, in particular 5-25%, based on the mixture as a whole.

Preference is furthermore given to mixtures according to the invention which comprise the following mixture concepts:

(n and m each denote, independently of one another, 1-6.)

CPY-n-Om and CY-n-Om, preferably in concentrations of 10-80%, based on the mixture as a whole, and/or CPY-n-Om and CK-n-F, preferably in concentrations of 10-70%, based on the mixture as a whole, and/or CPY-n-Om and CLY-n-Om, preferably in concentrations of 10-80%, based on the mixture as a whole. and/or PYP-n-m, preferably one, two or three compounds, preferably in concentrations of 1-20% of the mixture as a whole, and/or PY-n-Om, preferably one, two or three compounds, preferably in concentrations of 1-20% of the mixture as a whole.

The invention furthermore relates to an electro-optical display, preferably a PI-free display, having either passive- or active-matrix addressing (based on the ECB, VA, PS-VA, PSA) characterised in that it contains, as dielectric, a liquid-crystalline medium according to one or more of claims 1 to 13.

The liquid-crystalline medium according to the invention preferably has a nematic phase from $\leq -20°$ C. to $\geq 70°$ C., particularly preferably from $\leq -30°$ C. to $\geq 80°$ C., very particularly preferably from $\leq -40°$ C. to $\geq 90°$ C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of $-20°$ C. in a corresponding test cell is 1000 h or more, the medium is referred to as stable at this temperature. At temperatures of $-30°$ C. and $-40°$ C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence $\Delta n$ in the liquid-crystal mixture are generally between 0.07 and 0.16, preferably between 0.08 and 0.13.

The liquid-crystal mixture according to the invention has a $\Delta \varepsilon$ of $-0.5$ to $-8.0$, in particular $-2.5$ to $-6.0$, where $\Delta \varepsilon$ denotes the dielectric anisotropy. The rotational viscosity $\gamma_1$ at 20° C. is preferably $\leq 165$ mPa·s, in particular $\leq 140$ mPa·s.

The liquid-crystal media according to the invention have relatively low values for the threshold voltage ($V_0$). They are preferably in the range from 1.7 V to 3.0 V, particularly preferably $\leq 2.5$ V and very particularly preferably $\leq 2.3$ V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta \varepsilon > 1.5$, the term "dielectrically neutral compounds" denotes those having $-1.5 \leq \Delta \varepsilon \leq 1.5$ and the term "dielectrically negative compounds" denotes those having $\Delta \varepsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA), as well as for PM-VA applications, for example for car navigation and white market.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Preferably component A comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

The mixtures according to the invention contain one or more compounds of the formula I and preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \qquad \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | |
|---|---|
| —CH═CH— | —N(O)═N— |
| —CH═CQ— | —CH═N(O)— |
| —C≡C— | —CH$_2$—CH$_2$— |
| —CO—O— | —CH$_2$—O— |
| —CO—S— | —CH$_2$—S— |
| —CH═N— | —COO-Phe-COO— |
| —CF$_2$O— | —CF═CF— |
| —OCF$_2$— | —OCH$_2$— |
| —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.1-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself comprise any polymerisable components.

In a preferred embodiment of the invention, the polymerisable compounds are selected from the compounds of the formula M, $$R^{Ma}\text{-}A^{M1}\text{-}(Z^{M1}\text{-}A^{M2})_{m1}\text{-}R^{Mb} \qquad \qquad \text{M}$$

in which the individual radicals have the following meanings:

$R^{Ma}$ and $R^{Mb}$ each, independently of one another, denote P, P-Sp-, H, halogen, SF$_5$, NO$_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp, F, Cl, Br, I, —CN, —NO$_2$, —NCO, —NCS, —OCN, —SCN, —C(═O)N(R$^x$)$_2$, —C(═O)

Y¹, —C(=O)Rˣ, —N(Rˣ)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, halogen, SF₅, NO₂, an alkyl, alkenyl or alkynyl group, Y¹ denotes halogen, $Z^{M1}$ denotes —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n1}$—, —CF₂CH₂—, —CH₂CF₂—, —(CF₂)$_{n1}$—, —CH=CH—, —CF=CF—, —C≡C—, —CH=CH—, —COO—, —OCO—CH=CH—, CR°R°° or a single bond, R° and R°° each, independently of one another, denote H or alkyl having 1 to 12 C atoms, Rˣ denotes P, P-Sp-, H, halogen, straight-chain, branched or cyclic alkyl having 1 to 25 C atoms, in which, in addition, one or more non-adjacent CH₂ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —NO₂, —NCO, —NCS, —OCN, —SCN, SF₅ or straight-chain or branched alkyl having 1 to 25 C atoms, in which, in addition, one or more non-adjacent CH₂ groups may each be replaced, independently of one another, by —C(R°)=C(R°°)—, —C≡C—, —N(R°°)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH₂ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, Y¹ denotes halogen, Rˣ denotes P, P-Sp-, H, halogen, straight-chain, branched or cyclic alkyl having 1 to 25 C atoms, in which, in addition, one or more non-adjacent CH₂ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote(s) P or P-Sp-.

Suitable and preferred mesogenic comonomers, particularly for use in PSA displays, are selected, for example, from the following formulae:

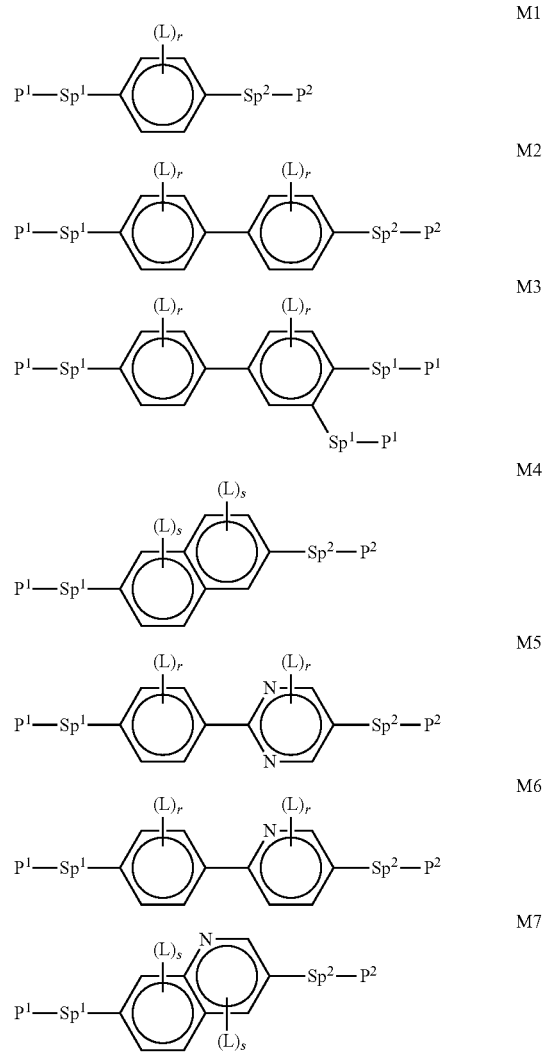

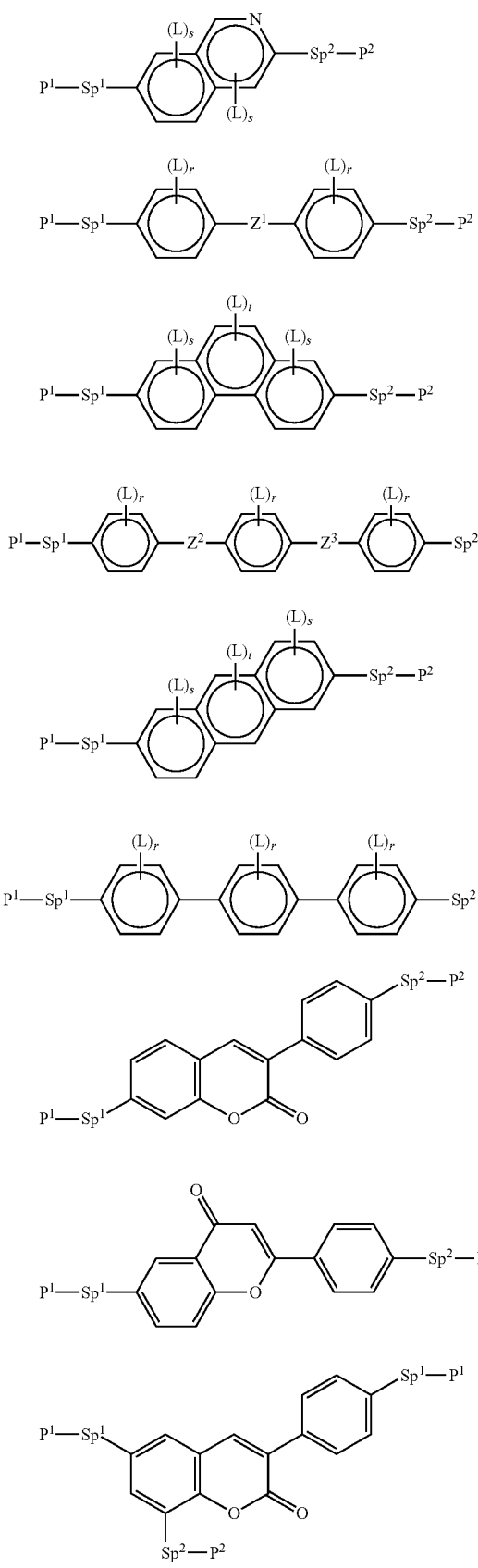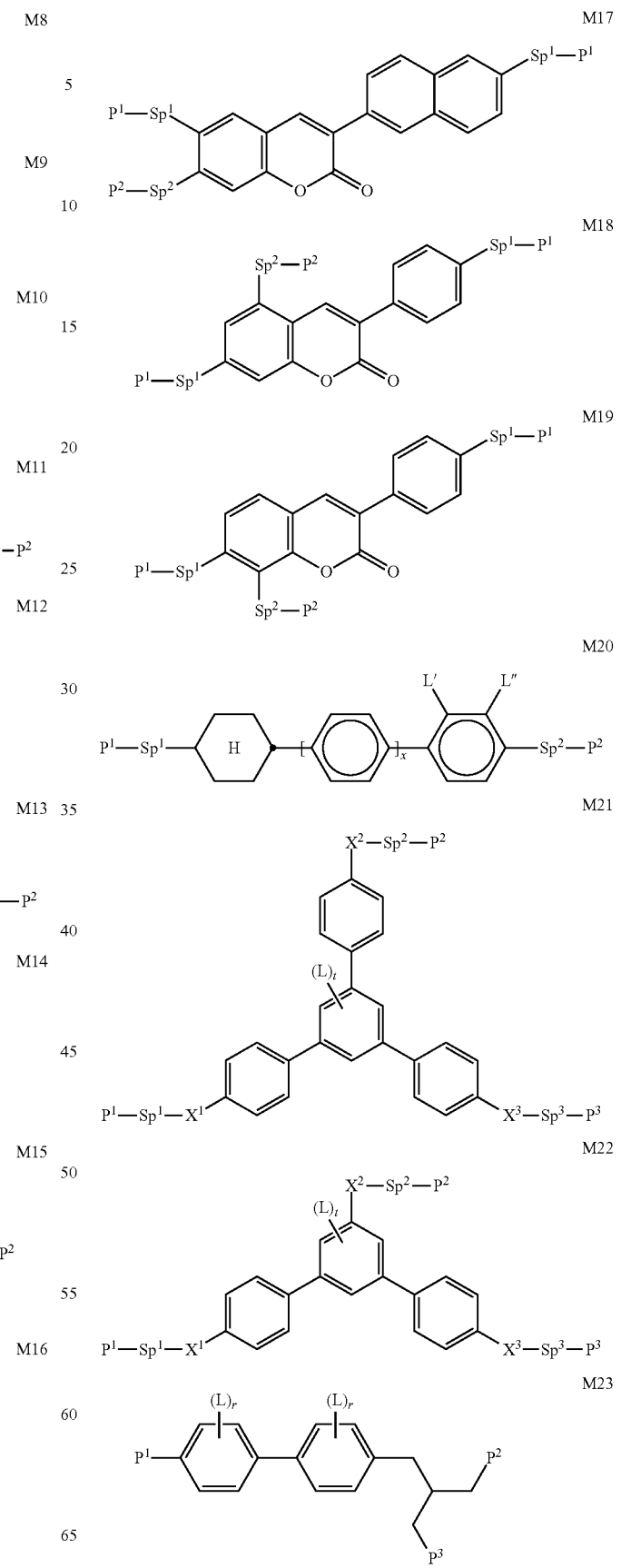

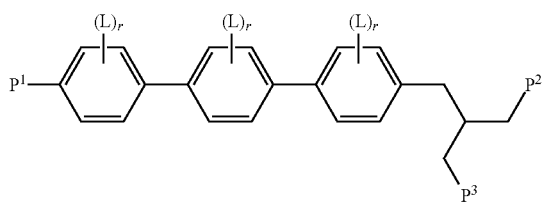
M24

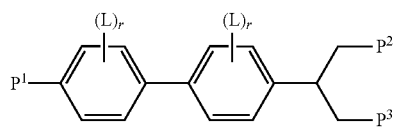
M25

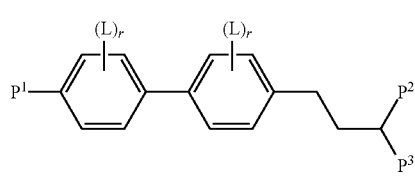
M26

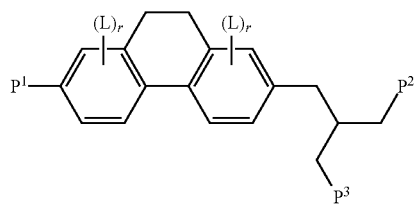
M27

M28

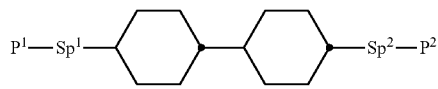
M29

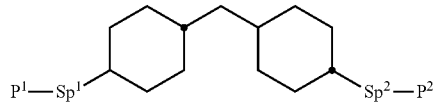
M30

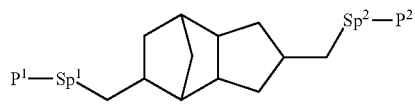
M31

M32

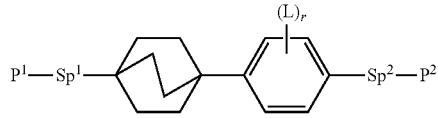
M33

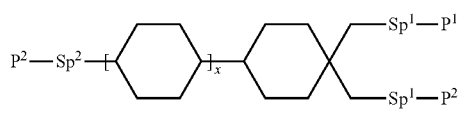
M34

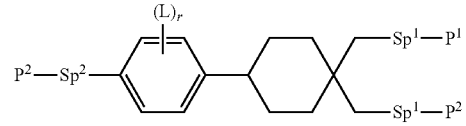
M35

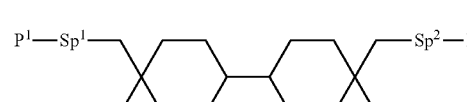
M36

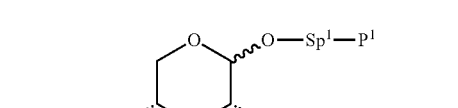
M37

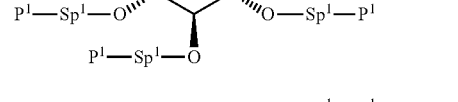
M38

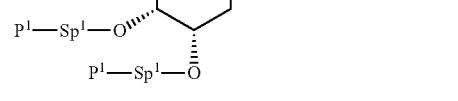
M39

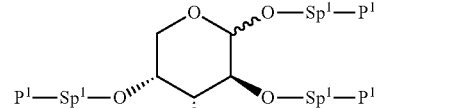
M40

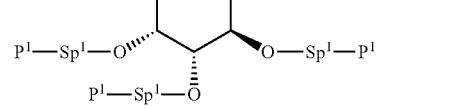
M41

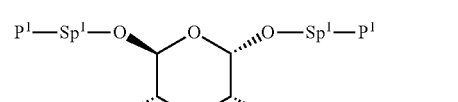

in which the individual radicals have the following meanings:

$P^1$, $P^2$ and $P^3$ each, independently of one another, denote a polymerisable group, preferably having one of the meanings indicated above and below for P, particularly preferably an acrylate, methacrylate, fluoroacrylate, oxetane, vinyl, vinyloxy or epoxide group, $Sp^1$, $Sp^2$ and $Sp^3$ each, independently of one another, denote a single bond or a spacer group, preferably having one of the meanings indicated above and below for Sp, and particularly preferably denote $-(CH_2)_{p1}-$, $-(CH_2)_{p1}-O-$, $-(CH_2)_{p1}-CO-O-$ or $-(CH_2)_{p1}-O-CO-O-$, in which p1 is an integer from 1 to 12, and where the linking to the adjacent ring in the last-mentioned groups takes place via the O atom, where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^{00})$—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of formulae M1 to M41 wherein L on each occurrence, identically or differently, has one of the meanings given above or below, and is preferably F, Cl, CN, $NO_2$, $CH_3$, $C_2H_5$, $C(CH_3)_3$, CH($CH_3$)$_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Suitable polymerisable compounds are furthermore listed, for example, in Table D. LC mixtures containing at least one polymerisable compound listed in Table D are especially preferred.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M.

The polymerisable compounds are preferably polymerised by photopolymerisation, for example by UV irradiation, often in the presence of at least one suitable initiator. Suitable conditions for the polymerisation and suitable types and amounts of initiator(s) are known to a person skilled in the art and are described in the literature. Suitable for free-radical polymerisation are, for example, commercially available photoinitiators, for example Irgacure® 651, Irgacure® 184 or Darocure® 1173 (BASF). The polymerisable compound(s) preferably comprise from 0 to 5% by weight, particularly preferably 0.1 to 3% by weight of one or more photoinitiators.

The combination of at least two liquid crystalline compounds, at least one self-aligning additive and preferably with at least one polymerisable compound, in particular one selected from the formula M and/or the formulae M1 to M41, produces low threshold voltages, low rotational viscosities, very good low temperature stabilities (LTS) in the media but at the same time high clearing points and high VHR values, and enables the setting of a pretilt angle in VA displays without the need of any alignment layer, e.g., a polyimide layer.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

Besides the compounds of the formulae IIA and/or IIB and/or IIC, one or more compounds of the formula I, the mixtures according to the invention preferably comprise one or more of the compounds from Table A indicated below.

TABLE A
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
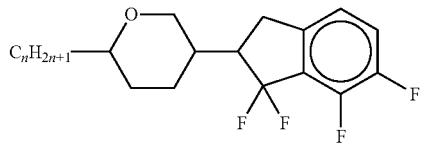
AIK-n-F
BCH-nm
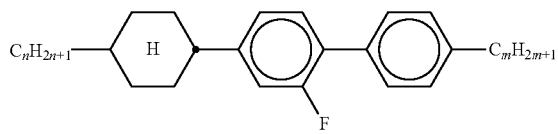
BCH-nmF
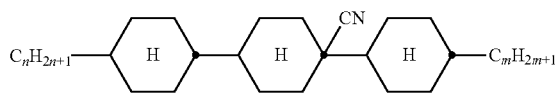
BCN-nm
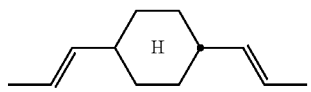
C-1V—V1
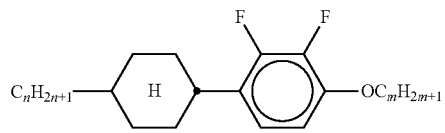
CY-n-Om
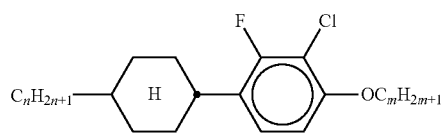
CY(F,Cl)-n-Om
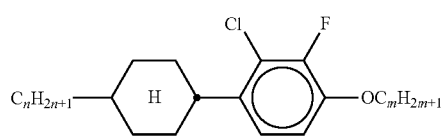
CY(Cl,F)-n-Om
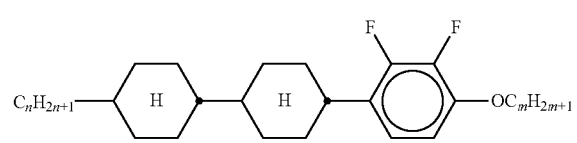
CCY-n-Om TABLE A-continued
The following abbreviations are used:
(n, m, m', z: each, independently of one another, denote 1, 2, 3, 4, 5 or 6;
(O)$C_mH_{2m+1}$ denotes O$C_mH_{2m+1}$ or $C_mH_{2m+1}$)
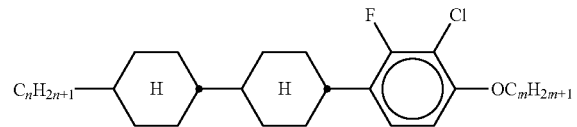
CCY(F,Cl)-n-Om
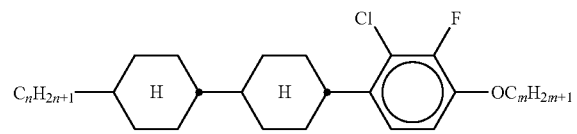
CCY(Cl,F)-n-Om
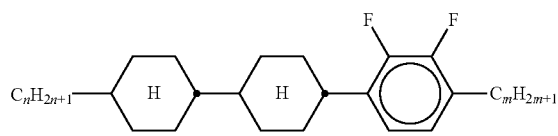
CCY-n-m
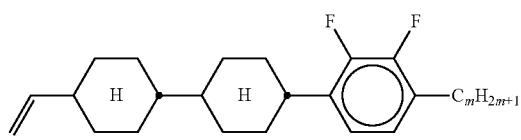
CCY—V-m
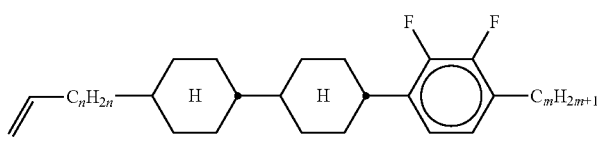
CCY—Vn-m
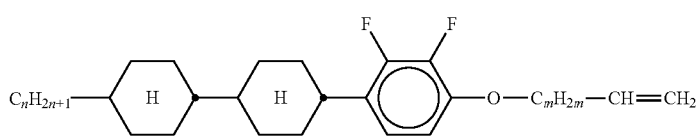
CCY-n-OmV
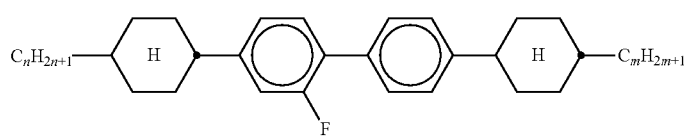
CBC-nmF
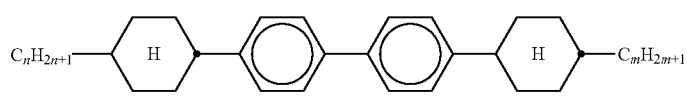
CBC-nm
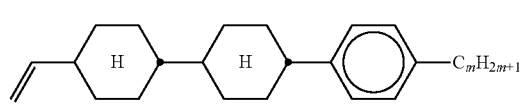
CCP—V-m TABLE A-continued
The following abbreviations are used:
(n, m, m', z: each, independently of one another, denote 1, 2, 3, 4, 5 or 6;
(O)$C_mH_{2m+1}$ denotes $OC_mH_{2m+1}$ or $C_mH_{2m+1}$)
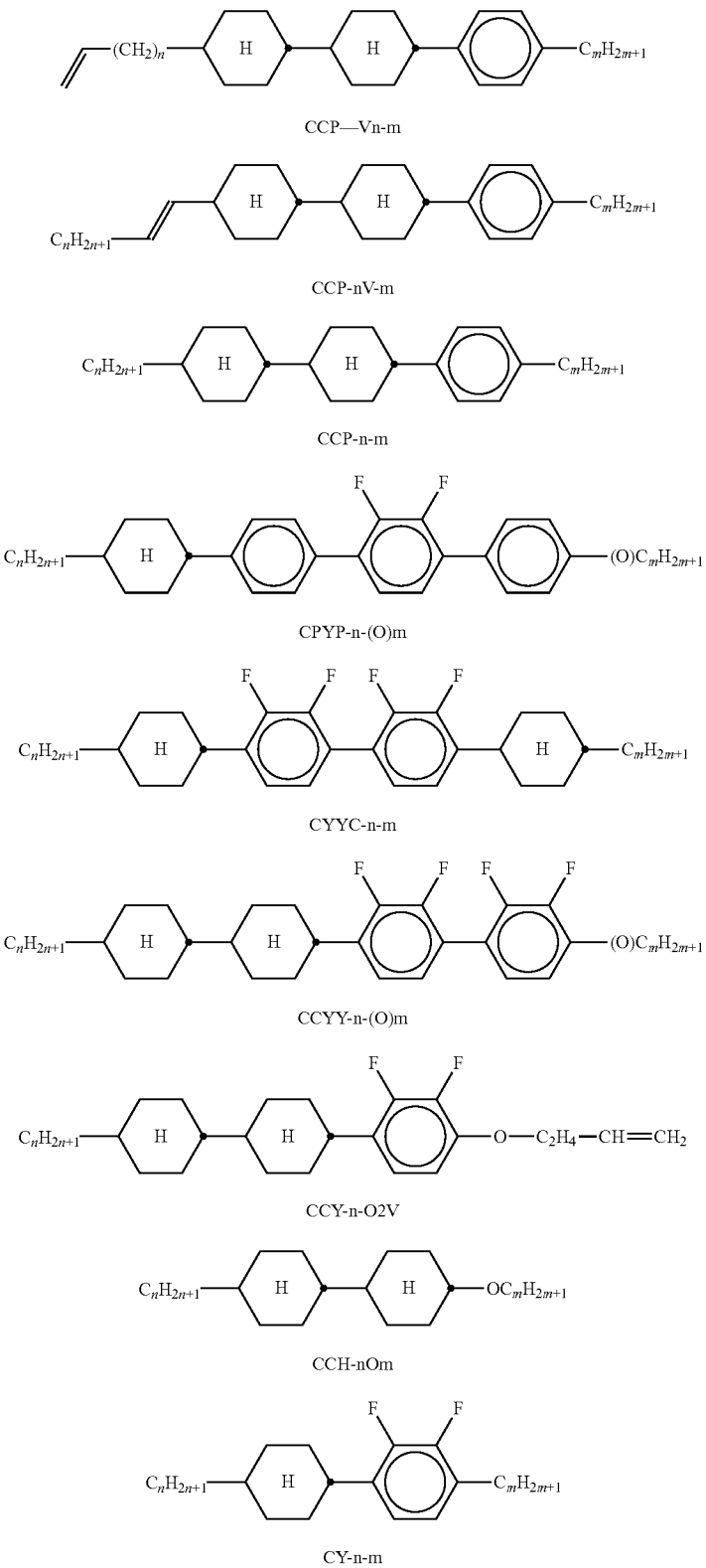

TABLE A-continued
The following abbreviations are used:
(n, m, m', z: each, independently of one another, denote 1, 2, 3, 4, 5 or 6;
(O)$C_mH_{2m+1}$ denotes $OC_mH_{2m+1}$ or $C_mH_{2m+1}$)
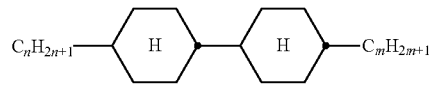
CCH-nm
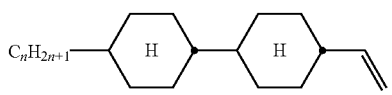
CC-n-V
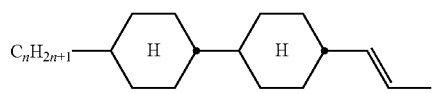
CC-n-V1
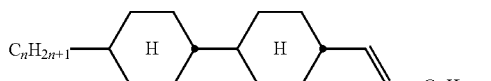
VCC-n-Vm
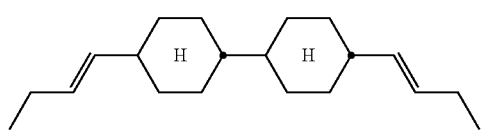
CC-2V—V2
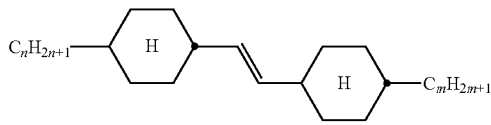
CVC-n-m
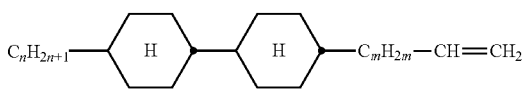
CC-n-mV
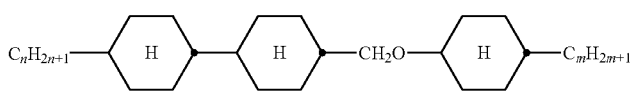
CCOC-n-m
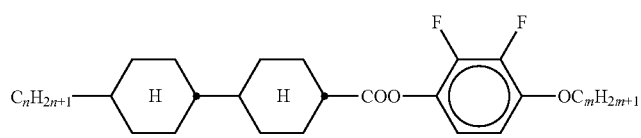
CP-nOmFF
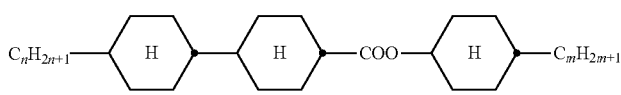
CH-nm TABLE A-continued
The following abbreviations are used:
(n, m, m', z: each, independently of one another, denote 1, 2, 3, 4, 5 or 6;
(O)$C_mH_{2m+1}$ denotes O$C_mH_{2m+1}$ or $C_mH_{2m+1}$)
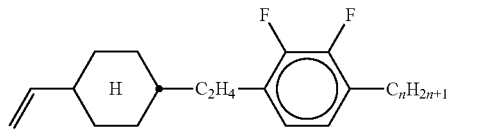
CEY—V-n
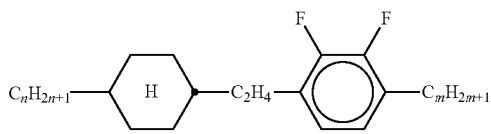
CEY-n-m
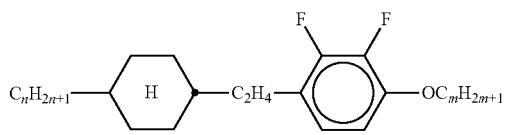
CEY-n-Om
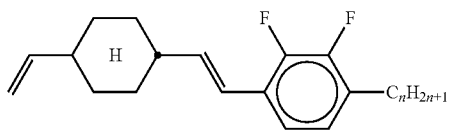
CVY—V-n
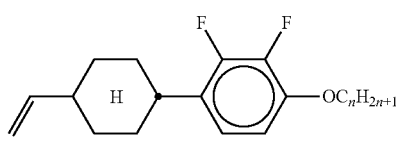
CY—V—On
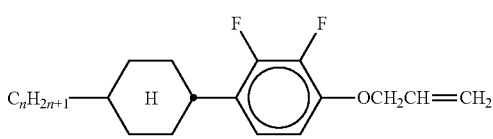
CY-n-O1V
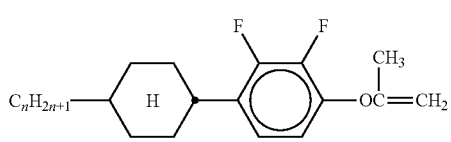
CY-n-OC(CH$_3$)=CH$_2$
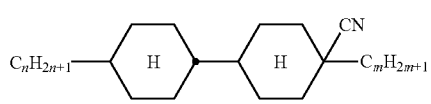
CCN-nm
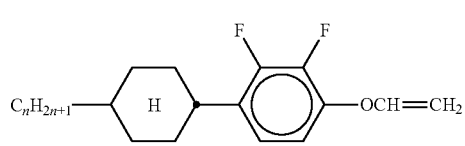

TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
CY-n-OV
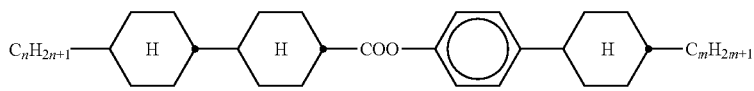
CCPC-nm
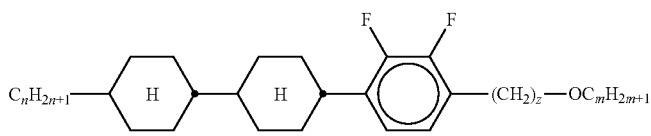
CCY-n-zOm
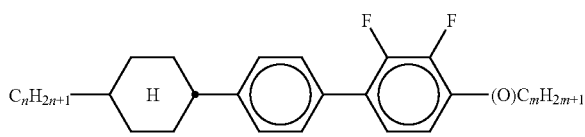
CPY-n-(O)m
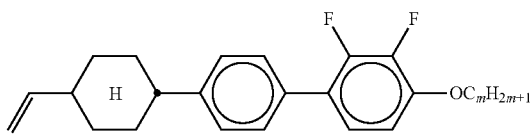
CPY—V—Om
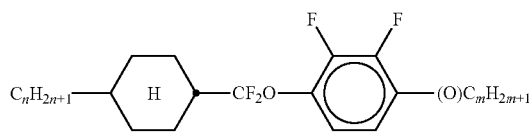
CQY-n-(O)m
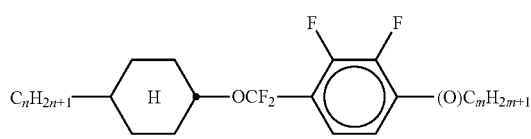
CQIY-n-(O)m
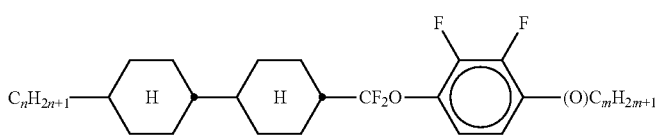
CCQY-n-(O)m
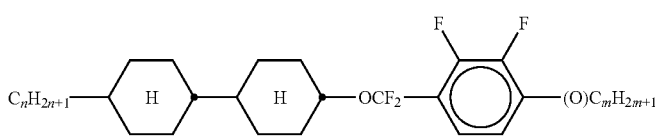
CCQIY-n-(O)m TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
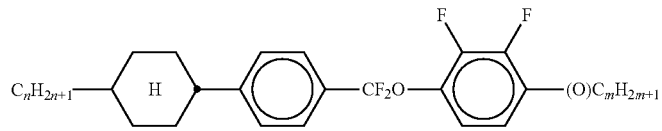
CPQY-n-(O)m
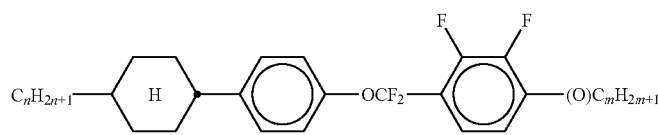
CPQIY-n-(O)m
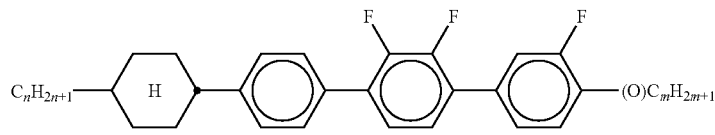
CPYG-n-(O)m
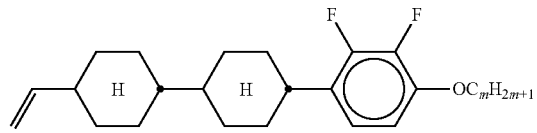
CCY—V—Om
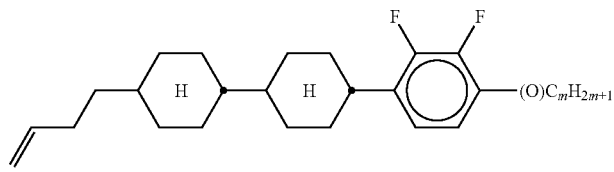
CCY—V2—(O)m
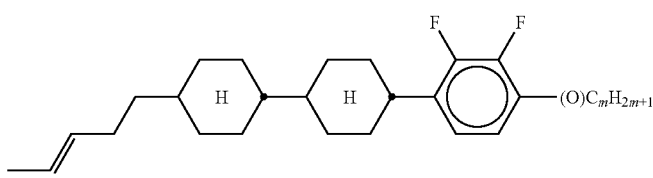
CCY—1V2—(O)m
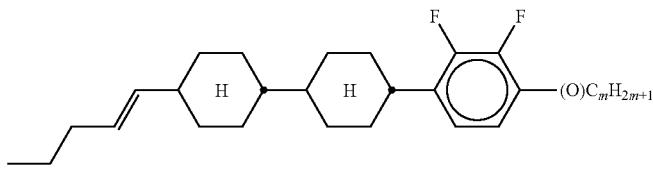
CCY—3V—(O)m
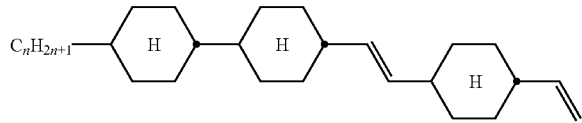
CCVC-n-V TABLE A-continued
The following abbreviations are used:
(n, m, m', z: each, independently of one another, denote 1, 2, 3, 4, 5 or 6;
(O)$C_mH_{2m+1}$ denotes $OC_mH_{2m+1}$ or $C_mH_{2m+1}$)
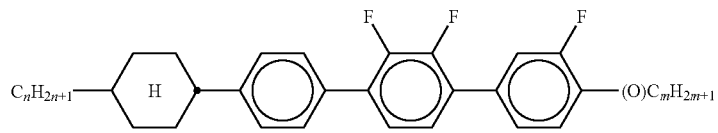
CPYG-n-(O)m
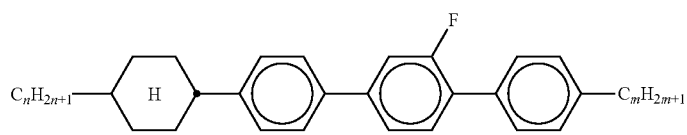
CPGP-n-m
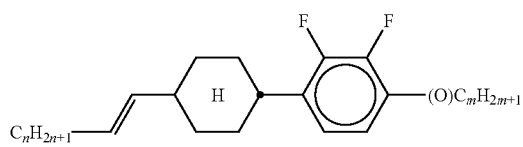
CY-nV—(O)m
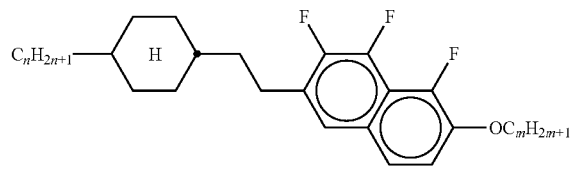
CENaph-n-Om
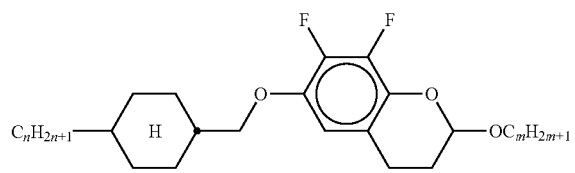
COChrom-n-Om
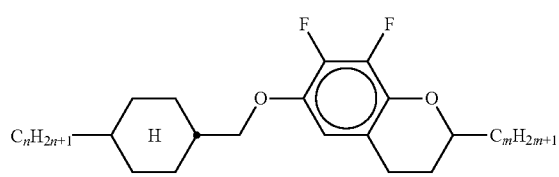
COChrom-n-m
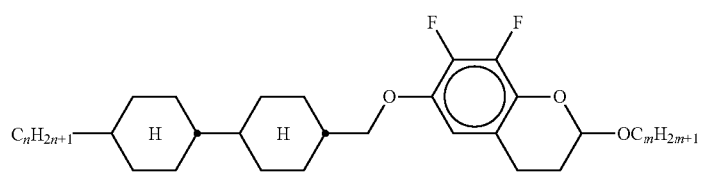
CCOChrom-n-Om TABLE A-continued
The following abbreviations are used:
(n, m, m', z: each, independently of one another, denote 1, 2, 3, 4, 5 or 6;
(O)$C_mH_{2m+1}$ denotes O$C_mH_{2m+1}$ or $C_mH_{2m+1}$)
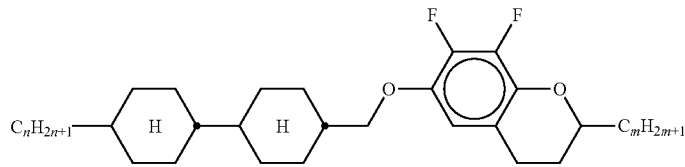
CCOChrom-n-m
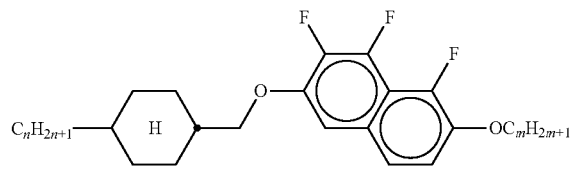
CONaph-n-Om
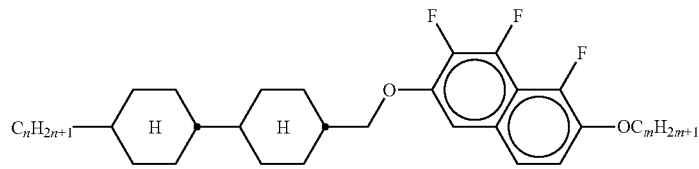
CCONaph-n-Om
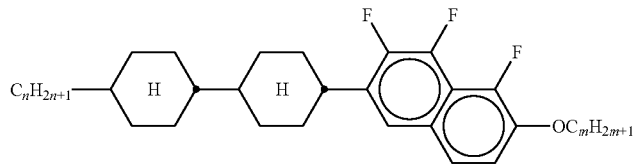
CCNaph-n-Om
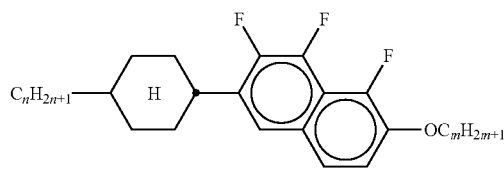
CNaph-n-Om
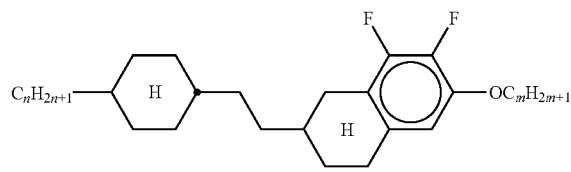
CETNaph-n-Om
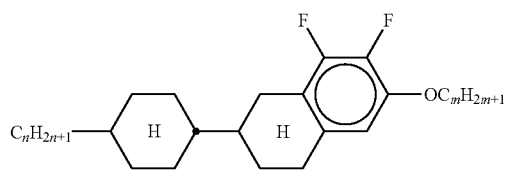
CTNaph-n-Om TABLE A-continued
The following abbreviations are used:
(n, m, m', z: each, independently of one another, denote 1, 2, 3, 4, 5 or 6;
(O)$C_mH_{2m+1}$ denotes O$C_mH_{2m+1}$ or $C_mH_{2m+1}$)
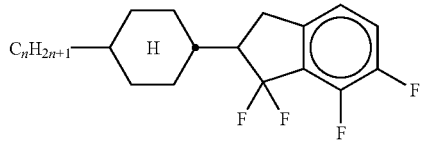
CK-n-F
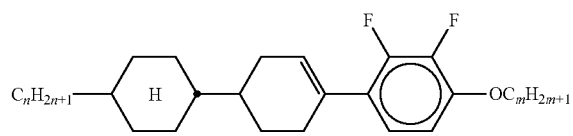
CLY-n-Om
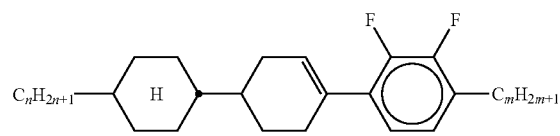
CLY-n-m
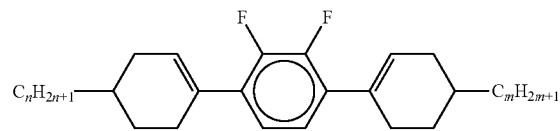
LYLI-n-m
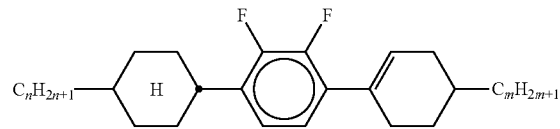
CYLI-n-m
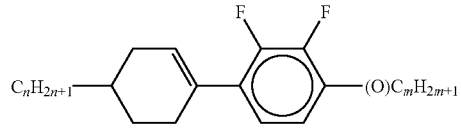
LY-n-(O)m
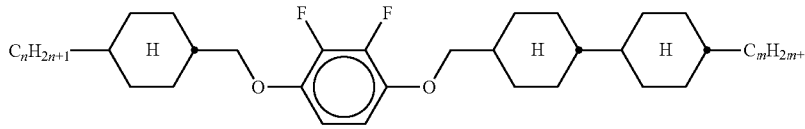
COYOICC-n-m
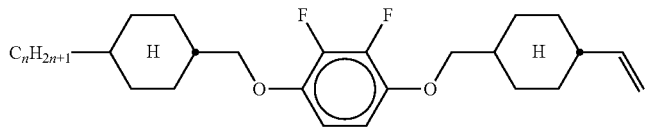
COYOIC-n-V TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
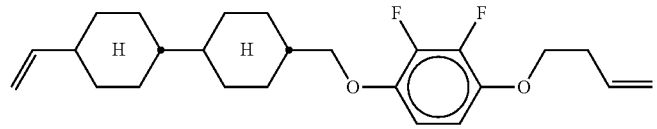
CCOY—V—O2V
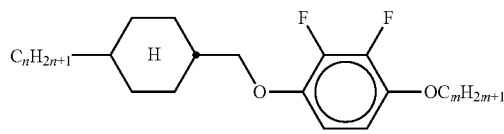
COY-n-Om
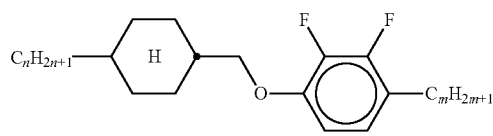
COY-n-m
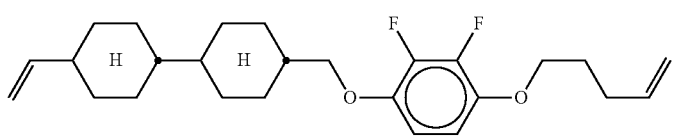
CCOY—V—O3V
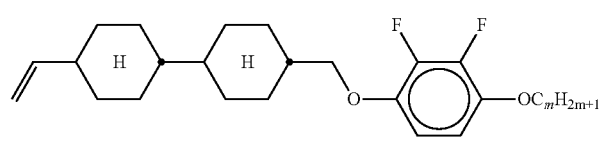
CCOY—V—Om
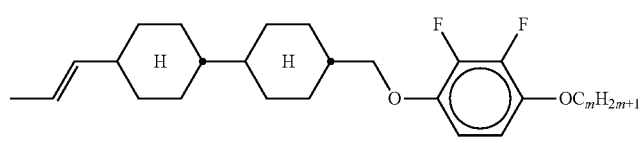
CCOY—1V—Om
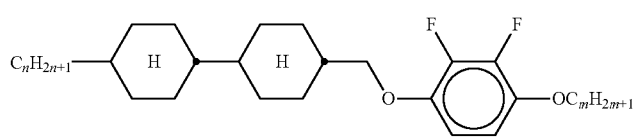
CCOY-n-Om
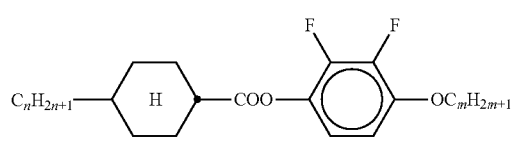
D-nOmFF
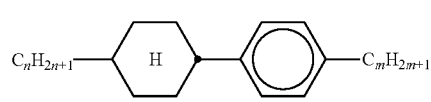

TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
PCH-nm
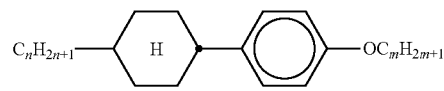
PCH-nOm
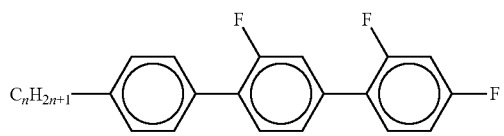
PGIGI-n-F
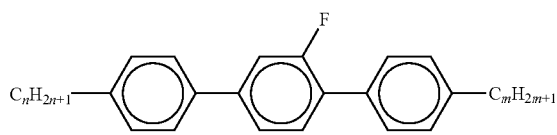
PGP-n-m
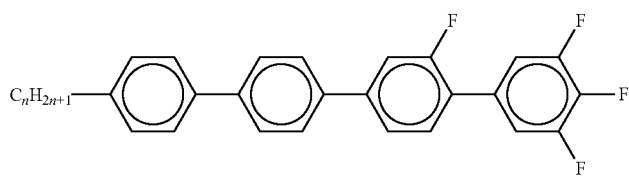
PPGU-n-F
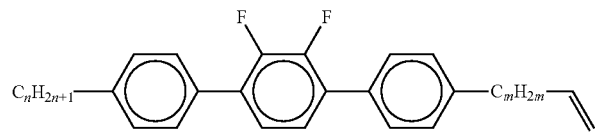
PYP-n-mV
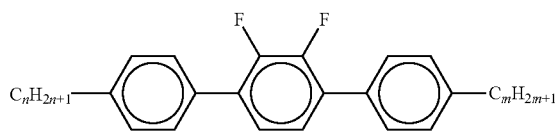
PYP-n-m
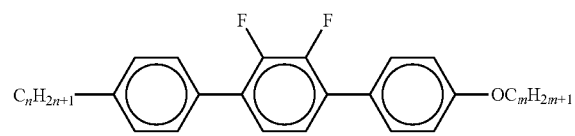
PYP-n-Om
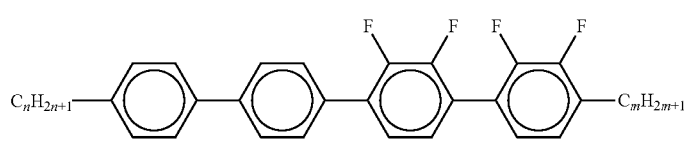
PPYY-n-m TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
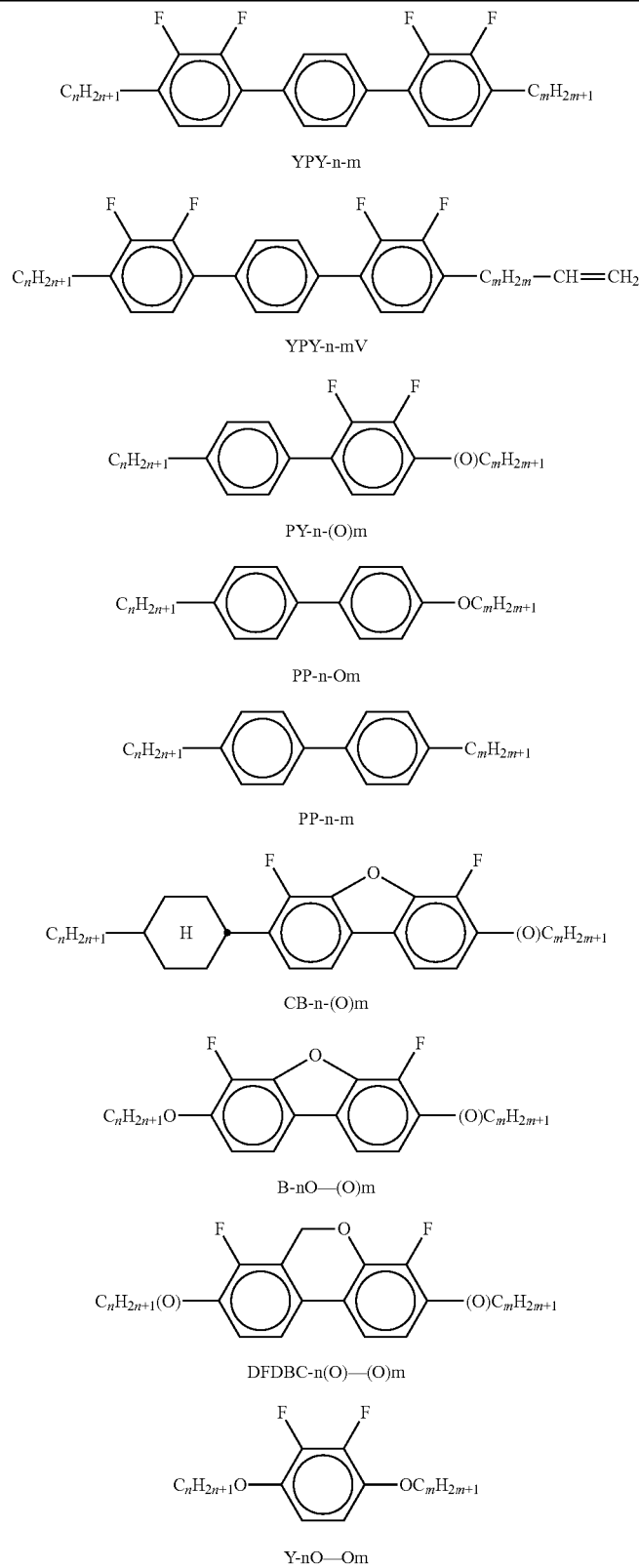

TABLE A-continued
The following abbreviations are used:
(n, m, m', z: each, independently of one another, denote 1, 2, 3, 4, 5 or 6;
(O)$C_mH_{2m+1}$ denotes $OC_mH_{2m+1}$ or $C_mH_{2m+1}$)
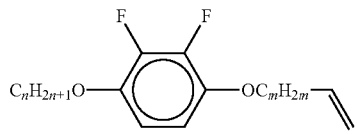
Y-nO—OmV
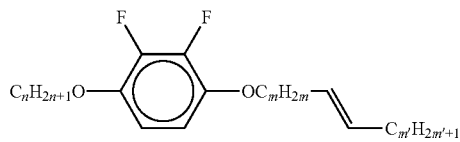
Y-nO—OmVm'
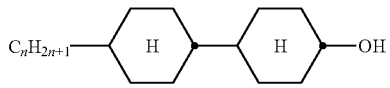
CC-n-O
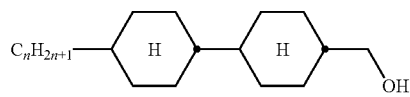
CC-n-1O
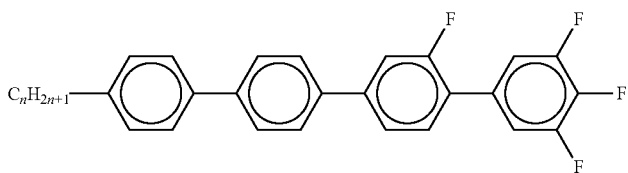
PPGU-n-F
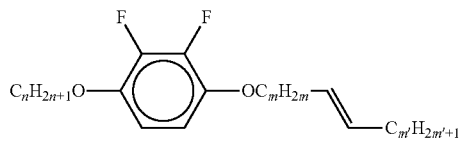
Y-nO—OmVm'
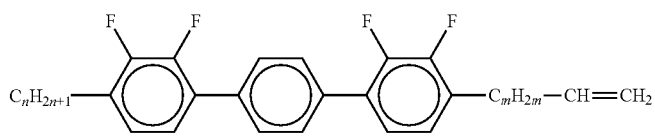
YPY-n-mV
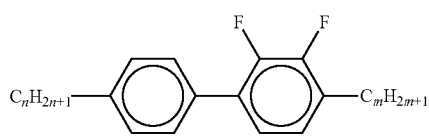
PY-n-m TABLE A-continued
The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)
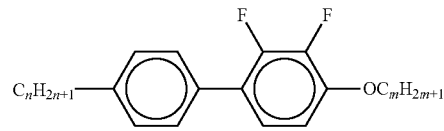
PY-n-Om
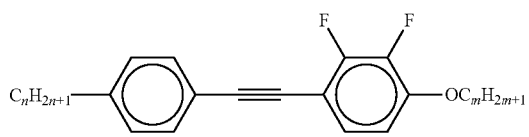
PTP-nOmFF
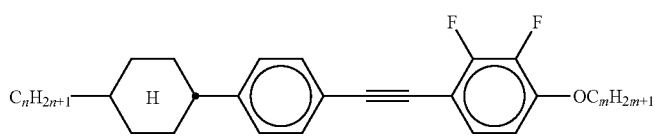
CPTP-nOmFF
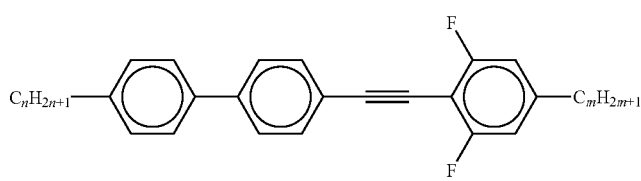
PPTUI-n-m
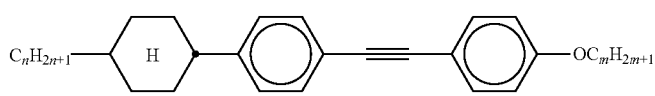
CPTP-nOm
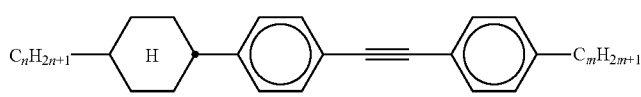
CPTP-nm
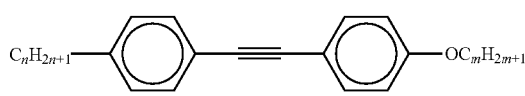
PTP-nOm
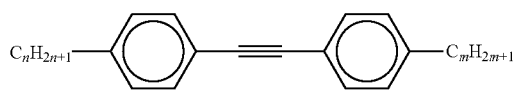
PTP-nm
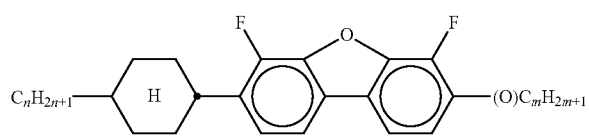
C—DFDBC-n-(O)m TABLE A-continued The following abbreviations are used:
(n, m, m', z: each, independently of one another, denote 1, 2, 3, 4, 5 or 6;
$(O)C_mH_{2m+1}$ denotes $OC_mH_{2m+1}$ or $C_mH_{2m+1}$)

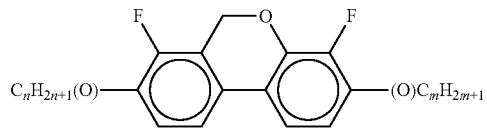

DFDBC-n(O)—(O)m

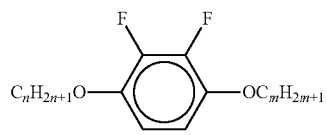

Y-nO—Om

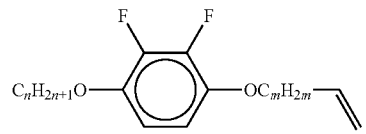

Y-nO—OmV

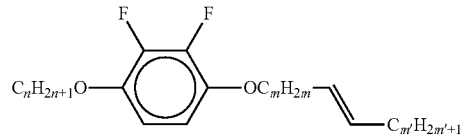

Y-nO—OmVm'

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, PM-VA, ECB, VAN, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

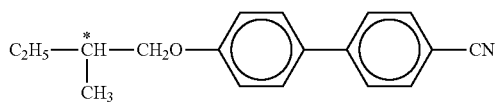

C 15

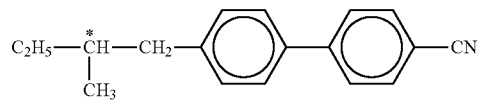

CB 15

TABLE B-continued
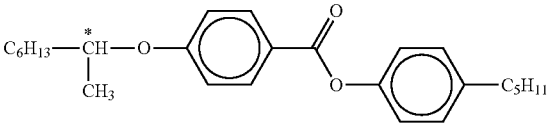 CM 21
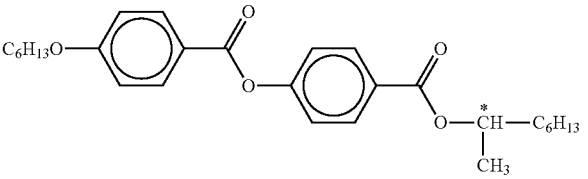 R/S-811
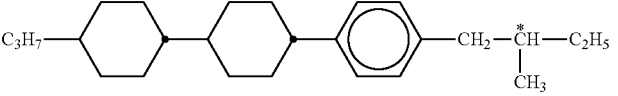 CM 44
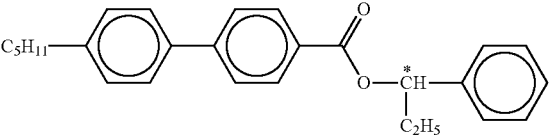 CM 45
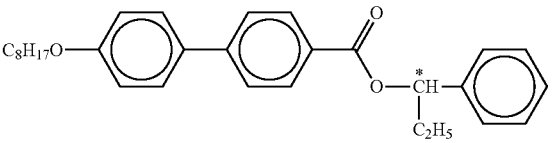 CM 47
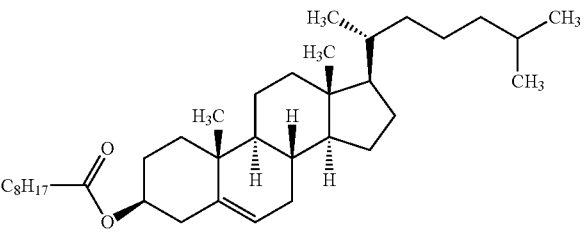 CN
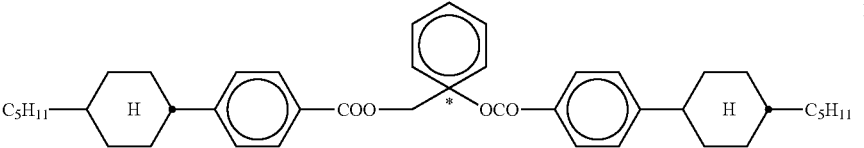 R/S-1011
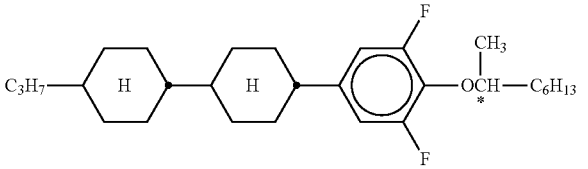 R/S-2011
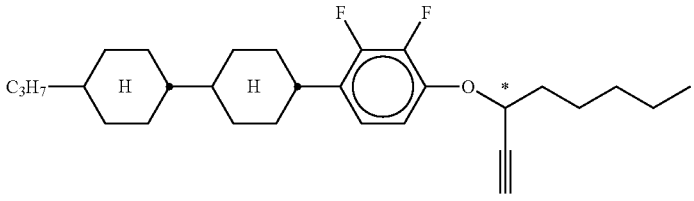 R/S-3011

TABLE B-continued

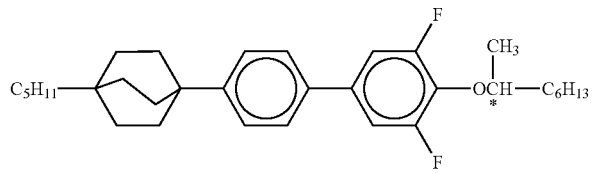 R/S-4011

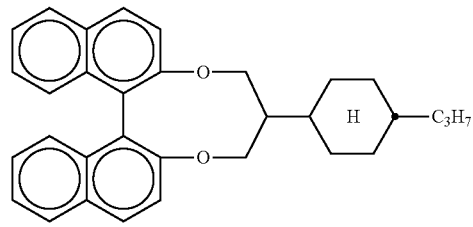 R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.

TABLE C

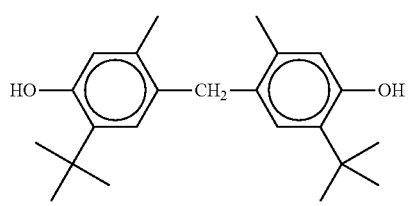

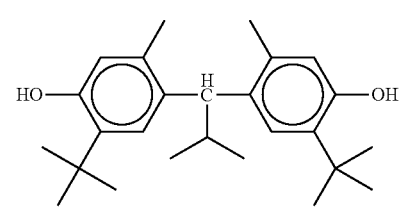

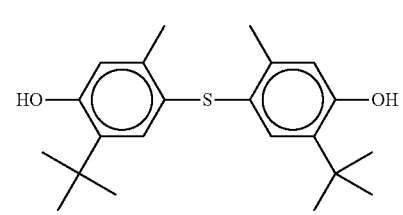

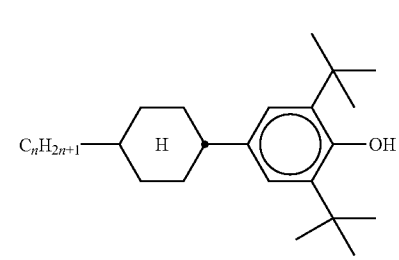

n = 1, 2, 3, 4, 5, 6 or 7

TABLE C-continued
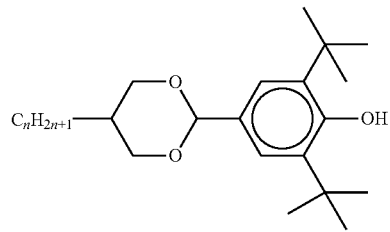
n = 1, 2, 3, 4, 5, 6 or 7
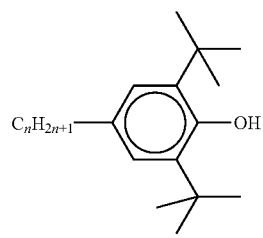
n = 1, 2, 3, 4, 5, 6 oder 7
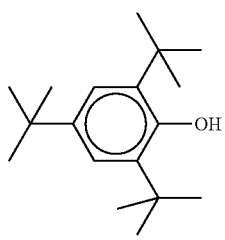
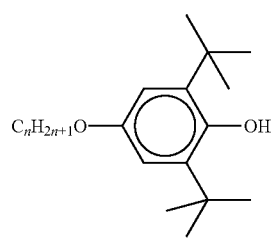
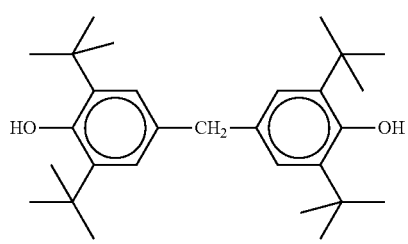
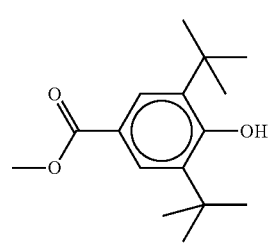

TABLE C-continued
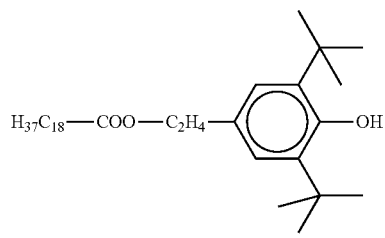
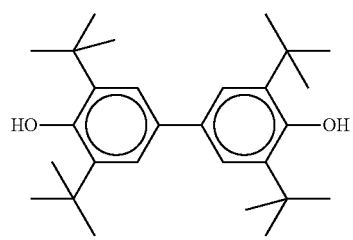
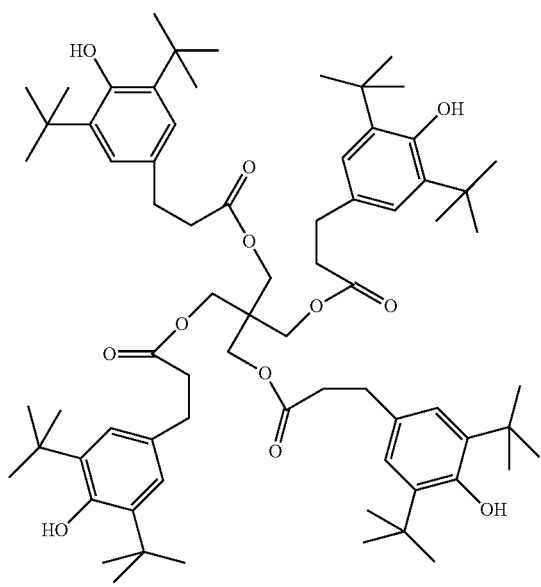 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
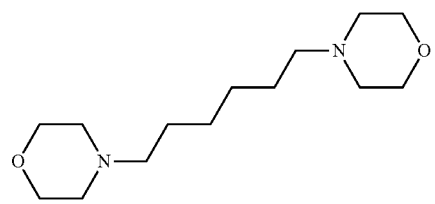 [SMILES: C(CCCN1CCOCC1)CCN1CCOCC1]
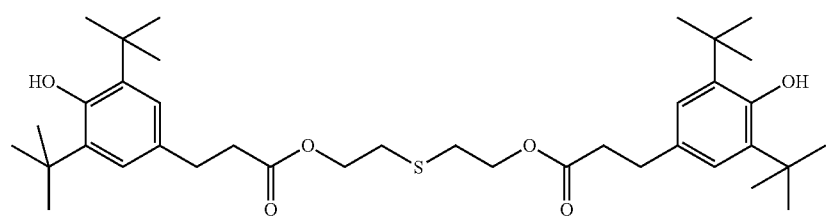 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
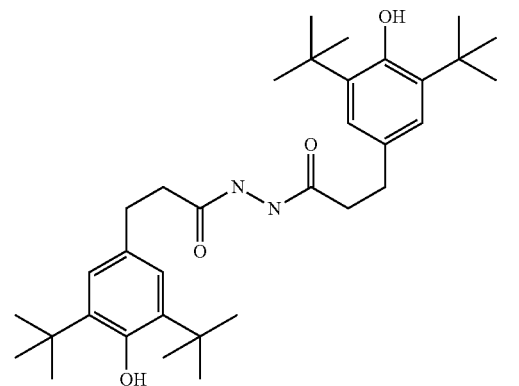 [SMILES: CC(C)(C)c1cc(CCC(=O)NNC(=O)CCc2cc(C(C)(C)C)c(O)c(C(C)(C)C)c2)cc(C(C)(C)C)c1O]
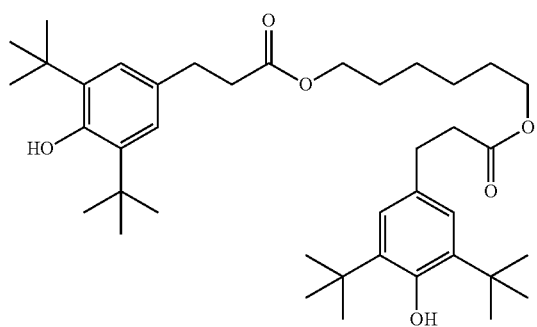 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
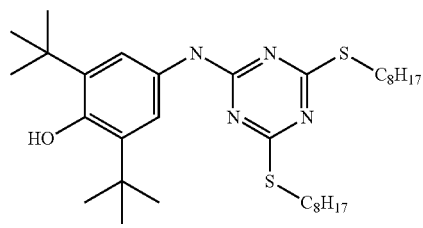
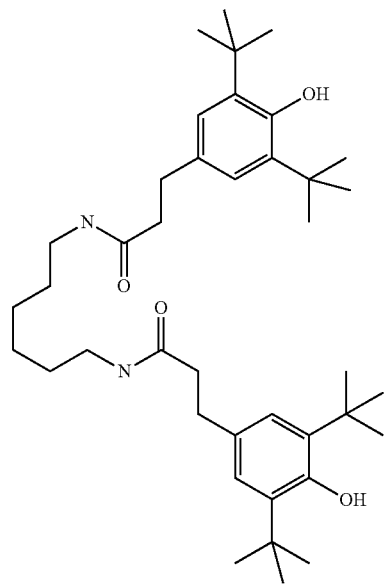 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
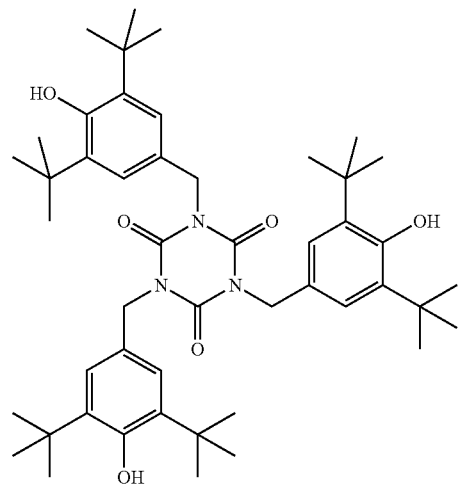 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
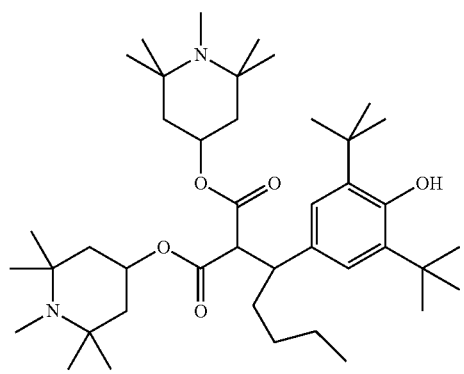 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
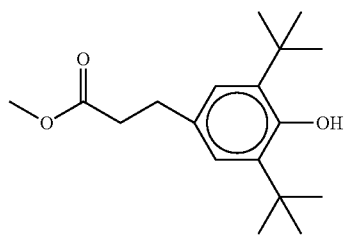
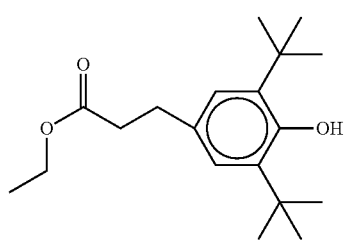
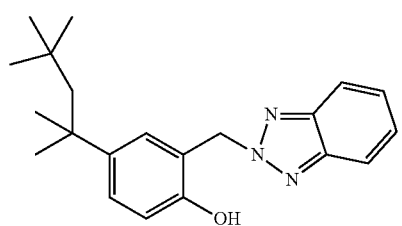 [SMILES: CC(C)(C)CC(C)(C)c1ccc(O)c(Cn2nc3ccccc3n2)c1]

TABLE C-continued
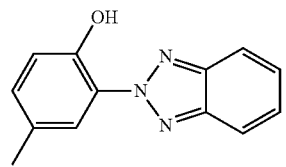 [SMILES: Cc1ccc(O)c(-n2nc3ccccc3n2)c1]
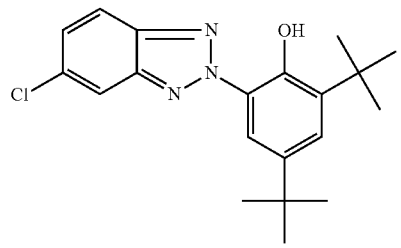 [SMILES: CC(C)(C)c1cc(-n2nc3ccc(Cl)cc3n2)c(O)c(C(C)(C)C)c1]
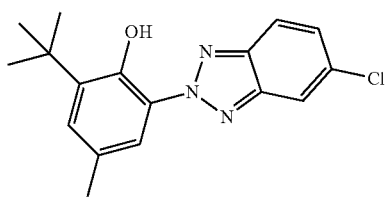 [SMILES: Cc1cc(-n2nc3ccc(Cl)cc3n2)c(O)c(C(C)(C)C)c1]
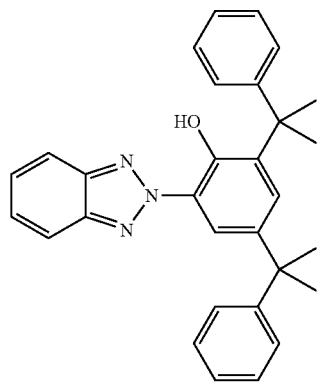 [SMILES: CC(C)(c1ccccc1)c1cc(-n2nc3ccccc3n2)c(O)c(C(C)(C)c2ccccc2)c1]
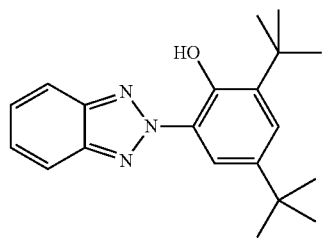 [SMILES: CC(C)(C)c1cc(-n2nc3ccccc3n2)c(O)c(C(C)(C)C)c1]
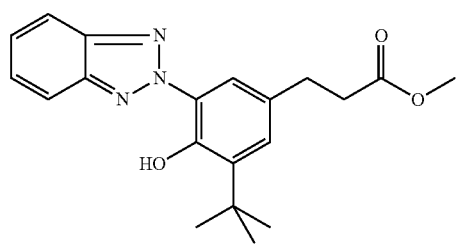 [SMILES: COC(=O)CCc1cc(-n2nc3ccccc3n2)c(O)c(C(C)(C)C)c1]

TABLE C-continued
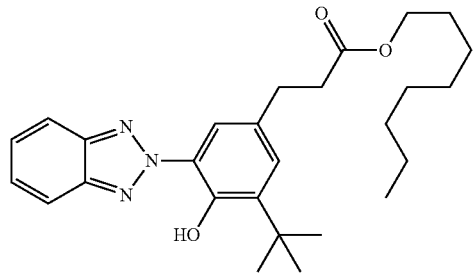 [SMILES: CCCCCCCCOC(=O)CCc1cc(-n2nc3ccccc3n2)c(O)c(C(C)(C)C)c1]
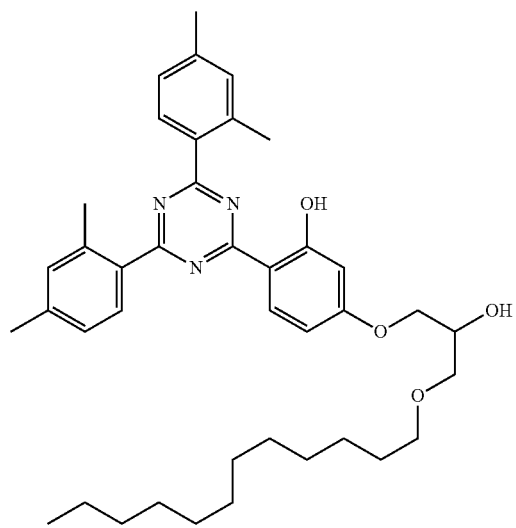 [SMILES: CCCCCCCCCCCCOCC(O)COc1ccc(-c2nc(-c3ccc(C)cc3C)nc(-c3ccc(C)cc3C)n2)c(O)c1]
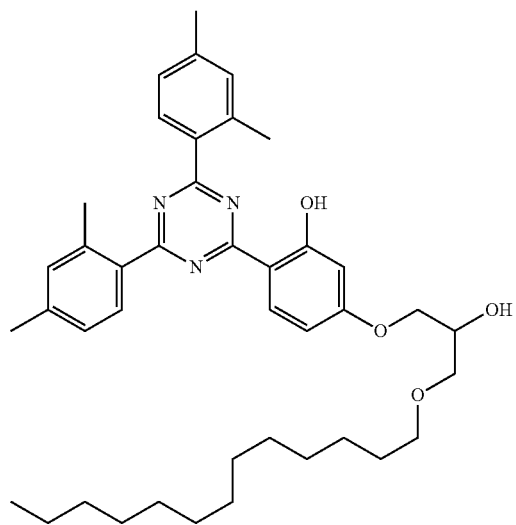 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
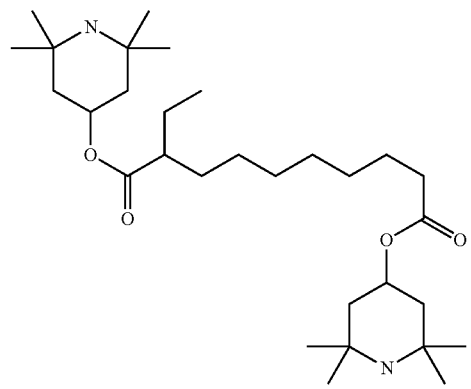
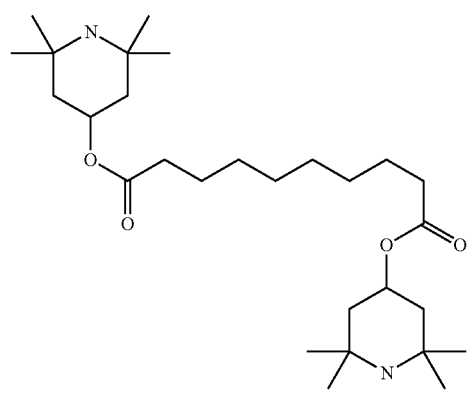
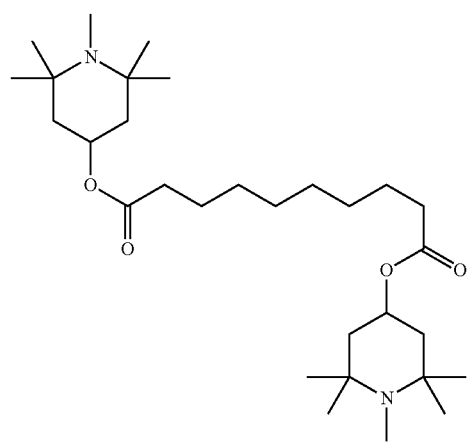

TABLE C-continued
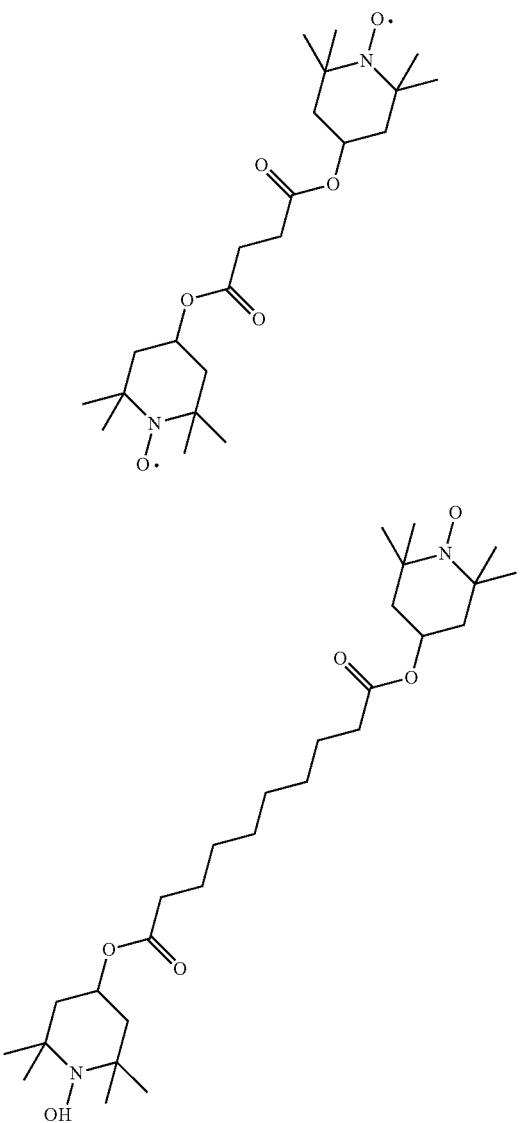
(n denotes 1-12)
TABLE D
Suitable reactive mesogens for use in the mixtures according to the invention, preferably in PSA and PS-VA applications are shown below:
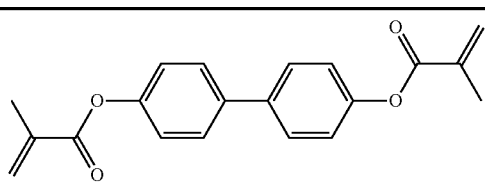
RM-1
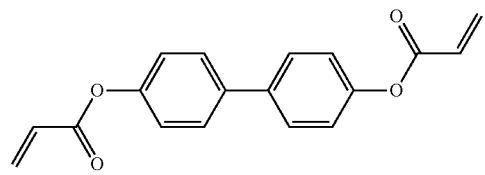
RM-2

TABLE D-continued
Suitable reactive mesogens for use in the mixtures according to the invention,
preferably in PSA and PS-VA applications are shown below:
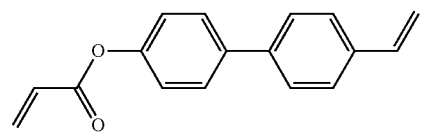 [SMILES: C=CC(=O)Oc1ccc(-c2ccc(C=C)cc2)cc1] RM-3
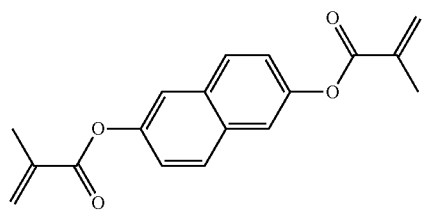 [SMILES: C=C(C)C(=O)Oc1ccc2cc(OC(=O)C(=C)C)ccc2c1] RM-4
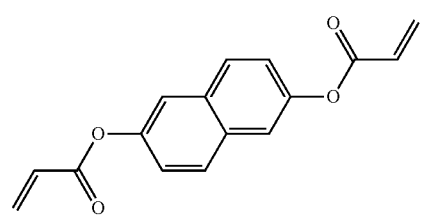 [SMILES: C=CC(=O)Oc1ccc2cc(OC(=O)C=C)ccc2c1] RM-5
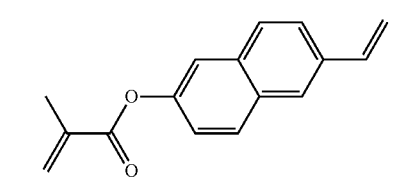 [SMILES: C=Cc1ccc2cc(OC(=O)C(=C)C)ccc2c1] RM-6
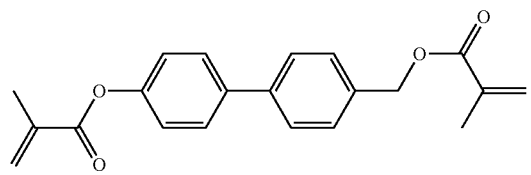 [SMILES: C=C(C)C(=O)OCc1ccc(-c2ccc(OC(=O)C(=C)C)cc2)cc1] RM-7
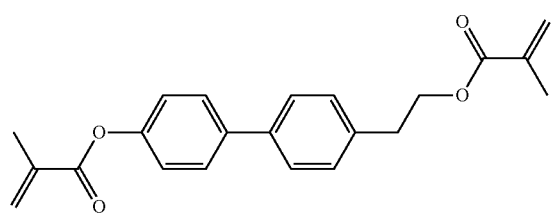 [SMILES: C=C(C)C(=O)OCCc1ccc(-c2ccc(OC(=O)C(=C)C)cc2)cc1] RM-8
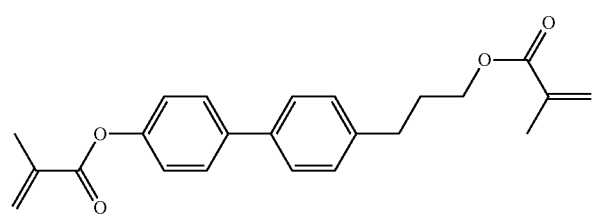 [SMILES: C=C(C)C(=O)OCCCc1ccc(-c2ccc(OC(=O)C(=C)C)cc2)cc1] RM-9
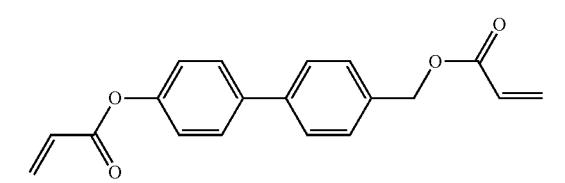 [SMILES: C=CC(=O)OCc1ccc(-c2ccc(OC(=O)C=C)cc2)cc1] RM-10

TABLE D-continued
Suitable reactive mesogens for use in the mixtures according to the invention, preferably in PSA and PS-VA applications are shown below:
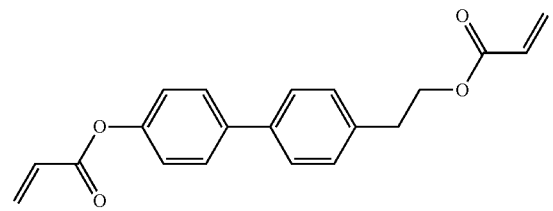 [SMILES: C=CC(=O)OCCc1ccc(-c2ccc(OC(=O)C=C)cc2)cc1] RM-11
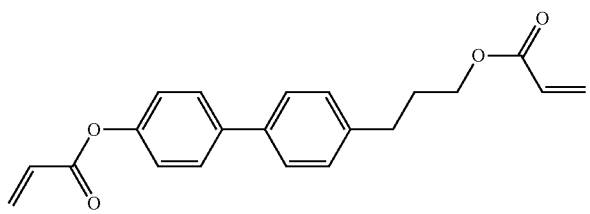 [SMILES: C=CC(=O)OCCCc1ccc(-c2ccc(OC(=O)C=C)cc2)cc1] RM-12
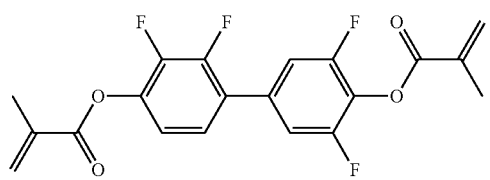 RM-13
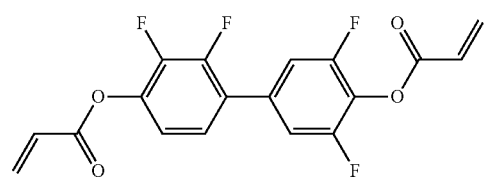 [SMILES: C=CC(=O)Oc1ccc(-c2cc(F)c(OC(=O)C=C)c(F)c2)c(F)c1F] RM-14
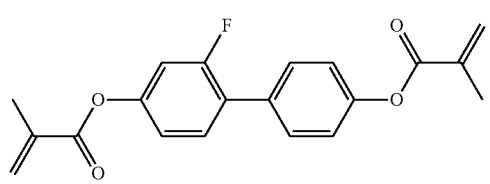 RM-15
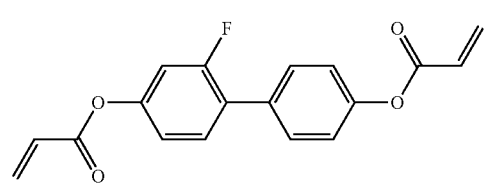 RM-16
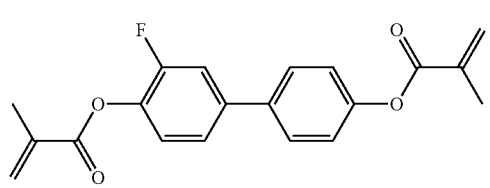 [SMILES: C=C(C)C(=O)Oc1ccc(-c2ccc(OC(=O)C(=C)C)c(F)c2)cc1] RM-17
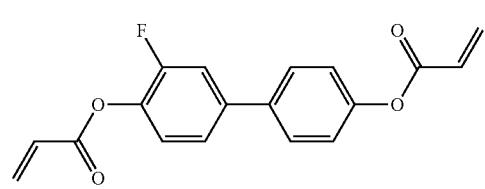 [SMILES: C=CC(=O)Oc1ccc(-c2ccc(OC(=O)C=C)c(F)c2)cc1] RM-18

TABLE D-continued
Suitable reactive mesogens for use in the mixtures according to the invention, preferably in PSA and PS-VA applications are shown below:
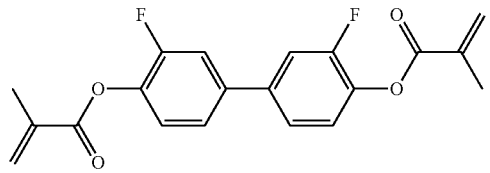 RM-19
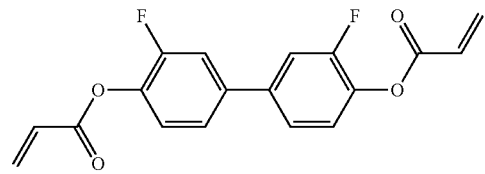 RM-20
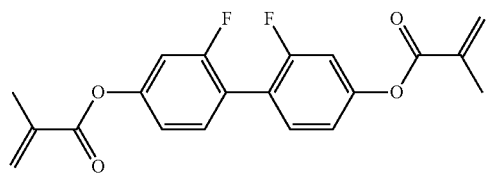 RM-21
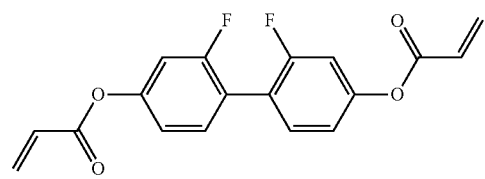 [SMILES: C=CC(=O)Oc1ccc(-c2ccc(OC(=O)C=C)cc2F)c(F)c1] RM-22
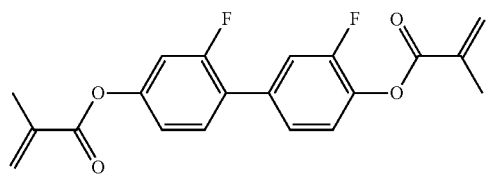 RM-23
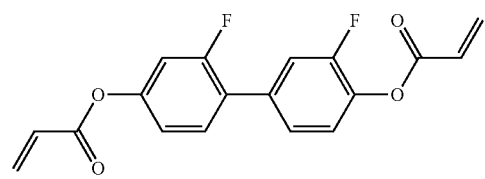 [SMILES: C=CC(=O)Oc1ccc(-c2ccc(OC(=O)C=C)c(F)c2)c(F)c1] RM-24
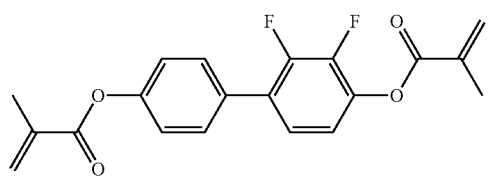 RM-25
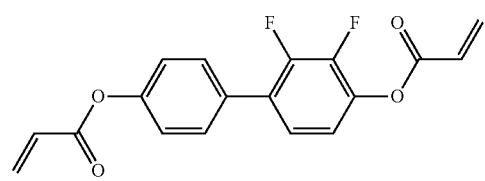 [SMILES: C=CC(=O)Oc1ccc(-c2ccc(OC(=O)C=C)c(F)c2F)cc1] RM-26

TABLE D-continued
Suitable reactive mesogens for use in the mixtures according to the invention, preferably in PSA and PS-VA applications are shown below:
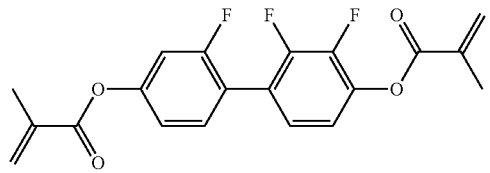 [SMILES: C=C(C)C(=O)Oc1ccc(-c2ccc(OC(=O)C(=C)C)c(F)c2F)c(F)c1]
RM-27
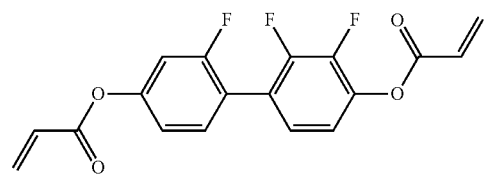
RM-28
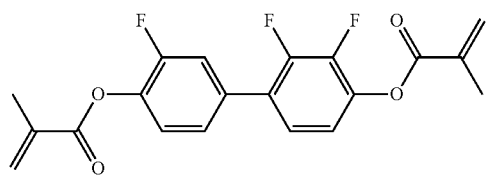
RM-29
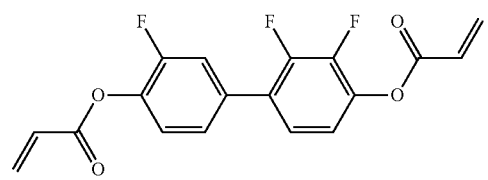
RM-30
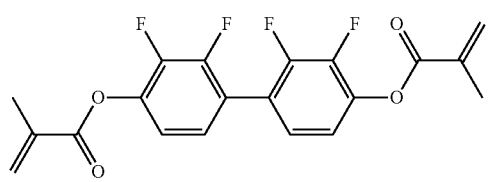 [SMILES: C=C(C)C(=O)Oc1ccc(-c2ccc(OC(=O)C(=C)C)c(F)c2F)c(F)c1F]
RM-31
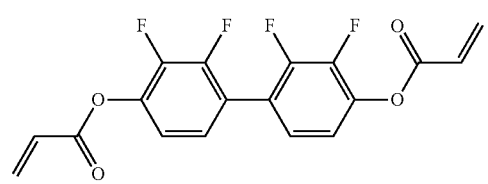
RM-32
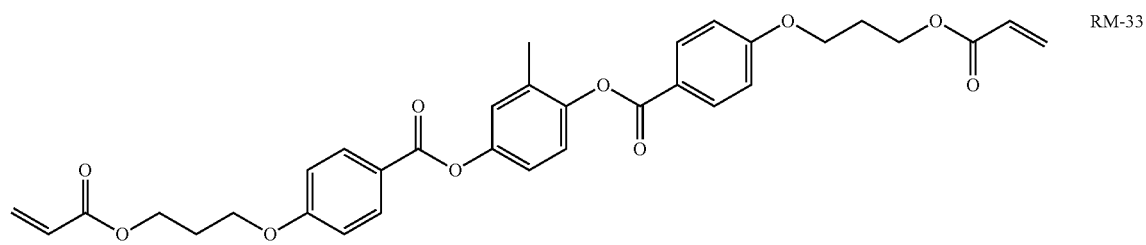
RM-33

TABLE D-continued
Suitable reactive mesogens for use in the mixtures according to the invention, preferably in PSA and PS-VA applications are shown below:
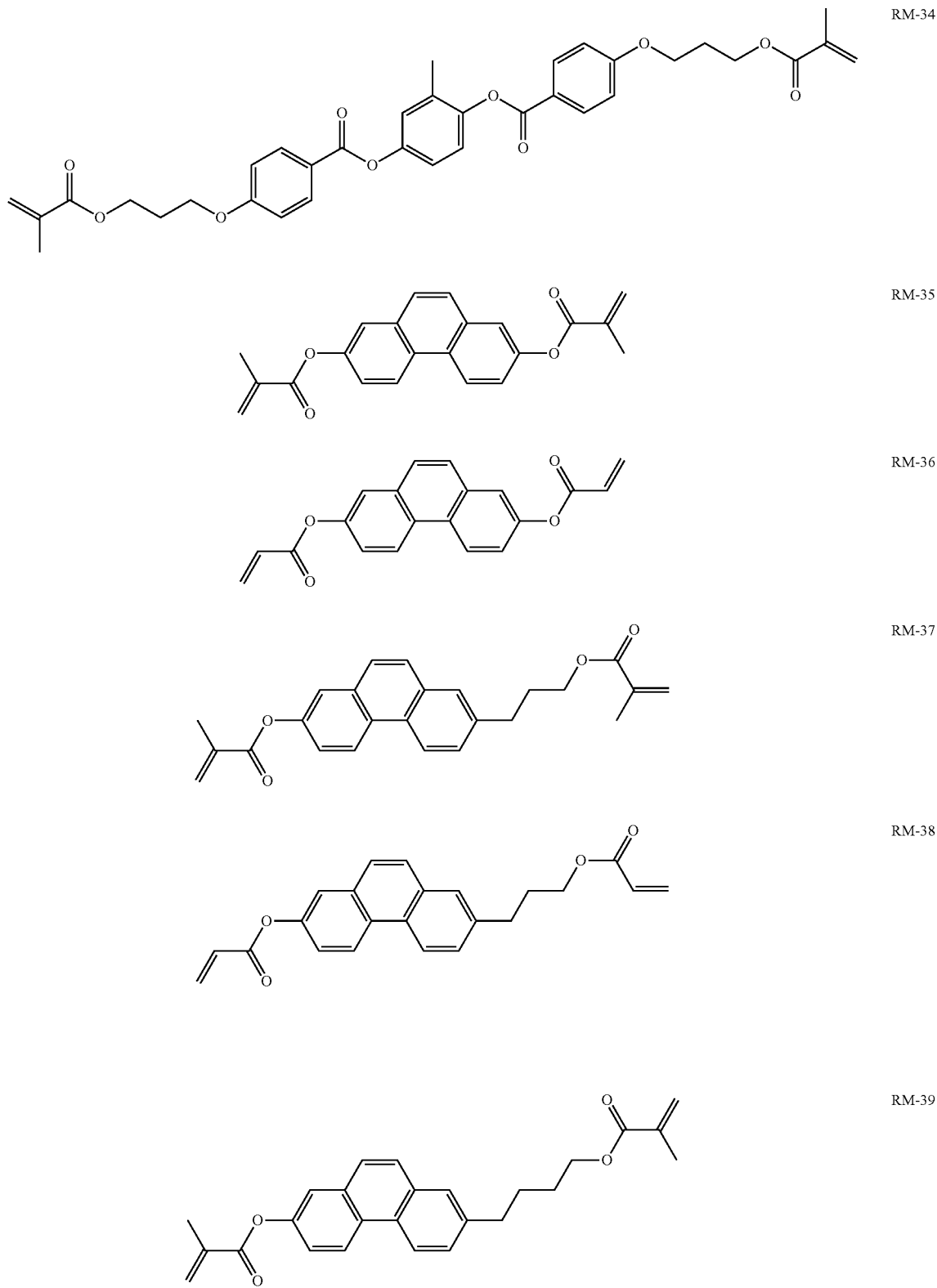

TABLE D-continued
Suitable reactive mesogens for use in the mixtures according to the invention, preferably in PSA and PS-VA applications are shown below:
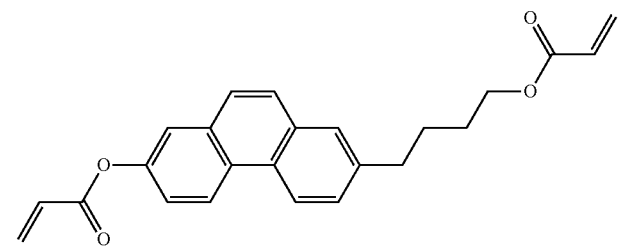 [SMILES: C=CC(=O)OCCCCc1ccc2c(ccc3cc(OC(=O)C=C)ccc32)c1] RM-40
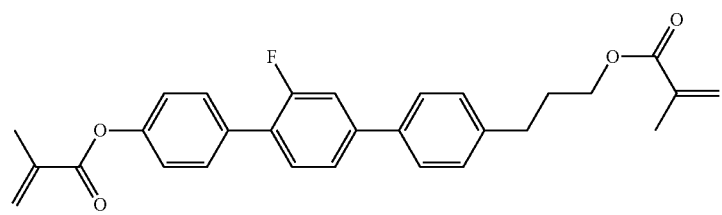 [SMILES: C=C(C)C(=O)OCCCc1ccc(-c2ccc(-c3ccc(OC(=O)C(=C)C)cc3)c(F)c2)cc1] RM-41
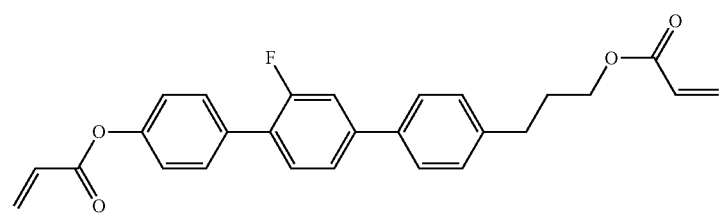 [SMILES: C=CC(=O)OCCCc1ccc(-c2ccc(-c3ccc(OC(=O)C=C)cc3)c(F)c2)cc1] RM-42
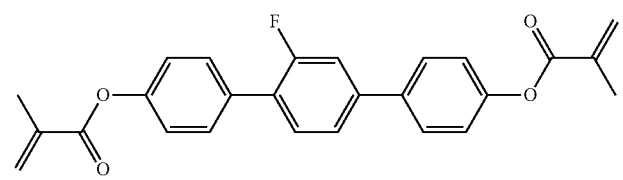 [SMILES: C=C(C)C(=O)Oc1ccc(-c2ccc(-c3ccc(OC(=O)C(=C)C)cc3)c(F)c2)cc1] RM-43
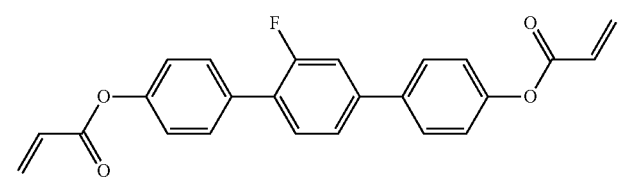 [SMILES: C=CC(=O)Oc1ccc(-c2ccc(-c3ccc(OC(=O)C=C)cc3)c(F)c2)cc1] RM-44
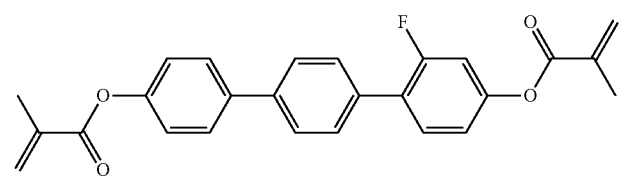 RM-45
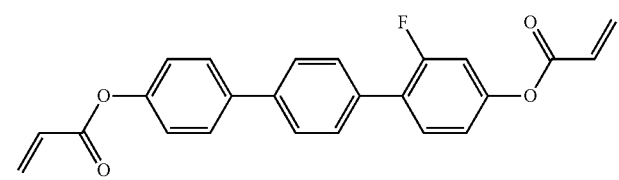 [SMILES: C=CC(=O)Oc1ccc(-c2ccc(-c3ccc(OC(=O)C=C)cc3F)cc2)cc1] RM-46

TABLE D-continued
Suitable reactive mesogens for use in the mixtures according to the invention,
preferably in PSA and PS-VA applications are shown below:
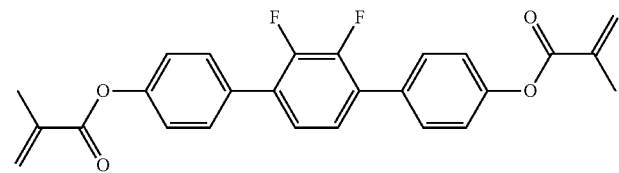
RM-47
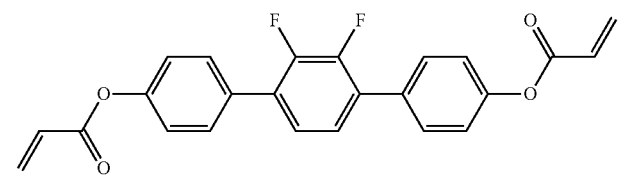 [SMILES: C=CC(=O)Oc1ccc(-c2ccc(-c3ccc(OC(=O)C=C)cc3)c(F)c2F)cc1]
RM-48
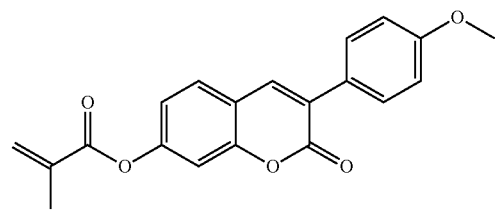 [SMILES: C=C(C)C(=O)Oc1ccc2cc(-c3ccc(OC)cc3)c(=O)oc2c1]
RM-49
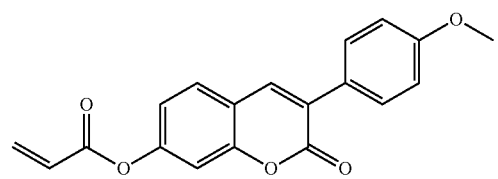 [SMILES: C=CC(=O)Oc1ccc2cc(-c3ccc(OC)cc3)c(=O)oc2c1]
RM-50
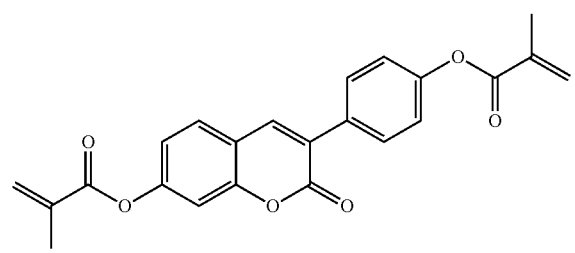 [SMILES: C=C(C)C(=O)Oc1ccc(-c2cc3ccc(OC(=O)C(=C)C)cc3oc2=O)cc1]
RM-51
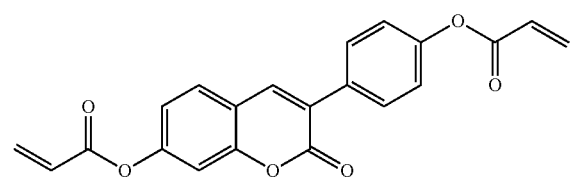 [SMILES: C=CC(=O)Oc1ccc(-c2cc3ccc(OC(=O)C=C)cc3oc2=O)cc1]
RM-52
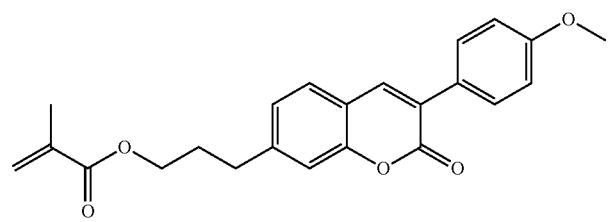 [SMILES: C=C(C)C(=O)OCCCc1ccc2cc(-c3ccc(OC)cc3)c(=O)oc2c1]
RM-53

TABLE D-continued
Suitable reactive mesogens for use in the mixtures according to the invention, preferably in PSA and PS-VA applications are shown below:
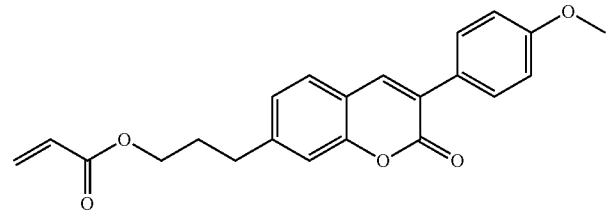 [SMILES: C=CC(=O)OCCCc1ccc2cc(-c3ccc(OC)cc3)c(=O)oc2c1] RM-54
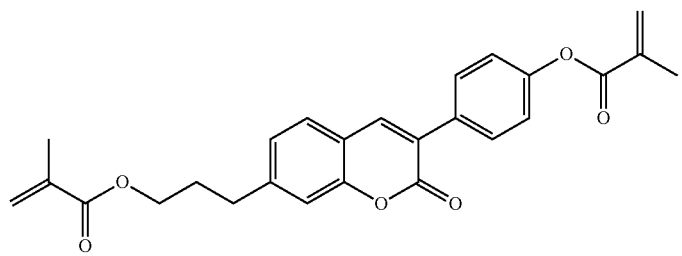 [SMILES: C=C(C)C(=O)OCCCc1ccc2cc(-c3ccc(OC(=O)C(=C)C)cc3)c(=O)oc2c1] RM-55
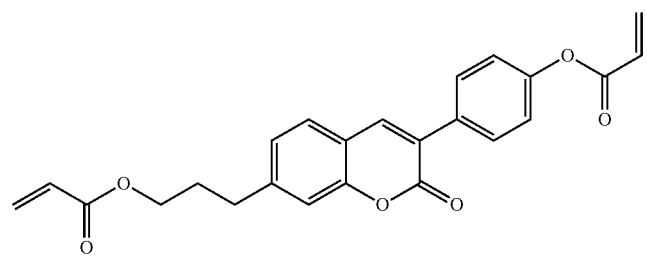 [SMILES: C=CC(=O)OCCCc1ccc2cc(-c3ccc(OC(=O)C=C)cc3)c(=O)oc2c1] RM-56
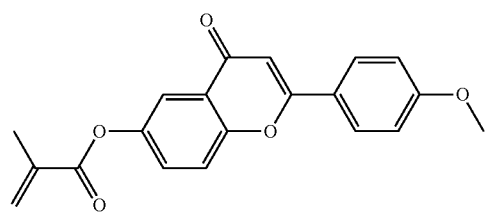 [SMILES: C=C(C)C(=O)Oc1ccc2oc(-c3ccc(OC)cc3)cc(=O)c2c1] RM-57
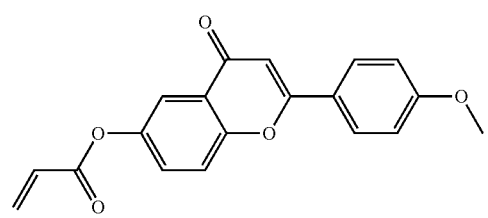 [SMILES: C=CC(=O)Oc1ccc2oc(-c3ccc(OC)cc3)cc(=O)c2c1] RM-58
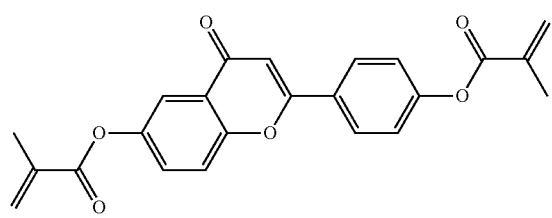 [SMILES: C=C(C)C(=O)Oc1ccc(-c2cc(=O)c3cc(OC(=O)C(=C)C)ccc3o2)cc1] RM-59

TABLE D-continued
Suitable reactive mesogens for use in the mixtures according to the invention, preferably in PSA and PS-VA applications are shown below:
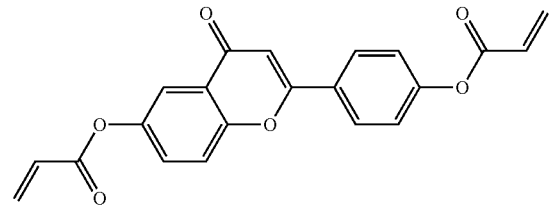 [SMILES: C=CC(=O)Oc1ccc(-c2cc(=O)c3cc(OC(=O)C=C)ccc3o2)cc1]
RM-60
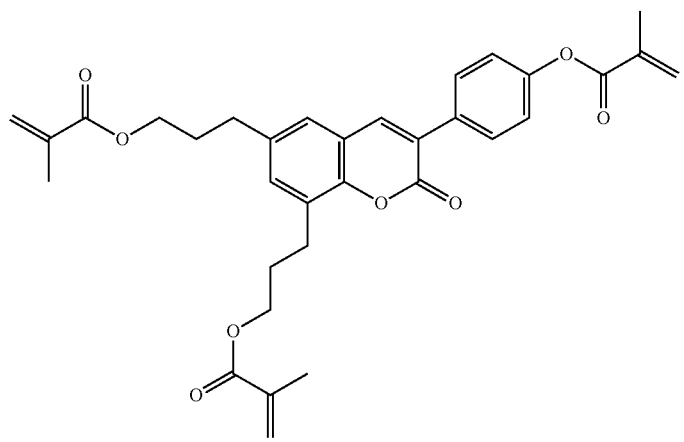 [SMILES: C=C(C)C(=O)OCCCc1cc(CCCOC(=O)C(=C)C)c2oc(=O)c(-c3ccc(OC(=O)C(=C)C)cc3)cc2c1]
RM-61
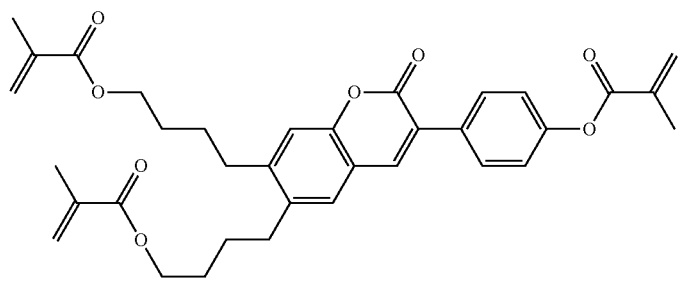 [SMILES: C=C(C)C(=O)OCCCCc1cc2cc(-c3ccc(OC(=O)C(=C)C)cc3)c(=O)oc2cc1CCCCOC(=O)C(=C)C]
RM-62
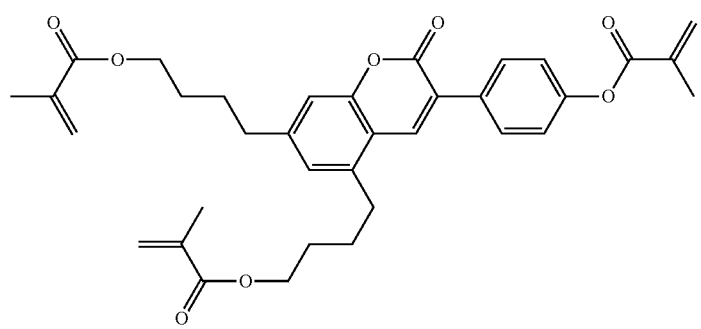 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63
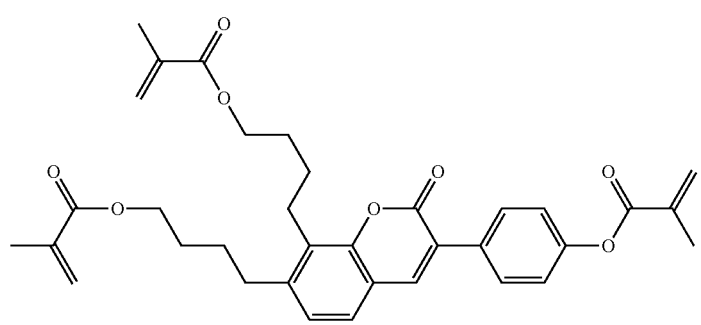 [SMILES: C=C(C)C(=O)OCCCCc1ccc2cc(-c3ccc(OC(=O)C(=C)C)cc3)c(=O)oc2c1CCCCOC(=O)C(=C)C]
RM-64

TABLE D-continued
Suitable reactive mesogens for use in the mixtures according to the invention,
preferably in PSA and PS-VA applications are shown below:
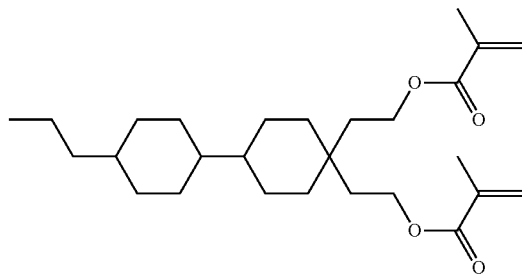 [SMILES: C=C(C)C(=O)OCCC1(CCOC(=O)C(=C)C)CCC(C2CCC(CCC)CC2)CC1] RM-65
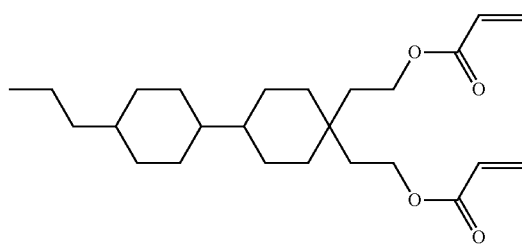 [SMILES: C=CC(=O)OCCC1(CCOC(=O)C=C)CCC(C2CCC(CCC)CC2)CC1] RM-66
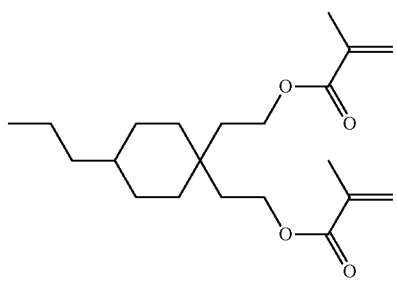 [SMILES: C=C(C)C(=O)OCCC1(CCOC(=O)C(=C)C)CCC(CCC)CC1] RM-67
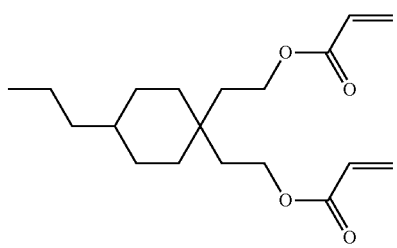 [SMILES: C=CC(=O)OCCC1(CCOC(=O)C=C)CCC(CCC)CC1] RM-68
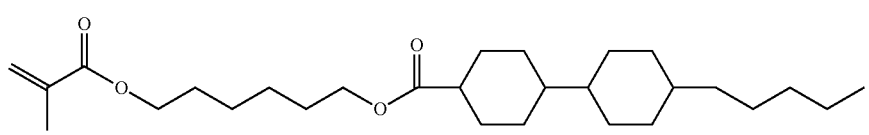 [SMILES: C=C(C)C(=O)OCCCCCCOC(=O)C1CCC(C2CCC(CCCCC)CC2)CC1] RM-69
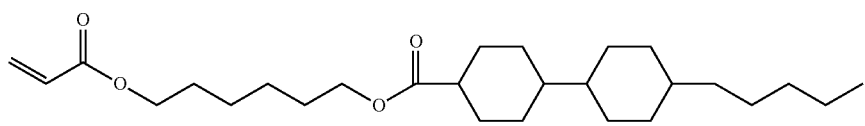 RM-70
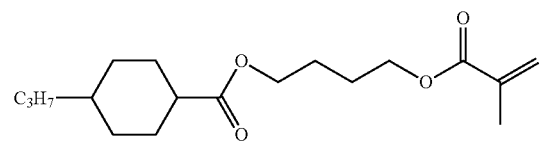 RM-71

TABLE D-continued
Suitable reactive mesogens for use in the mixtures according to the invention, preferably in PSA and PS-VA applications are shown below:
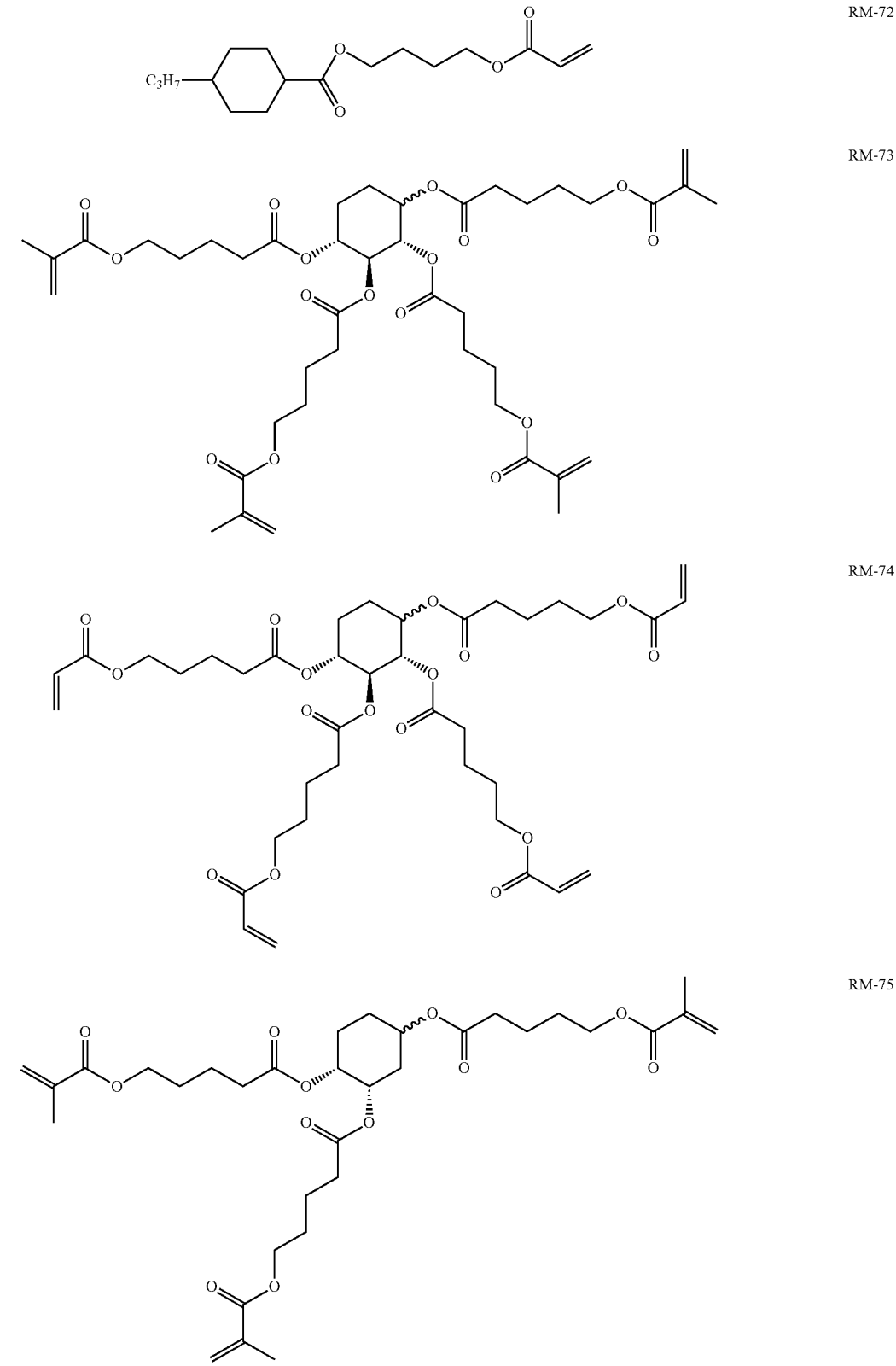
RM-72
RM-73
RM-74
RM-75

TABLE D-continued
Suitable reactive mesogens for use in the mixtures according to the invention, preferably in PSA and PS-VA applications are shown below:
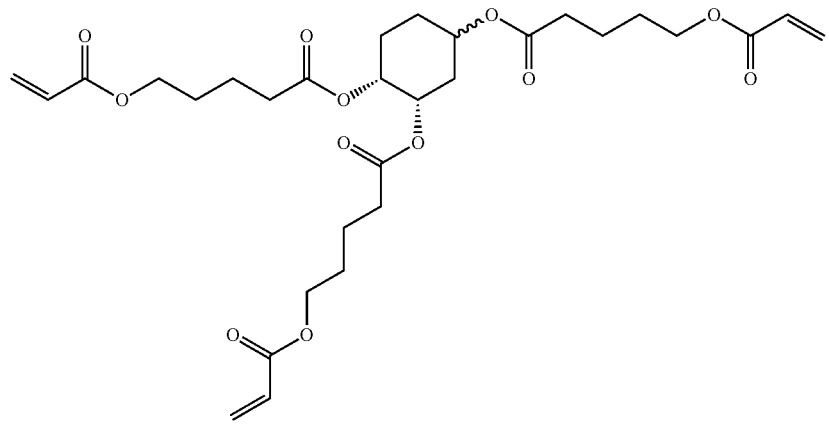 [SMILES: C=CC(=O)OCCCCC(=O)OC1CC[C@@H](OC(=O)CCCCOC(=O)C=C)[C@@H](OC(=O)CCCCOC(=O)C=C)C1]
RM-76
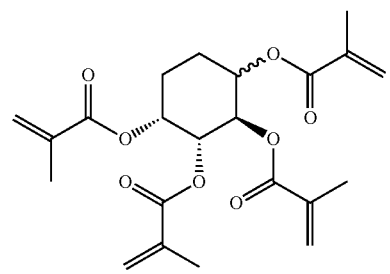 [SMILES: C=C(C)C(=O)OC1CC[C@@H](OC(=O)C(=C)C)[C@@H](OC(=O)C(=C)C)[C@@H]1OC(=O)C(=C)C]
RM-77
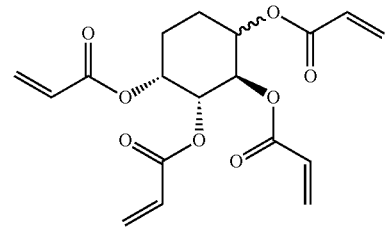 [SMILES: C=CC(=O)OC1CC[C@@H](OC(=O)C=C)[C@@H](OC(=O)C=C)[C@@H]1OC(=O)C=C]
RM-78
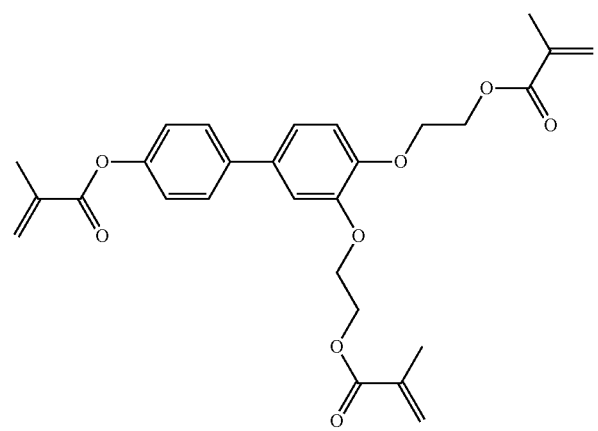 [SMILES: C=C(C)C(=O)OCCOc1ccc(-c2ccc(OC(=O)C(=C)C)cc2)cc1OCCOC(=O)C(=C)C]
RM-79

TABLE D-continued
Suitable reactive mesogens for use in the mixtures according to the invention, preferably in PSA and PS-VA applications are shown below:
RM-80
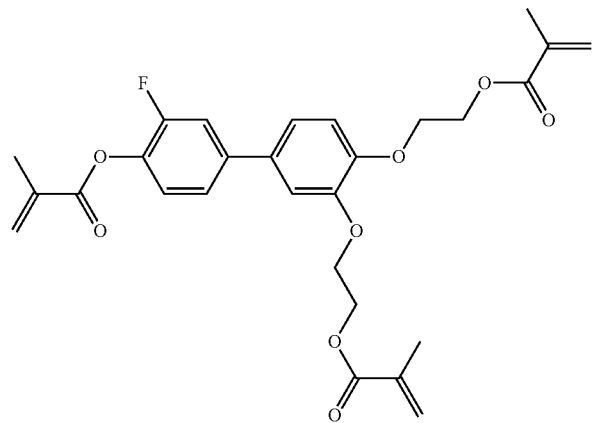 [SMILES: C=C(C)C(=O)OCCOc1ccc(-c2ccc(OC(=O)C(=C)C)c(F)c2)cc1OCCOC(=O)C(=C)C]
RM-81
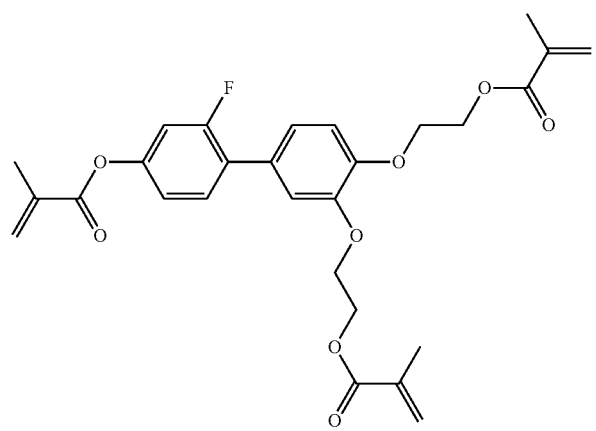 [SMILES: C=C(C)C(=O)OCCOc1ccc(-c2ccc(OC(=O)C(=C)C)cc2F)cc1OCCOC(=O)C(=C)C]
RM-82
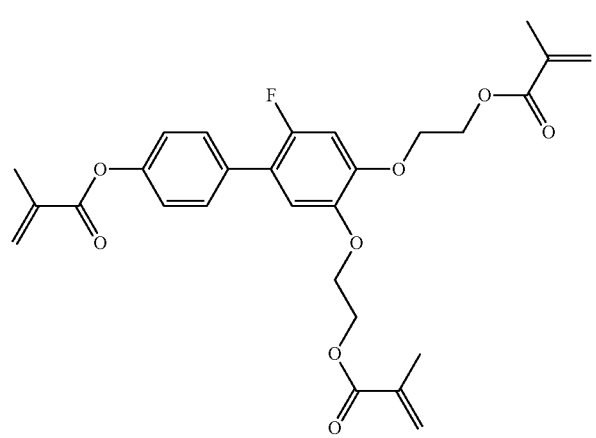 [SMILES: C=C(C)C(=O)OCCOc1cc(F)c(-c2ccc(OC(=O)C(=C)C)cc2)cc1OCCOC(=O)C(=C)C]

TABLE D-continued
Suitable reactive mesogens for use in the mixtures according to the invention, preferably in PSA and PS-VA applications are shown below:
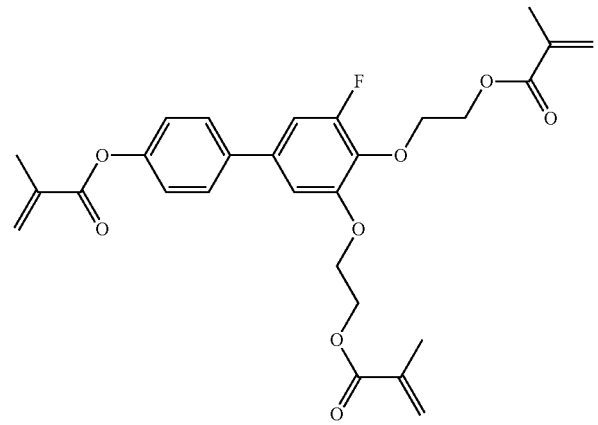 [SMILES: C=C(C)C(=O)OCCOc1cc(-c2ccc(OC(=O)C(=C)C)cc2)cc(F)c1OCCOC(=O)C(=C)C]
RM-83
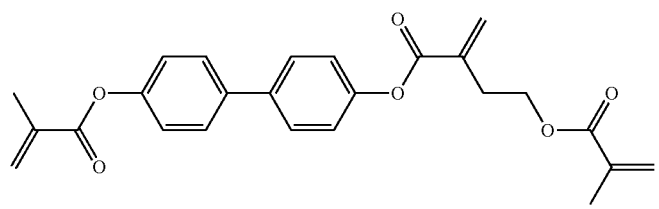
RM-84
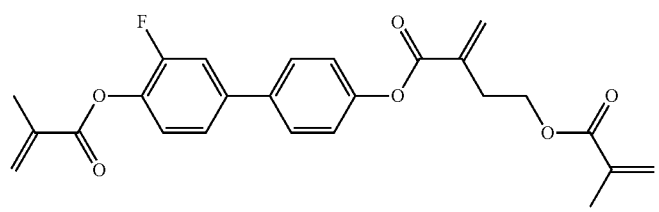 [SMILES: C=C(C)C(=O)OCCC(=C)C(=O)Oc1ccc(-c2ccc(OC(=O)C(=C)C)c(F)c2)cc1]
RM-85
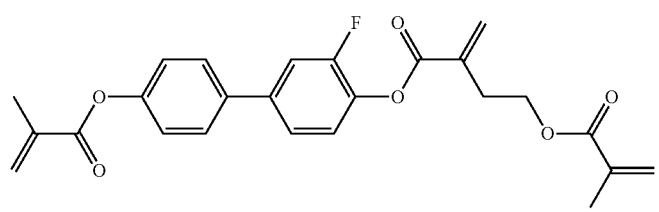 [SMILES: C=C(C)C(=O)OCCC(=C)C(=O)Oc1ccc(-c2ccc(OC(=O)C(=C)C)cc2)cc1F]
RM-86
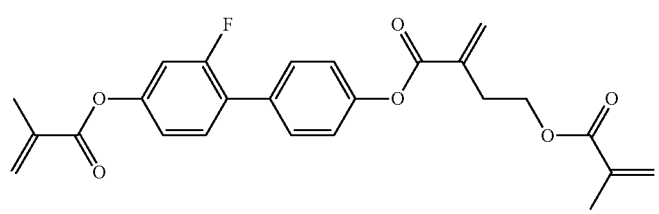 [SMILES: C=C(C)C(=O)OCCC(=C)C(=O)Oc1ccc(-c2ccc(OC(=O)C(=C)C)cc2F)cc1]
RM-87
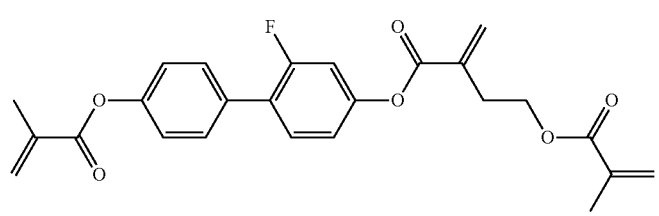 [SMILES: C=C(C)C(=O)OCCC(=C)C(=O)Oc1ccc(-c2ccc(OC(=O)C(=C)C)cc2)c(F)c1]
RM-88

TABLE D-continued
Suitable reactive mesogens for use in the mixtures according to the invention, preferably in PSA and PS-VA applications are shown below:
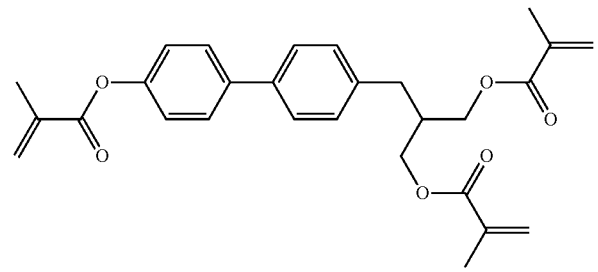 [SMILES: C=C(C)C(=O)OCC(COC(=O)C(=C)C)Cc1ccc(-c2ccc(OC(=O)C(=C)C)cc2)cc1]
RM-89
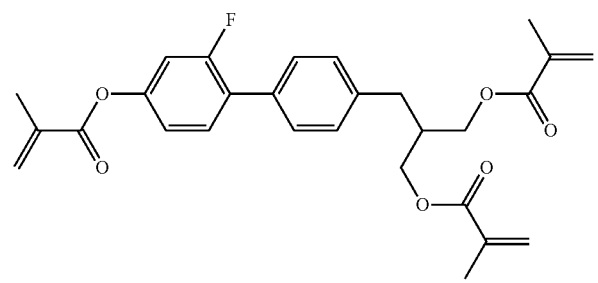
RM-90
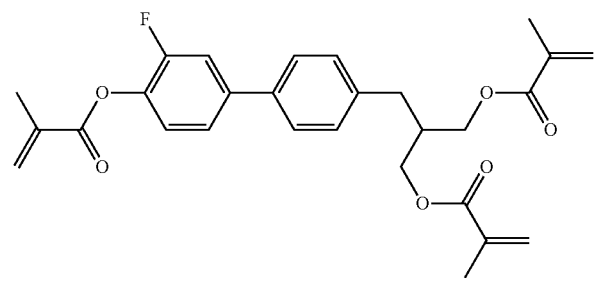
RM-91
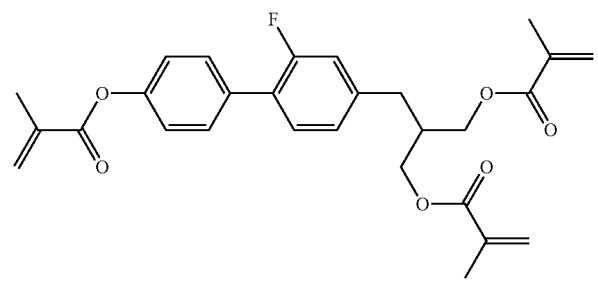 [SMILES: C=C(C)C(=O)OCC(COC(=O)C(=C)C)Cc1ccc(-c2ccc(OC(=O)C(=C)C)cc2)c(F)c1]
RM-92
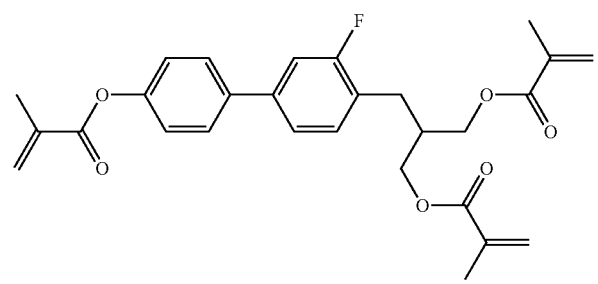 [SMILES: C=C(C)C(=O)OCC(COC(=O)C(=C)C)Cc1ccc(-c2ccc(OC(=O)C(=C)C)cc2)cc1F]
RM-93

| | |
|---|---|
| 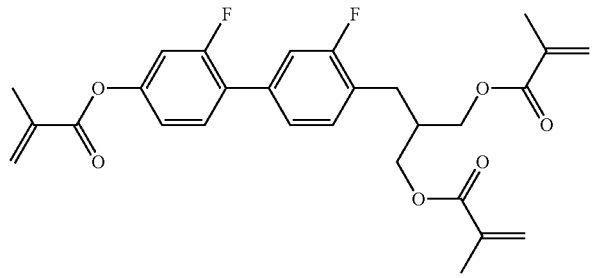 | RM-94 |
| 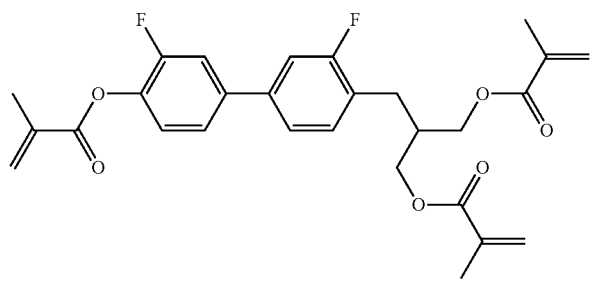 | RM-95 |

EXAMPLES

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

Conventional work-up means: water is added, the mixture is extracted with methylene chloride, the phases are separated, the organic phase is dried and evaporated, and the product is purified by crystallisation and/or chromatography.

Example 1

Synthesis of 3-[2-Ethyl-4'-(4-pentyl-cyclohexyl)-biphenyl-4-yl]-propan-1-ol 1

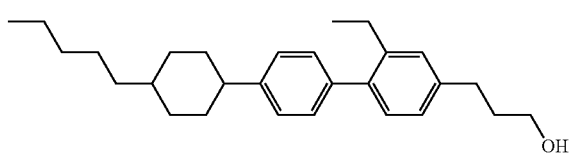

1.1) Synthesis of 4-Bromo-2-ethyl-4'-(4-pentyl-cyclohexyl)-biphenyl A1

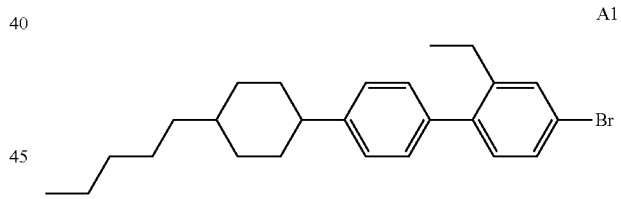

364.7 mmol 4-bromo-2-ethyl-1-iodo-benzene are solved in mixture of 580 ml toluene and 330 ml water. 912 mmol $Na_2CO_3$ are added and the mixture is heated to 80° C. and 9.26 mmol tetrakis-(triphenylphosphin)-palladium(0) is added and immediately 4-(trans-4-pentylcyclohexyl)phenyl boronic acid solved in 210 ml ethanol is added within 15 min. and the reaction mixture is refluxed for 18 h. After cooling to room temperature (RT) 100 ml water and 100 ml methyl-tert-butyl ether (MTBE) are added and the phases are separated. The organic phase is dried over sodium sulphate, filtered and evaporated under vacuum. The crude product is purified via column filtration over silica gel with n-heptane and the product fractions are evaporated under vacuum and crystallized at −30° C. from n-heptane to give 65 g (42%) of A1 as a white crystalline solid.

1.2) Synthesis of tert-Butyl-{3-[2-ethyl-4'-(4-pentyl-cyclohexyl)-biphenyl-4-yl]-prop-2-ynyloxy}-dimethyl-silane B1

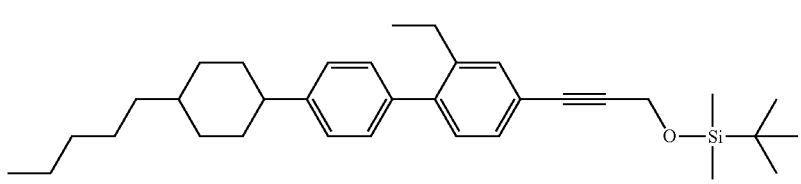

B1

86.8 mmol bromide A1 and 260.5 mmol tert-butyl-dimethyl-prop-2-ynyloxy-silane are solved in 610 ml diisopropylamine and 4.34 mmol palladium acetate and 4.34 mmol copper(I) iodide is added and the mixture is stirred at 80° C. for 3 h. The reaction mixture is cooled to room temperature (RT), water is added and the product is extracted repeatedly with MTBE, washed with brine, dried over sodium sulphate, filtered and evaporated under vacuum. The crude product is purified via column filtration over silica gel with n-heptane/chlorobutane (1:1) to give 33 g of B1.

1.3) Synthesis of tert-Butyl-{3-[2-ethyl-4'-(4-pentyl-cyclohexyl)-biphenyl-4-yl]-propoxy}-dimethyl-silane C1

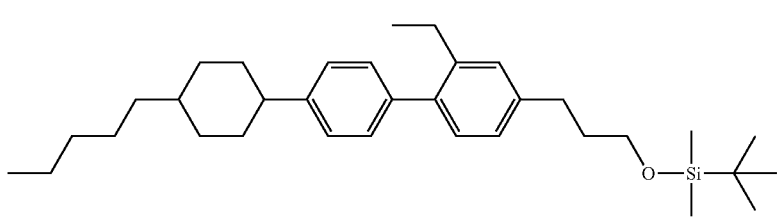

C1

89.1 mmol alkine B1 is solved in 456 ml tetrahydrofuran (THF) and 5.0 g sponge nickel catalyst (watery/Jhonson Matthey) is added and the reaction mixture is stirred under an hydrogen atmosphere at room temperature and normal pressure for 20 h. The reaction mixture is filtered and with a mixture of n-heptane and chlorobutane (1:1) purified over silica gel to give 43 g (94%) of C1.

1.4) Synthesis of 3-[2-Ethyl-4'-(4-pentyl-cyclohexyl)-biphenyl-4-yl]-propan-1-ol 1

1

83.4 mmol of compound C1 are solved in 507 ml THF and the reaction mixture is then cooled to 2° C. At this temperature 47.9 ml (95.9 mmol/2N) HCl are added slowly and the mixture is then stirred at 2-4° C. for further 60 min. and is then allowed to reach room temperature within 3 h. The reaction mixture is then carefully neutralized with NaHCO₃, extracted with MTBE and the combined organic phases are dried over sodium sulphate, filtered and evaporated under vacuum. The crude product is purified vie column chromatography with n-heptane/ethylacetat (1:1) and the obtained product is crystallized from n-heptane at −30° C. to give 1 as a white solid.

Phases: $T_g$−40 K 49 N (29.3) I
Mp.: 49° C.
MS: EI (392.3)

Example 2

Synthesis of 2-(2'-Ethyl-4"-pentyl-[1,1';4',1"]terphenyl-4-yl)-ethanol 2

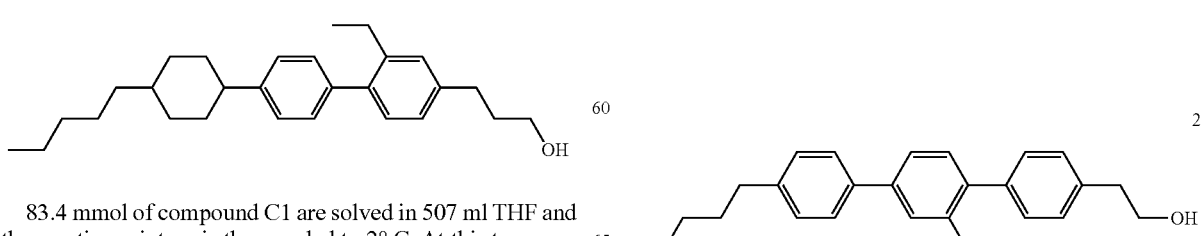

2

2.1) Synthesis of 2-[4-(4,4,5,5-Tetramethyl-[1,3,2]dioxaborolan-2-yl)-phenyl]-ethanol A2

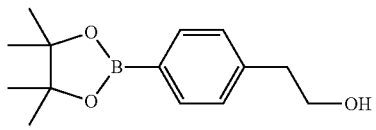
A2

99.5 mmol 2-(4-bromo-phenyl)-ethanol, 109 mmol bis-(pinacolato)-diboron, 330 mmol potassium acetate and 3.4 mmol PdCl$_2$dppf are dissolved in 355 ml 1,4-dioxane and refluxed for 18 h. The reaction mixture is cooled to room temperature and 300 ml water is added. The mixture is extracted with methyl-tert-butyl ether (MTBE), washed with brine, dried over sodium sulphate, filtered and evaporated under vacuum. The crude product is purified via silica gel chromatography (toluene/ethyl acetate 4:1) to give 22 g of A2 as a yellow oil.

2.2) Synthesis of 2-(4'-Bromo-2'-ethyl-biphenyl-4-yl)-ethanol B2

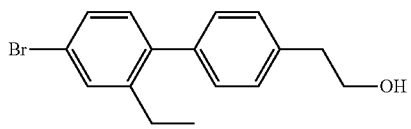
B2

236 mmol sodium carbonate is solved in 175 ml water and 75 ml ethanol. 95.2 mmol 4-bromo-2-ethyl-1-iodo-benzene, 95.0 mmol boronic ester A2 are dissolved in 375 ml toluene and added to the reaction mixture. After adding Pd(PPh$_3$)$_4$ to the mixture it is refluxed for 5.5 h and cooled to room temperature. The organic phase is separated and the water phase is extracted with ethyl acetate. The combined organic phases are washed with brine, dried over sodium sulphate, filtered and evaporated under vacuum. The crude product is purified via silica gel chromatography (n-heptane/ethyl acetate 8:2) and (toluene/ethyl acetate 95:5) to give 24.5 g (80%) of B2.

2.3) Synthesis of 2-(2'-Ethyl-4''-pentyl-[1,1',4',1'']terphenyl-4-yl)-ethanol 2

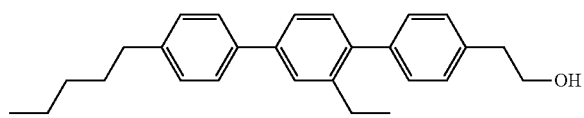
2

101 mmol sodium metaborate tetrahydrate are solved in 215 ml water and added with 1.34 mmol Pd(PPh$_3$)$_2$Cl$_2$, 0.065 ml hydrazinium hydroxide, 67.0 mmol) of bromide B2 and 25 ml THF. The mixture is stirred for 5 min and then 67.2 mmol 4-(pentylphenyl) boronic acid in 50 ml THF is added. The reaction mixture is refluxed for 16 h and cooled to room temperature. The reaction product is extracted with methyl-tert.-butyl ether (MTBE) and the organic layer is washed with brine, dried over sodium sulphate, filtered and evaporated under vacuum. The crude product is purified via silica gel chromatograpy (toluene/n-heptane 1:1) and afterwards crystallized from n-heptane to give 2 as white crystals.

Phases: T$_g$–25 K 67 N (14) I
Mp: 67° C.

Example 3

Synthesis of 2-{2,2'-Diethyl-4'-[2-(4-pentyl-phenyl)-ethyl]-biphenyl-4-yl}-ethanol 3

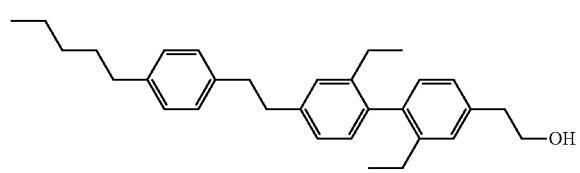
3

3.1) Synthesis of 4,4'-Dibromo-2,2'-diethyl-biphenyl A3

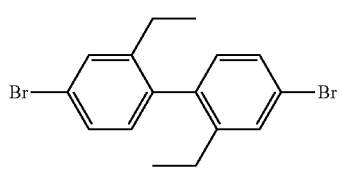
A3

189 mmol Na$_2$CO$_3$ and 79.0 mmol 4-bromo-2-ethyl-1-iodo-benzene is solved in 70 ml water and 125 ml toluene. The reaction mixture is heated up to 75° C. and 2.42 mmol tetrakis(triphenylphosphin)-palladium(0) and immediately afterwards a solution of 79.0 mmol 4-bromo-2-ethylphenyl boronic acid in 25 ml ethanol is added within 15 min. to the reaction mixture and then stirred for 6 h at reflux. The mixture is cooled to room temperature (RT) and water and toluene are added and the phases are separated. The organic phase is washed with brine and dried over sodium sulphate, filtered and evaporated under vacuum. The crude product is purified via column chromatograpy with n-heptane over silica gel to give 27.3 g (87%) of A3.

3.2) Synthesis of 4'-Bromo-2,2'-diethyl-4-(4-pentyl-phenylethynyl)-biphenyl B3

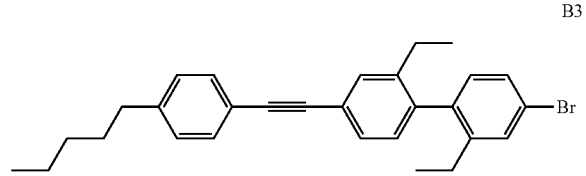 [SMILES: CCCCCc1ccc(C#Cc2ccc(-c3ccc(Br)cc3CC)c(CC)c2)cc1]
B3

69.0 mmol of bromide A3 are solved in 75 ml triethylamine and 2.137 mmol) bis(triphenylphosphin)-palladium (II)-chlorid and 2.1 mmol copper(I) iodide are added. The reaction mixture is heated up to 75° C. and a solution of 70.0 mmol 1-ethynyl-4-pentyl-benzene solved in 50 ml triethylamine is added within 15 min and the mixture is stirred for 18 h under reflux. The mixture is cooled to RT and water and MTBE is added. The organic phase is separated, washed with brine, dried over sodium sulphate, filtered and evaporated under vacuum. The crude product is purified via column chromatography with n-heptane over silica gel to give 11.4 g (33%) of B3.

3.3) Synthesis of 2-[2,2'-Diethyl-4'-(4-pentyl-phenylethynyl)-biphenyl-4-yl]-ethanol C3

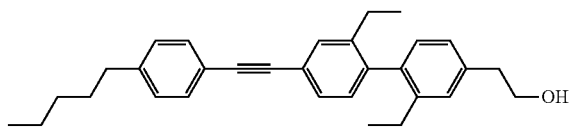

C3

23.0 mmol of bromide B3 is solved in 30 ml THF and is cooled to −78° C. 27.0 mmol of n-buthyllithium (1.6 M in hexane) is then added dropwise and the reaction mixture is stirred at −78° C. for 30 min. 32.0 mmol ethylenoxide solved in 10 ml cooled THF is then added and 3.50 ml (28.0 mmol) BF$_3$*OEt$_2$ solved in 20 ml cooled THF is the added cautiously (exothermic reaction) at −78° C. The reaction mixture is the allowed to reach RT over 18 h and is poured cautiously into ice water. The product is extracted with MTBE, washed with brine, dried over sodium sulphate, filtered and evaporated under vacuum. The crude product is purified vie column chromatography with dichloromethane over silica gel to give C3.

3.4) Synthesis of 2-{2,2'-Diethyl-4'-[2-(4-pentyl-phenyl)-ethyl]-biphenyl-4-yl}-ethanol 3

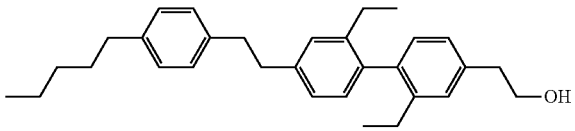

3

17.5 mmol of alkine C3 is solved in 80 ml tetrahydrofuran and 2 g Pd—C-5% (54% water/Degussa) is added. The reaction mixture is then stirred under hydrogen at room temperature for 18 h at normal pressure. The mixture is filtered and evaporated under vacuum. The crude product is then purified via column chromatography with toluene/MTBE (9:1) over silica gel to give 3 as a yellow oil.

The following compounds are synthesized accordingly to the above

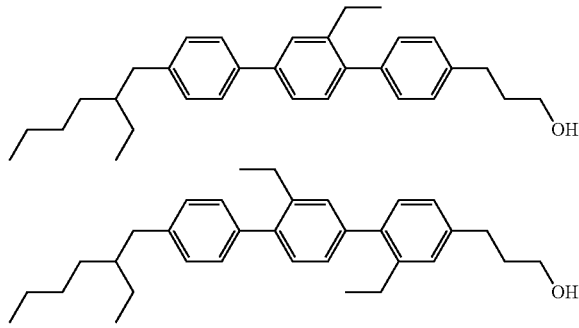

mentioned examples:

In the following examples $V_0$ denotes the threshold voltage, capacitive [V] at 20° C.

Δn denotes the optical anisotropy measured at 20° C. and 589 nm

Δε denotes the dielectric anisotropy at 20° C. and 1 kHz cl.p. denotes the clearing point [° C.]

$K_1$ denotes the elastic constant, "splay" deformation at 20° C. [pN]

$K_3$ denotes the elastic constant, "bend" deformation at 20° C. [pN]

$γ_1$ denotes the rotational viscosity measured at 20° C. [mPa·s], determined by the rotation method in a magnetic field LTS denotes the low-temperature stability (nematic phase), determined in test cells.

The display used for measurement of the threshold voltage has two plane-parallel outer plates at a separation of 20 μm and electrode layers with overlying alignment layers of JALS-2096 on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

Unless indicated otherwise, parts or percent data denote parts by weight or percent by weight.

MIXTURE EXAMPLES

For the production of the examples according to the present invention the following host mixtures H1 to H46 are used:

H1: Nematic Host-Mixture

| CY-3-O2 | 15.50% | Clearing point [° C.]: | 75.1 |
|---|---|---|---|
| CCY-3-O3 | 8.00% | Δn [589 nm, 20° C.]: | 0.098 |
| CCY-4-O2 | 10.00% | Δε [1 kHz, 20° C.]: | −3.0 |
| CPY-2-O2 | 5.50% | ε$_∥$ [1 kHz, 20° C.]: | 3.4 |
| CPY-3-O2 | 11.50% | ε$_⊥$ [1 kHz, 20° C.]: | 6.4 |
| CCH-34 | 9.25% | K$_1$ [pN, 20° C.]: | 13.1 |
| CCH-23 | 24.50% | K$_3$ [pN, 20° C.]: | 13.3 |
| PYP-2-3 | 8.75% | γ$_1$ [mPa·s, 20° C.]: | 113 |
| PCH-301 | 7.00% | V$_0$ [20° C., V]: | 2.22 |

H2: Nematic Host-Mixture

| | | | |
|---|---|---|---|
| CY-3-O4 | 14.00% | Clearing point [° C.]: | 80.0 |
| CCY-3-O2 | 9.00% | $\Delta n$ [589 nm, 20° C.]: | 0.090 |
| CCY-3-O3 | 9.00% | $\Delta \varepsilon$ [1 kHz, 20° C.]: | -3.3 |
| CPY-2-O2 | 10.00% | $\varepsilon_\parallel$ [1 kHz, 20° C.]: | 3.4 |
| CPY-3-O2 | 10.00% | $\varepsilon_\perp$ [1 kHz, 20° C.]: | 6.7 |
| CCY-3-1 | 8.00% | $K_1$ [pN, 20° C.]: | 15.1 |
| CCH-34 | 9.00% | $K_3$ [pN, 20° C.]: | 14.6 |
| CCH-35 | 6.00% | $\gamma_1$ [mPa·s, 20° C.]: | 140 |
| PCH-53 | 10.00% | $V_0$ [20° C., V]: | 2.23 |
| CCH-301 | 6.00% | | |
| CCH-303 | 9.00% | | |

H3: Nematic Host-Mixture

| | | | |
|---|---|---|---|
| CC-3-V1 | 9.00% | Clearing point [° C.]: | 74.7 |
| CCH-23 | 18.00% | $\Delta n$ [589 nm, 20° C.]: | 0.098 |
| CCH-34 | 3.00% | $\Delta \varepsilon$ [1 kHz, 20° C.]: | -3.4 |
| CCH-35 | 7.00% | $\varepsilon_\parallel$ [1 kHz, 20° C.]: | 3.5 |
| CCP-3-1 | 5.50% | $\varepsilon_\perp$ [1 kHz, 20° C.]: | 6.9 |
| CCY-3-O2 | 11.50% | $K_1$ [pN, 20° C.]: | 14.9 |
| CPY-2-O2 | 8.00% | $K_3$ [pN, 20° C.]: | 15.9 |
| CPY-3-O2 | 11.00% | $\gamma_1$ [mPa·s, 20° C.]: | 108 |
| CY-3-O2 | 15.50% | $V_0$ [20° C., V]: | 2.28 |
| PY-3-O2 | 11.50% | | |

H4: Nematic Host-Mixture

| | | | |
|---|---|---|---|
| CC-3-V | 37.50% | Clearing point [° C.]: | 74.8 |
| CC-3-V1 | 2.00% | $\Delta n$ [589 nm, 20° C.]: | 0.099 |
| CCY-4-O2 | 14.50% | $\Delta \varepsilon$ [1 kHz, 20° C.]: | -2.9 |
| CPY-2-O2 | 10.50% | $\varepsilon_\parallel$ [1 kHz, 20° C.]: | 3.7 |
| CPY-3-O2 | 9.50% | $\varepsilon_\perp$ [1 kHz, 20° C.]: | 6.6 |
| CY-3-O2 | 15.00% | $K_1$ [pN, 20° C.]: | 12.2 |
| CY-3-O4 | 4.50% | $K_3$ [pN, 20° C.]: | 13.4 |
| PYP-2-4 | 5.50% | $\gamma_1$ [mPa·s, 20° C.]: | 92 |
| PPGU-3-F | 1.00% | $V_0$ [20° C., V]: | 2.28 |

H5: Nematic Host-Mixture

| | | | |
|---|---|---|---|
| CCH-23 | 20.00% | Clearing point [° C.]: | 74.8 |
| CCH-301 | 6.00% | $\Delta n$ [589 nm, 20° C.]: | 0.105 |
| CCH-34 | 6.00% | $\Delta \varepsilon$ [1 kHz, 20° C.]: | -3.2 |
| CCP-3-1 | 3.00% | $\varepsilon_\parallel$ [1 kHz, 20° C.]: | 3.5 |
| CCY-3-O2 | 11.00% | $\varepsilon_\perp$ [1 kHz, 20° C.]: | 6.8 |
| CPY-2-O2 | 12.00% | $K_1$ [pN, 20° C.]: | 12.7 |
| CPY-3-O2 | 11.00% | $K_3$ [pN, 20° C.]: | 13.6 |
| CY-3-O2 | 14.00% | $\gamma_1$ [mPa·s, 20° C.]: | 120 |
| CY-3-O4 | 4.00% | $V_0$ [20° C., V]: | 2.16 |
| PCH-301 | 4.00% | | |
| PYP-2-3 | 9.00% | | |

H6: Nematic Host-Mixture

| | | | |
|---|---|---|---|
| CC-4-V | 17.00% | Clearing point [° C.]: | 106.1 |
| CCP-V-1 | 15.00% | $\Delta n$ [589 nm, 20° C.]: | 0.120 |
| CCPC-33 | 2.50% | $\Delta \varepsilon$ [1 kHz, 20° C.]: | -3.6 |
| CCY-3-O2 | 4.00% | $\varepsilon_\parallel$ [1 kHz, 20° C.]: | 3.5 |
| CCY-3-O3 | 5.00% | $\varepsilon_\perp$ [1 kHz, 20° C.]: | 7.0 |
| CCY-4-O2 | 5.00% | $K_1$ [pN, 20° C.]: | 16.8 |
| CLY-3-O2 | 3.50% | $K_3$ [pN, 20° C.]: | 17.3 |
| CLY-3-O3 | 2.00% | $\gamma_1$ [mPa·s, 20° C.]: | 207 |
| CPY-2-O2 | 8.00% | $V_0$ [20° C., V]: | 2.33 |
| CPY-3-O2 | 10.00% | | |
| CY-3-O4 | 17.00% | | |
| PYP-2-3 | 11.00% | | |

H7: Nematic Host-Mixture

| | | | |
|---|---|---|---|
| CY-3-O2 | 15.00% | Clearing point [° C.]: | 75.5 |
| CCY-4-O2 | 9.50% | $\Delta n$ [589 nm, 20° C.]: | 0.108 |
| CCY-5-O2 | 5.00% | $\Delta \varepsilon$ [1 kHz, 20° C.]: | -3.0 |
| CPY-2-O2 | 9.00% | $\varepsilon_\parallel$ [1 kHz, 20° C.]: | 3.5 |
| CPY-3-O2 | 9.00% | $\varepsilon_\perp$ [1 kHz, 20° C.]: | 6.5 |
| CCH-34 | 9.00% | $K_1$ [pN, 20° C.]: | 12.9 |
| CCH-23 | 22.00% | $K_3$ [pN, 20° C.]: | 13.0 |
| PYP-2-3 | 7.00% | $\gamma_1$ [mPa·s, 20° C.]: | 115 |
| PYP-2-4 | 7.50% | $V_0$ [20° C., V]: | 2.20 |
| PCH-301 | 7.00% | | |

H8: Nematic Host-Mixture

| | | | |
|---|---|---|---|
| CY-3-O2 | 15.00% | Clearing point [° C.]: | 74.7 |
| CY-5-O2 | 6.50% | $\Delta n$ [589 nm, 20° C.]: | 0.108 |
| CCY-3-O2 | 11.00% | $\Delta \varepsilon$ [1 kHz, 20° C.]: | -3.0 |
| CPY-2-O2 | 5.50% | $\varepsilon_\parallel$ [1 kHz, 20° C.]: | 3.6 |
| CPY-3-O2 | 10.50% | $\varepsilon_\perp$ [1 kHz, 20° C.]: | 6.6 |
| CC-3-V | 28.50% | $K_1$ [pN, 20° C.]: | 12.9 |
| CC-3-V1 | 10.00% | $K_3$ [pN, 20° C.]: | 15.7 |
| PYP-2-3 | 12.50% | $\gamma_1$ [mPa·s, 20° C.]: | 97 |
| PPGU-3-F | 0.50% | $V_0$ [20° C., V]: | 2.42 |

H9: Nematic Host-Mixture

| | | | |
|---|---|---|---|
| CCH-35 | 9.50% | Clearing point [° C.]: | 79.1 |
| CCH-501 | 5.00% | $\Delta n$ [589 nm, 20° C.]: | 0.091 |
| CCY-2-1 | 9.50% | $\Delta \varepsilon$ [1 kHz, 20° C.]: | -3.6 |
| CCY-3-1 | 10.50% | $\varepsilon_\parallel$ [1 kHz, 20° C.]: | 3.5 |
| CCY-3-O2 | 10.50% | $\varepsilon_\perp$ [1 kHz, 20° C.]: | 7.1 |
| CCY-5-O2 | 9.50% | $K_1$ [pN, 20° C.]: | 14.6 |
| CPY-2-O2 | 12.00% | $K_3$ [pN, 20° C.]: | 14.5 |
| CY-3-O4 | 9.00% | $\gamma_1$ [mPa·s, 20° C.]: | 178 |
| CY-5-O4 | 11.00% | $V_0$ [20° C., V]: | 2.12 |
| PCH-53 | 13.50% | | |

H10: Nematic Host-Mixture

| | | | |
|---|---|---|---|
| Y-4O-O4 | 3.00% | Clearing point [° C.]: | 100 |
| PYP-2-3 | 10.00% | $\Delta n$ [589 nm, 20° C.]: | 0.1603 |
| PYP-2-4 | 10.00% | $\Delta \varepsilon$ [1 kHz, 20° C.]: | -0.7 |
| CC-3-V | 25.00% | $\varepsilon_\parallel$ [1 kHz, 20° C.]: | 3.1 |
| CCP-V-1 | 11.00% | $\varepsilon_\perp$ [1 kHz, 20° C.]: | 3.8 |
| CCP-V2-1 | 10.00% | | |
| BCH-32 | 5.00% | | |
| CVCP-1V-O1 | 5.00% | | |
| PTP-3O2FF | 3.00% | | |
| CPTP-3O2FF | 2.50% | | |
| PTP-101 | 5.00% | | |
| PTP-201 | 5.00% | | |
| CPTP-301 | 5.00% | | |
| PPTUI-3-2 | 0.50% | | | stabilized with 0.01% of the compound of the formula

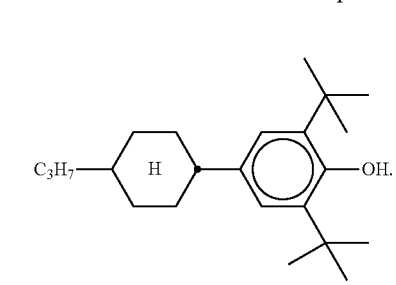

H11: Nematic Host-Mixture

| | | | |
|---|---|---|---|
| CY-3-O2 | 15.00% | Clearing point [° C.]: | 91 |
| CY-3-O4 | 20.00% | Δn [589 nm, 20° C.]: | 0.0909 |
| CY-5-O2 | 10.00% | $\varepsilon_\|$ [1 kHz, 20° C.]: | 4.1 |
| CY-5-O4 | 7.00% | $\varepsilon_\perp$ [1 kHz, 20° C.]: | 10.1 |
| CCY-3-O2 | 6.50% | Δε [1 kHz, 20° C.]: | −6.0 |
| CCY-3-O3 | 6.50% | $\gamma_1$ [mPa · s, 20° C.]: | 310 |
| CCY-4-O2 | 6.50% | | |
| CCY-5-O2 | 6.50% | | |
| CPY-2-O2 | 3.00% | | |
| CH-33 | 3.00% | | |
| CH-35 | 3.00% | | |
| CH-43 | 3.00% | | |
| CCPC-33 | 5.00% | | |
| CCPC-34 | 5.00% | | |

H12: Nematic Host-Mixture

| | | | |
|---|---|---|---|
| CY-3-O2 | 15.00% | Clearing point [° C.]: | 91 |
| CY-3-O4 | 20.00% | Δn [589 nm, 20° C.]: | 0.1099 |
| CY-5-O2 | 10.00% | $\varepsilon_\|$ [1 kHz, 20° C.]: | 4.2 |
| CCY-3-O2 | 6.50% | $\varepsilon_\perp$ [1 kHz, 20° C.]: | 10.3 |
| CCY-3-O3 | 6.00% | Δε [1 kHz, 20° C.]: | −6.1 |
| CCY-4-O2 | 6.00% | $\gamma_1$ [mPa · s, 20° C.]: | 297 |
| CCY-5-O2 | 6.00% | | |
| CPY-2-O2 | 8.00% | | |
| CPY-3-O2 | 8.00% | | |
| CC-4-V | 2.50% | | |
| CCP-V-1 | 3.50% | | |
| CPTP-3-1 | 2.50% | | |
| CCPC-33 | 4.00% | | |
| CCPC-34 | 2.00% | | |

H13: Nematic Host-Mixture

| | | | |
|---|---|---|---|
| CY-3-O2 | 15.00% | Clearing point [° C.]: | 91 |
| CY-3-O4 | 20.00% | Δn [589 nm, 20° C.]: | 0.0897 |
| CY-5-O2 | 6.00% | $\varepsilon_\|$ [1 kHz, 20° C.]: | 3.7 |
| CCY-3-O2 | 6.00% | $\varepsilon_\perp$ [1 kHz, 20° C.]: | 8.0 |
| CCY-3-O3 | 6.00% | Δε [1 kHz, 20° C.]: | −4.3 |
| CCY-4-O2 | 6.00% | $\gamma_1$ [mPa · s, 20° C.]: | 204 |
| CPY-2-O2 | 6.00% | | |
| CC-4-V | 15.00% | | |
| CCP-V2-1 | 6.50% | | |
| CCPC-33 | 4.50% | | |
| CCPC-34 | 4.50% | | |
| CCPC-35 | 4.50% | | |

H14: Nematic Host-Mixture

| | | | |
|---|---|---|---|
| CY-3-O2 | 15.00% | Clearing point [° C.]: | 91 |
| CY-3-O4 | 20.00% | Δn [589 nm, 20° C.]: | 0.1106 |
| CCY-3-O2 | 6.00% | $\varepsilon_\|$ [1 kHz, 20° C.]: | 3.9 |
| CCY-3-O3 | 6.00% | $\varepsilon_\perp$ [1 kHz, 20° C.]: | 8.4 |
| CCY-4-O2 | 6.00% | Δε [1 kHz, 20° C.]: | −4.5 |
| CCY-5-O2 | 2.00% | $\gamma_1$ [mPa · s, 20° C.]: | 202 |
| CPY-2-O2 | 8.00% | | |
| CPY-3-O2 | 8.00% | | |
| CC-4-V | 8.00% | | |
| CCP-V-1 | 12.00% | | |
| CCP-V2-1 | 5.00% | | |
| CPTP-3-1 | 4.00% | | |

H15: Nematic Host-Mixture

| | | | |
|---|---|---|---|
| CY-3-O2 | 15.00% | Clearing point [° C.]: | 95 |
| CY-3-O4 | 20.00% | Δn [589 nm, 20° C.]: | 0.0974 |
| CY-5-O2 | 8.50% | $\varepsilon_\|$ [1 kHz, 20° C.]: | 4.1 |
| CCY-3-O2 | 6.50% | $\varepsilon_\perp$ [1 kHz, 20° C.]: | 9.9 |
| CCY-3-O3 | 6.50% | Δε [1 kHz, 20° C.]: | −5.8 |

-continued

| | | | |
|---|---|---|---|
| CCY-4-O2 | 6.50% | $K_1$ [pN, 20° C.]: | 14.3 |
| CCY-5-O2 | 6.50% | $K_3$ [pN, 20° C.]: | 16.8 |
| CPY-2-O2 | 7.50% | $V_0$ [pN, 20° C.]: | 1.79 |
| CPY-3-O2 | 3.50% | $\gamma_1$ [mPa · s, 20° C.]: | 292 |
| CC-4-V | 6.00% | | |
| CH-33 | 3.50% | | |
| CCPC-33 | 5.00% | | |
| CCPC-34 | 5.00% | | |

H16: Nematic Host-Mixture

| | | | |
|---|---|---|---|
| CY-3-O2 | 15.00% | Clearing point [° C.]: | 95 |
| CY-3-O4 | 20.00% | Δn [589 nm, 20° C.]: | 0.1126 |
| CY-5-O2 | 2.00% | $\varepsilon_\|$ [1 kHz, 20° C.]: | 4.0 |
| CCY-3-O2 | 6.50% | $\varepsilon_\perp$ [1 kHz, 20° C.]: | 9.8 |
| CCY-3-O3 | 6.50% | Δε [1 kHz, 20° C.]: | −5.8 |
| CCY-4-O2 | 6.50% | $K_1$ [pN, 20° C.]: | 15.1 |
| CCY-5-O2 | 6.50% | $K_3$ [pN, 20° C.]: | 17.8 |
| CPY-2-O2 | 8.00% | $V_0$ [pN, 20° C.]: | 1.84 |
| CPY-3-O2 | 8.00% | $\gamma_1$ [mPa · s, 20° C.]: | 270 |
| CPTP- | 4.00% | | |
| CC-4-V | 5.00% | | |
| CCP-V-1 | 10.50% | | |
| CCPC-33 | 1.50% | | |

H17: Nematic Host-Mixture

| | | | |
|---|---|---|---|
| CY-3-O2 | 12.00% | Clearing point [° C.]: | 95 |
| CY-3-O4 | 16.00% | Δn [589 nm, 20° C.]: | 0.0972 |
| CCY-3-O2 | 6.50% | $\varepsilon_\|$ [1 kHz, 20° C.]: | 3.6 |
| CCY-3-O3 | 6.50% | $\varepsilon_\perp$ [1 kHz, 20° C.]: | 7.6 |
| CCY-4-O2 | 6.50% | Δε [1 kHz, 20° C.]: | −4.0 |
| CCY-5-O2 | 6.00% | $K_1$ [pN, 20° C.]: | 14.9 |
| CPY-2-O2 | 6.00% | $K_3$ [pN, 20° C.]: | 17.0 |
| CPY-3-O2 | 5.50% | $V_0$ [pN, 20° C.]: | 2.17 |
| CC-4-V | 15.00% | $\gamma_1$ [mPa · s, 20° C.]: | 180 |
| CCP-V-1 | 10.00% | | |
| CCP-V2-1 | 10.00% | | | stabilized with 0.03% of

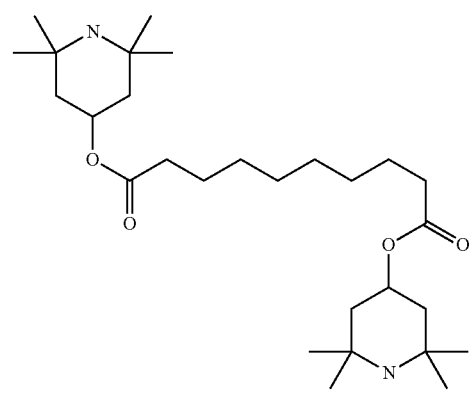

H18: Nematic Host-Mixture

| | | | |
|---|---|---|---|
| CY-3-O2 | 11.00% | Clearing point [° C.]: | 95 |
| CY-3-O4 | 16.00% | Δn [589 nm, 20° C.]: | 0.1121 |
| CCY-3-O2 | 6.50% | $\varepsilon_\|$ [1 kHz, 20° C.]: | 3.7 |
| CCY-3-O3 | 6.00% | $\varepsilon_\perp$ [1 kHz, 20° C.]: | 7.7 |
| CCY-4-O2 | 6.00% | Δε [1 kHz, 20° C.]: | −4.0 |
| CPY-2-O2 | 8.00% | $K_1$ [pN, 20° C.]: | 14.8 |
| CPY-3-O2 | 8.00% | $K_3$ [pN, 20° C.]: | 16.2 |
| CPTP-3O2FF | 5.00% | $V_0$ [pN, 20° C.]: | 2.13 |

-continued

| | | | |
|---|---|---|---|
| CC-4-V | 16.00% | $\gamma_1$ [mPa · s, 20° C.]: | 179 |
| CCP-V-1 | 12.00% | | |
| BCH-32 | 5.50% | | |

H19: Nematic Host-Mixture

| | | | |
|---|---|---|---|
| CY-3-O2 | 3.50% | Clearing point [° C.]: | 102.5 |
| CY-3-O4 | 16.00% | $\Delta n$ [589 nm, 20° C.]: | 0.1112 |
| CY-5-O2 | 8.75% | $\varepsilon_\parallel$ [1 kHz, 20° C.]: | 3.8 |
| CCY-3-O2 | 6.00% | $\varepsilon_\perp$ [1 kHz, 20° C.]: | 8.8 |
| CCY-3-O3 | 6.00% | $\Delta\varepsilon$ [1 kHz, 20° C.]: | -5.0 |
| CCY-4-O2 | 6.00% | $K_1$ [pN, 20° C.]: | 15.0 |
| CCY-5-O2 | 6.00% | $K_3$ [pN, 20° C.]: | 18.7 |
| CPY-2-O2 | 8.00% | $V_0$ [pN, 20° C.]: | 2.04 |
| CPY-3-O2 | 8.50% | $\gamma_1$ [mPa · s, 20° C.]: | 280 |
| CC-4-V | 3.00% | | |
| CCP-V-1 | 7.25% | | |
| CCP-V2-1 | 3.25% | | |
| CCPC-33 | 2.75% | | |
| CY-5-O4 | 6.50% | | |
| CC-5-V | 3.50% | | |
| CCPC-34 | 2.00% | | |
| CPTP-301 | 1.75% | | |
| PTP-102 | 1.25% | | |

H20: Nematic Host-Mixture

| | | | |
|---|---|---|---|
| CCY-5-O2 | 5.25% | Clearing point [° C.]: | 102 |
| CPY-2-O2 | 11.75% | $\Delta n$ [589 nm, 20° C.]: | 0.1133 |
| CPY-3-O2 | 11.75% | $\varepsilon_\parallel$ [1 kHz, 20° C.]: | 4.1 |
| CC-5-V | 3.00% | $\varepsilon_\perp$ [1 kHz, 20° C.]: | 10.5 |
| CCPC-33 | 1.50% | $\Delta\varepsilon$ [1 kHz, 20° C.]: | -6.4 |
| CCPC-34 | 1.50% | $K_1$ [pN, 20° C.]: | 15.4 |
| CCPC-35 | 1.00% | $K_3$ [pN, 20° C.]: | 18.8 |
| CY-3-O2 | 8.50% | $V_0$ [pN, 20° C.]: | 1.81 |
| CY-3-O4 | 23.00% | $\gamma_1$ [mPa · s, 20° C.]: | 367 |
| CCY-3-O2 | 7.25% | | |
| CCY-3-O3 | 6.75% | | |
| CCY-4-O2 | 6.75% | | |
| CY-5-O4 | 4.50% | | |
| CCY-3-1 | 4.00% | | |
| CCP-V-1 | 2.00% | | |
| CBC-33F | 1.50% | | |

H21: Nematic Host-Mixture

| | | | |
|---|---|---|---|
| CY-3-O2 | 6.00% | Clearing point [° C.]: | 102 |
| CY-3-O4 | 14.00% | $\Delta n$ [589 nm, 20° C.]: | 0.0898 |
| CCY-3-O2 | 4.00% | $\varepsilon_\parallel$ [1 kHz, 20° C.]: | 3.1 |
| CCY-3-O3 | 4.00% | $\varepsilon_\perp$ [1 kHz, 20° C.]: | 5.3 |
| CPY-2-O2 | 9.00% | $\Delta\varepsilon$ [1 kHz, 20° C.]: | -2.1 |
| CCH-301 | 5.00% | $K_1$ [pN, 20° C.]: | 16.7 |
| CC-3-V1 | 8.00% | $K_3$ [pN, 20° C.]: | 18.3 |
| CC-5-V | 13.00% | $V_0$ [pN, 20° C.]: | 3.11 |
| CCP-V-1 | 13.00% | $\gamma_1$ [mPa · s, 20° C.]: | 133 |
| CCP-V2-1 | 13.00% | | |
| CH-33 | 3.00% | | |
| CH-35 | 3.00% | | |
| CP-43 | 3.00% | | |
| CCPC-33 | 2.00% | | |

H22: Nematic Host-Mixture

| | | | |
|---|---|---|---|
| CY-3-O2 | 8.00% | Clearing point [° C.]: | 102 |
| CY-3-O4 | 4.00% | $\Delta n$ [589 nm, 20° C.]: | 0.1501 |
| CY-5-O2 | 12.00% | $\varepsilon_\parallel$ [1 kHz, 20° C.]: | 4.1 |
| CY-5-O4 | 6.00% | $\varepsilon_\perp$ [1 kHz, 20° C.]: | 10.2 |
| CCY-3-O2 | 6.00% | $\Delta\varepsilon$ [1 kHz, 20° C.]: | -6.1 |
| CCY-4-O2 | 6.00% | $K_1$ [pN, 20° C.]: | 15.9 |
| CCY-5-O2 | 6.00% | $K_3$ [pN, 20° C.]: | 18.3 |
| CCY-3-O3 | 6.00% | $V_0$ [pN, 20° C.]: | 1.83 |
| CPY-2-O2 | 12.00% | $\gamma_1$ [mPa · s, 20° C.]: | 404 |
| CPY-3-O2 | 12.00% | | |
| PYP-2-3 | 10.00% | | |
| PYP-2-4 | 10.00% | | |
| CPTP-301 | 2.00% | | |

H23: Nematic Host-Mixture

| | | | |
|---|---|---|---|
| CY-3-O2 | 2.00% | Clearing point [° C.]: | 100 |
| CY-3-O4 | 6.00% | $\Delta n$ [589 nm, 20° C.]: | 0.1508 |
| CY-5-O4 | 2.00% | $\varepsilon_\parallel$ [1 kHz, 20° C.]: | 3.3 |
| CCY-3-O2 | 1.50% | $\varepsilon_\perp$ [1 kHz, 20° C.]: | 5.3 |
| CPY-2-O2 | 9.00% | $\Delta\varepsilon$ [1 kHz, 20° C.]: | -1.9 |
| CPY-3-O2 | 9.00% | $K_1$ [pN, 20° C.]: | 15.7 |
| PYP-2-3 | 10.00% | $K_3$ [pN, 20° C.]: | 16.4 |
| PYP-2-4 | 10.00% | $V_0$ [pN, 20° C.]: | 3.06 |
| PTP-102 | 1.50% | $\gamma_1$ [mPa · s, 20° C.]: | 122 |
| CPTP-301 | 5.00% | | |
| CPTP-302 | 4.00% | | |
| PCH-301 | 5.50% | | |
| CC-4-V | 14.00% | | |
| CC-5-V | 8.00% | | |
| CCP-V-1 | 7.50% | | |
| BCH-32 | 5.00% | | |

H24: Nematic Host-Mixture

| | | | |
|---|---|---|---|
| CY-3-O2 | 17.00% | Clearing point [° C.]: | 101 |
| CY-3-O4 | 20.00% | $\Delta n$ [589 nm, 20° C.]: | 0.0969 |
| CY-5-O2 | 5.50% | $\varepsilon_\parallel$ [1 kHz, 20° C.]: | 4.0 |
| CCY-3-O2 | 6.50% | $\varepsilon_\perp$ [1 kHz, 20° C.]: | 10.0 |
| CCY-3-O3 | 6.50% | $\Delta\varepsilon$ [1 kHz, 20° C.]: | -6.0 |
| CCY-4-O2 | 6.50% | $K_1$ [pN, 20° C.]: | 14.5 |
| CCY-5-O2 | 6.50% | $K_3$ [pN, 20° C.]: | 17.3 |
| CPY-2-O2 | 10.50% | $V_0$ [pN, 20° C.]: | 1.80 |
| CCH-34 | 3.00% | $\gamma_1$ [mPa · s, 20° C.]: | 322 |
| CH-33 | 3.00% | | |
| CH-35 | 3.00% | | |
| CH-43 | 3.00% | | |
| CCPC-33 | 3.00% | | |
| CCPC-34 | 3.00% | | |
| CCPC-35 | 3.00% | | |

H25: Nematic Host-Mixture

| | | | |
|---|---|---|---|
| CY-3-O2 | 2.40% | Clearing point [° C.]: | 101 |
| CY-3-O4 | 18.80% | $\Delta n$ [589 nm, 20° C.]: | 0.0970 |
| CY-5-O2 | 2.40% | $\varepsilon_\parallel$ [1 kHz, 20° C.]: | 3.7 |
| CCY-3-O2 | 7.00% | $\varepsilon_\perp$ [1 kHz, 20° C.]: | 8.2 |
| CCY-5-O2 | 7.90% | $\Delta\varepsilon$ [1 kHz, 20° C.]: | -4.5 |
| CCY-2-1 | 4.90% | $K_1$ [pN, 20° C.]: | 14.8 |
| CCY-3-1 | 5.30% | $K_3$ [pN, 20° C.]: | 17.6 |
| CPY-2-O2 | 5.70% | $V_0$ [pN, 20° C.]: | 2.09 |
| CCH-301 | 8.50% | $\gamma_1$ [mPa · s, 20° C.]: | 244 |
| CH-33 | 0.90% | | |
| CH-35 | 0.90% | | |
| CP-33 | 1.20% | | |
| CP-35 | 1.20% | | |
| CCPC-33 | 3.00% | | |
| CCPC-34 | 2.70% | | |
| CCPC-35 | 0.60% | | |
| CCY-3-O3 | 4.90% | | |
| CCY-4-O2 | 4.90% | | |
| CPY-3-O2 | 4.20% | | |
| PYP-2-3 | 3.50% | | |
| CCH-303 | 4.20% | | |
| CCH-501 | 4.90% | | |

H26: Nematic Host-Mixture

| | | | |
|---|---|---|---|
| CY-3-O2 | 17.00% | Clearing point [° C.]: | 101 |
| CY-3-O4 | 20.00% | Δn [589 nm, 20° C.]: | 0.0969 |
| CY-5-O2 | 5.50% | $\varepsilon_\parallel$ [1 kHz, 20° C.]: | 4.0 |
| CCY-3-O2 | 6.50% | $\varepsilon_\perp$ [1 kHz, 20° C.]: | 10.0 |
| CCY-3-O3 | 6.50% | Δε [1 kHz, 20° C.]: | −6.0 |
| CCY-4-O2 | 6.50% | $K_1$ [pN, 20° C.]: | 14.5 |
| CCY-5-O2 | 6.50% | $K_3$ [pN, 20° C.]: | 17.3 |
| CPY-2-O2 | 10.50% | $V_0$ [pN, 20° C.]: | 1.80 |
| CCH-34 | 3.00% | $\gamma_1$ [mPa·s, 20° C.]: | 322 |
| CH-33 | 3.00% | | |
| CH-35 | 3.00% | | |
| CH-43 | 3.00% | | |
| CCPC-33 | 3.00% | | |
| CCPC-34 | 3.00% | | |
| CCPC-35 | 3.00% | | |

H27: Nematic Host-Mixture

| | | | |
|---|---|---|---|
| CY-3-O2 | 16.00% | Clearing point [° C.]: | 101 |
| CY-3-O4 | 20.00% | Δn [589 nm, 20° C.]: | 0.0953 |
| CCY-3-O2 | 5.00% | $\varepsilon_\parallel$ [1 kHz, 20° C.]: | 3.9 |
| CCY-3-O3 | 5.00% | $\varepsilon_\perp$ [1 kHz, 20° C.]: | 9.4 |
| CCY-4-O2 | 5.00% | Δε [1 kHz, 20° C.]: | −5.5 |
| CCY-5-O2 | 5.00% | $K_1$ [pN, 20° C.]: | 16.2 |
| CLY-2-O4 | 5.00% | $K_3$ [pN, 20° C.]: | 17.2 |
| CLY-3-O2 | 5.00% | $V_0$ [pN, 20° C.]: | 1.85 |
| CLY-3-O3 | 5.00% | $\gamma_1$ [mPa·s, 20° C.]: | 276 |
| CPY-2-O2 | 5.00% | | |
| CC-5-V | 9.00% | | |
| CH-33 | 3.00% | | |
| CH-35 | 3.00% | | |
| CP-33 | 3.00% | | |
| CCPC-33 | 3.00% | | |
| CCPC-34 | 3.00% | | |

H28: Nematic Host-Mixture

| | | | |
|---|---|---|---|
| CY-3-O2 | 8.00% | Clearing point [° C.]: | 100 |
| CY-3-O4 | 15.00% | Δn [589 nm, 20° C.]: | 0.0948 |
| CY-5-O2 | 8.00% | $\varepsilon_\parallel$ [1 kHz, 20° C.]: | 3.9 |
| CY-5-O4 | 10.00% | $\varepsilon_\perp$ [1 kHz, 20° C.]: | 9.2 |
| CCY-3-O2 | 6.00% | Δε [1 kHz, 20° C.]: | −5.3 |
| CCY-3-O3 | 6.00% | $K_1$ [pN, 20° C.]: | 14.6 |
| CCY-4-O2 | 6.00% | $K_3$ [pN, 20° C.]: | 17.3 |
| CCY-5-O2 | 6.00% | $V_0$ [pN, 20° C.]: | 1.90 |
| CPY-2-O2 | 10.00% | $\gamma_1$ [mPa·s, 20° C.]: | 298 |
| CC-5-V | 7.00% | | |
| CH-33 | 3.00% | | |
| CH-35 | 3.00% | | |
| CP-33 | 3.00% | | |
| CCPC-33 | 3.00% | | |
| CCPC-34 | 3.00% | | |
| CCPC-35 | 3.00% | | |

H29: Nematic Host-Mixture

| | | | |
|---|---|---|---|
| CY-3-O2 | 9.00% | Clearing point [° C.]: | 106 |
| CY-3-O4 | 9.00% | Δn [589 nm, 20° C.]: | 0.1077 |
| CY-5-O2 | 12.00% | $\varepsilon_\parallel$ [1 kHz, 20° C.]: | 3.9 |
| CY-5-O4 | 11.00% | $\varepsilon_\perp$ [1 kHz, 20° C.]: | 9.5 |
| CCY-3-O2 | 6.00% | Δε [1 kHz, 20° C.]: | −5.6 |
| CCY-3-O3 | 6.00% | $K_1$ [pN, 20° C.]: | 15.8 |
| CCY-4-O2 | 6.00% | $K_3$ [pN, 20° C.]: | 19.4 |
| CCY-5-O2 | 6.00% | $V_0$ [pN, 20° C.]: | 1.96 |
| CPY-2-O2 | 8.00% | $\gamma_1$ [mPa·s, 20° C.]: | 341 |
| CPY-3-O2 | 7.00% | | |
| CCP-V-1 | 11.00% | | |
| CCPC-33 | 3.00% | | |
| CCPC-34 | 3.00% | | |
| CCPC-35 | 3.00% | | |

H30: Nematic Host-Mixture

| | | | |
|---|---|---|---|
| CY-3-O2 | 8.00% | Clearing point [° C.]: | 98 |
| CY-3-O4 | 17.00% | Δn [589 nm, 20° C.]: | 0.0914 |
| CY-5-O2 | 8.00% | $\varepsilon_\parallel$ [1 kHz, 20° C.]: | 3.8 |
| CCY-3-O2 | 8.00% | $\varepsilon_\perp$ [1 kHz, 20° C.]: | 8.9 |
| CCY-3-O3 | 8.00% | Δε [1 kHz, 20° C.]: | −5.1 |
| CCY-4-O2 | 8.00% | $K_1$ [pN, 20° C.]: | 15.5 |
| CCY-5-O2 | 8.00% | $K_3$ [pN, 20° C.]: | 16.8 |
| CPY-2-O2 | 8.00% | $V_0$ [pN, 20° C.]: | 1.92 |
| CCH-301 | 3.00% | $\gamma_1$ [mPa·s, 20° C.]: | 256 |
| CC-5-V | 10.00% | | |
| CH-33 | 3.00% | | |
| CH-35 | 3.00% | | |
| CP-33 | 3.00% | | |
| CP-35 | 2.00% | | |
| CCPC-33 | 3.00% | | |

H31: Nematic Host-Mixture

| | | | |
|---|---|---|---|
| CY-3-O2 | 7.00% | Clearing point [° C.]: | 105 |
| CY-3-O4 | 16.00% | Δn [589 nm, 20° C.]: | 0.1024 |
| CCY-3-O2 | 6.00% | $\varepsilon_\parallel$ [1 kHz, 20° C.]: | 3.4 |
| CCY-3-O3 | 6.00% | $\varepsilon_\perp$ [1 kHz, 20° C.]: | 6.6 |
| CCY-4-O2 | 6.00% | Δε [1 kHz, 20° C.]: | −3.2 |
| CPY-2-O2 | 7.50% | $K_1$ [pN, 20° C.]: | 18.4 |
| CPY-3-O2 | 7.50% | $K_3$ [pN, 20° C.]: | 21.2 |
| CC-3-V1 | 8.00% | $V_0$ [pN, 20° C.]: | 2.79 |
| CC-5-V | 9.00% | $\gamma_1$ [mPa·s, 20° C.]: | 171 |
| CCP-V-1 | 13.50% | | |
| CCP-V2-1 | 13.50% | | |

H32: Nematic Host-Mixture

| | | | |
|---|---|---|---|
| CY-3-O2 | 9.00% | Clearing point [° C.]: | 106 |
| CY-3-O4 | 9.00% | Δn [589 nm, 20° C.]: | 0.1077 |
| CY-5-O2 | 12.00% | $\varepsilon_\parallel$ [1 kHz, 20° C.]: | 3.9 |
| CY-5-O4 | 11.00% | $\varepsilon_\perp$ [1 kHz, 20° C.]: | 9.5 |
| CCY-3-O2 | 6.00% | Δε [1 kHz, 20° C.]: | −5.6 |
| CCY-3-O3 | 6.00% | $K_1$ [pN, 20° C.]: | 15.8 |
| CCY-4-O2 | 6.00% | $K_3$ [pN, 20° C.]: | 19.4 |
| CCY-5-O2 | 6.00% | $V_0$ [pN, 20° C.]: | 1.96 |
| CPY-2-O2 | 8.00% | $\gamma_1$ [mPa·s, 20° C.]: | 341 |
| CPY-3-O2 | 7.00% | | |
| CCP-V-1 | 11.00% | | |
| CCPC-33 | 3.00% | | |
| CCPC-34 | 3.00% | | |
| CCPC-35 | 3.00% | | |

H33: Nematic Host-Mixture

| | | | |
|---|---|---|---|
| CY-3-O2 | 4.00% | Clearing point [° C.]: | 100 |
| CY-3-O4 | 12.50% | Δn [589 nm, 20° C.]: | 0.1566 |
| CCY-3-O2 | 3.50% | $\varepsilon_\parallel$ [1 kHz, 20° C.]: | 3.6 |
| CPY-2-O2 | 12.00% | $\varepsilon_\perp$ [1 kHz, 20° C.]: | 6.6 |
| CPY-3-O2 | 12.00% | Δε [1 kHz, 20° C.]: | −3.0 |
| PYP-2-3 | 11.00% | $K_1$ [pN, 20° C.]: | 15.5 |
| PYP-2-4 | 11.00% | $K_3$ [pN, 20° C.]: | 17.1 |
| CPTP-301 | 5.00% | $V_0$ [pN, 20° C.]: | 2.50 |
| CPTP-302 | 5.00% | $\gamma_1$ [mPa·s, 20° C.]: | 202 |
| CC-4-V | 14.00% | | |
| CC-5-V | 7.00% | | |
| BCH-32 | 3.00% | | |

H34: Nematic Host-Mixture

| | | | |
|---|---|---|---|
| CY-3-O2 | 8.00% | Clearing point [° C.]: | 98 |
| CY-3-O4 | 17.00% | Δn [589 nm, 20° C.]: | 0.0914 |
| CY-5-O2 | 8.00% | $\varepsilon_\parallel$ [1 kHz, 20° C.]: | 3.8 |
| CCY-3-O2 | 8.00% | $\varepsilon_\perp$ [1 kHz, 20° C.]: | 8.9 |
| CCY-3-O3 | 8.00% | Δε [1 kHz, 20° C.]: | −5.1 |

-continued

| | | | |
|---|---|---|---|
| CCY-4-O2 | 8.00% | $K_1$ [pN, 20° C.]: | 15.5 |
| CCY-5-O2 | 8.00% | $K_3$ [pN, 20° C.]: | 16.8 |
| CPY-2-O2 | 8.00% | $V_0$ [pN, 20° C.]: | 1.92 |
| CCH-301 | 3.00% | $\gamma_1$ [mPa·s, 20° C.]: | 256 |
| CC-5-V | 10.00% | | |
| CH-33 | 3.00% | | |
| CH-35 | 3.00% | | |
| CP-33 | 3.00% | | |
| CP-35 | 2.00% | | |
| CCPC-33 | 3.00% | | |

H35: Nematic Host-Mixture

| | | | |
|---|---|---|---|
| CY-3-O2 | 2.40% | Clearing point [° C.]: | 101 |
| CY-3-O4 | 18.80% | $\Delta n$ [589 nm, 20° C.]: | 0.0970 |
| CY-5-O2 | 2.40% | $\varepsilon_\parallel$ [1 kHz, 20° C.]: | 3.7 |
| CCY-3-O2 | 7.00% | $\varepsilon_\perp$ [1 kHz, 20° C.]: | 8.2 |
| CCY-5-O2 | 7.90% | $\Delta\varepsilon$ [1 kHz, 20° C.]: | -4.5 |
| CCY-2-1 | 4.90% | $K_1$ [pN, 20° C.]: | 14.8 |
| CCY-3-1 | 5.30% | $K_3$ [pN, 20° C.]: | 17.6 |
| CPY-2-O2 | 5.70% | $V_0$ [pN, 20° C.]: | 2.09 |
| CCH-301 | 8.50% | $\gamma_1$ [mPa·s, 20° C.]: | 244 |
| CH-33 | 0.90% | | |
| CH-35 | 0.90% | | |
| CP-33 | 1.20% | | |
| CP-35 | 1.20% | | |
| CCPC-33 | 3.00% | | |
| CCPC-34 | 2.70% | | |
| CCPC-35 | 0.60% | | |
| CCY-3-O3 | 4.90% | | |
| CCY-4-O2 | 4.90% | | |
| CPY-3-O2 | 4.20% | | |
| PYP-2-3 | 3.50% | | |
| CCH-303 | 4.20% | | |
| CCH-501 | 4.90% | | |

H36: Nematic Host-Mixture

| | | | |
|---|---|---|---|
| CY-3-O2 | 6.00% | Clearing point [° C.]: | 101 |
| CY-3-O4 | 13.00% | $\Delta n$ [589 nm, 20° C.]: | 0.1483 |
| CCY-3-O2 | 6.00% | $\varepsilon_\parallel$ [1 kHz, 20° C.]: | 3.6 |
| CCY-3-O3 | 5.00% | $\varepsilon_\perp$ [1 kHz, 20° C.]: | 7.0 |
| CPY-2-O2 | 4.00% | $\Delta\varepsilon$ [1 kHz, 20° C.]: | -3.4 |
| CC-4-V | 14.00% | $K_1$ [pN, 20° C.]: | 16.6 |
| CCP-V-1 | 10.00% | $K_3$ [pN, 20° C.]: | 18.8 |
| CCP-V2-1 | 11.00% | $V_0$ [pN, 20° C.]: | 2.47 |
| CPTP-3-1 | 5.00% | | |
| PTP-3O2FF | 8.00% | | |
| PTP-5O2FF | 8.00% | | |
| CPTP-3O2FF | 5.00% | | |
| CPTP-5O2FF | 5.00% | | |

H37: Nematic Host-Mixture

| | | | |
|---|---|---|---|
| CY-3-O2 | 10.00% | Clearing point [° C.]: | 100 |
| CY-3-O4 | 20.00% | $\Delta n$ [589 nm, 20° C.]: | 0.0865 |
| CY-5-O4 | 20.00% | $\varepsilon_\parallel$ [1 kHz, 20° C.]: | 3.9 |
| CCY-3-O2 | 6.00% | $\varepsilon_\perp$ [1 kHz, 20° C.]: | 9.3 |
| CCY-3-O3 | 6.00% | $\Delta\varepsilon$ [1 kHz, 20° C.]: | -5.4 |
| CCY-4-O2 | 6.00% | $K_1$ [pN, 20° C.]: | 15.6 |
| CCY-5-O2 | 6.00% | $K_3$ [pN, 20° C.]: | 16.6 |
| CH-33 | 3.00% | $V_0$ [pN, 20° C.]: | 1.84 |
| CH-35 | 3.50% | $\gamma_1$ [mPa·s, 20° C.]: | 347 |
| CH-43 | 3.50% | | |
| CH-45 | 3.50% | | |
| CCPC-33 | 4.00% | | |
| CCPC-34 | 4.50% | | |
| CCPC-35 | 4.00% | | |

H38: Nematic Host-Mixture

| | | | |
|---|---|---|---|
| CY-3-O2 | 3.00% | Clearing point [° C.]: | 102 |
| CY-3-O4 | 10.00% | $\Delta n$ [589 nm, 20° C.]: | 0.1602 |
| CCY-3-O2 | 6.00% | $\varepsilon_\parallel$ [1 kHz, 20° C.]: | 3.8 |
| CCY-3-O3 | 6.00% | $\varepsilon_\perp$ [1 kHz, 20° C.]: | 7.8 |
| CCY-4-O2 | 6.00% | $\Delta\varepsilon$ [1 kHz, 20° C.]: | -4.0 |
| CPY-2-O2 | 5.00% | $K_1$ [pN, 20° C.]: | 16.8 |
| CC-4-V | 14.00% | $K_3$ [pN, 20° C.]: | 19.3 |
| CCP-V-1 | 5.00% | $V_0$ [pN, 20° C.]: | 2.32 |
| CCP-V2-1 | 10.00% | $\gamma_1$ [mPa·s, 20° C.]: | 216 |
| PPTUI-3-2 | 3.00% | | |
| PTP-3O2FF | 11.00% | | |
| PTP-5O2FF | 11.00% | | |
| CPTP-3O2FF | 5.00% | | |
| CPTP-5O2FF | 5.00% | | |

H39: Nematic Host-Mixture

| | | | |
|---|---|---|---|
| CY-3-O2 | 5.00% | Clearing point [° C.]: | 102 |
| CY-3-O4 | 15.00% | $\Delta n$ [589 nm, 20° C.]: | 0.2503 |
| CCY-3-O2 | 6.00% | $\varepsilon_\parallel$ [1 kHz, 20° C.]: | 4.3 |
| CCY-3-O3 | 6.00% | $\varepsilon_\perp$ [1 kHz, 20° C.]: | 8.3 |
| CPY-2-O2 | 3.00% | $\Delta\varepsilon$ [1 kHz, 20° C.]: | -4.0 |
| PTP-102 | 5.00% | $K_1$ [pN, 20° C.]: | 19.5 |
| PPTUI-3-2 | 15.00% | $K_3$ [pN, 20° C.]: | 24.0 |
| PPTUI-3-4 | 11.00% | $V_0$ [pN, 20° C.]: | 2.57 |
| PTP-3O2FF | 12.00% | $\gamma_1$ [mPa·s, 20° C.]: | 392 |
| PTP-5O2FF | 12.00% | | |
| CPTP-3O2FF | 5.00% | | |
| CPTP-5O2FF | 5.00% | | |

H40: Nematic Host-Mixture

| | | | |
|---|---|---|---|
| CY-3-O4 | 12.00% | Clearing point [° C.]: | 91 |
| PY-3-O2 | 6.50% | $\Delta n$ [589 nm, 20° C.]: | 0.2100 |
| CCY-3-O2 | 2.00% | $\varepsilon_\parallel$ [1 kHz, 20° C.]: | 4.0 |
| CPY-2-O2 | 3.50% | $\varepsilon_\perp$ [1 kHz, 20° C.]: | 7.1 |
| CC-4-V | 13.50% | $\Delta\varepsilon$ [1 kHz, 20° C.]: | -3.1 |
| CC-5-V | 4.00% | $K_1$ [pN, 20° C.]: | 15.3 |
| PPTUI-3-2 | 15.00% | $K_3$ [pN, 20° C.]: | 19.3 |
| PPTUI-3-4 | 5.50% | $V_0$ [pN, 20° C.]: | 2.64 |
| PTP-3O2FF | 12.00% | $\gamma_1$ [mPa·s, 20° C.]: | 211 |
| PTP-5O2FF | 12.00% | | |
| CPTP-3O2FF | 5.00% | | |
| CPTP-5O2FF | 5.00% | | |
| CCPC-33 | 4.00% | | |

H41: Nematic Host-Mixture

| | | | |
|---|---|---|---|
| D-302FF | 8.00% | Clearing point [° C.]: | 102 |
| D-402FF | 8.00% | $\Delta n$ [589 nm, 20° C.]: | 0.14780 |
| D-502FF | 8.00% | $\varepsilon_\parallel$ [1 kHz, 20° C.]: | 3.4 |
| PCH-301 | 18.00% | $\varepsilon_\perp$ [1 kHz, 20° C.]: | 5.1 |
| PCH-302 | 15.00% | $\Delta\varepsilon$ [1 kHz, 20° C.]: | -1.7 |
| PCH-304 | 4.00% | | |
| PTP-102 | 4.00% | | |
| PTP-201 | 4.00% | | |
| CPTP-301 | 6.00% | | |
| CPTP-302 | 6.00% | | |
| CPTP-303 | 7.00% | | |
| CCPC-33 | 4.00% | | |
| CCPC-34 | 4.00% | | |
| CCPC-35 | 4.00% | | |

H42: Nematic Host-Mixture

| | | | |
|---|---|---|---|
| D-302FF | 15.00% | Clearing point [° C.]: | 109 |
| D-402FF | 15.00% | $\Delta n$ [589 nm, 20° C.]: | 0.1727 |
| D-502FF | 15.00% | $\varepsilon_\parallel$ [1 kHz, 20° C.]: | 5.2 |
| CP-302FF | 5.00% | $\varepsilon_\perp$ [1 kHz, 20° C.]: | 13.2 |

175
-continued

| | | | |
|---|---|---|---|
| CP-402FF | 5.00% | Δε [1 kHz, 20° C.]: | −8.0 |
| CP-502FF | 5.00% | $K_1$ [pN, 20° C.]: | 15.6 |
| PTP-3O2FF | 10.00% | $K_3$ [pN, 20° C.]: | 22.8 |
| PTP-5O2FF | 10.00% | | |
| CPTP-3O2FF | 10.00% | | |
| CPTP-5O2FF | 10.00% | | |

H43: Nematic Host-Mixture

| | | | |
|---|---|---|---|
| D-302FF | 7.00% | Clearing point [° C.]: | 85 |
| D-402FF | 7.00% | Δn [589 nm, 20° C.]: | 0.1640 |
| D-502FF | 7.00% | $\epsilon_\parallel$ [1 kHz, 20° C.]: | 3.7 |
| PTP-3O2FF | 10.00% | $\epsilon_\perp$ [1 kHz, 20° C.]: | 6.4 |
| PTP-5O2FF | 10.00% | Δε [1 kHz, 20° C.]: | −2.7 |
| CPTP-301 | 5.00% | | |
| CPTP-302 | 5.00% | | |
| CPTP-303 | 5.00% | | |
| PCH-301 | 19.00% | | |
| PCH-302 | 17.00% | | |
| CBC-33F | 5.00% | | |
| CBC-53F | 3.00% | | |

H44: Nematic Host-Mixture

| | | | |
|---|---|---|---|
| CCPC-33 | 1.50% | Clearing point [° C.]: | 91 |
| CCPC-34 | 1.50% | Δn [589 nm, 20° C.]: | 0.1029 |
| CCPC-35 | 1.50% | $\epsilon_\parallel$ [1 kHz, 20° C.]: | 3.5 |
| CCY-2-1 | 4.50% | $\epsilon_\perp$ [1 kHz, 20° C.]: | 7.2 |
| CCY-3-1 | 3.50% | Δε [1 kHz, 20° C.]: | −3.7 |
| CCY-3-O2 | 7.00% | $K_1$ [pN, 20° C.]: | 15.5 |
| CCY-3-O3 | 8.00% | $K_3$ [pN, 20° C.]: | 15.2 |
| CCY-4-O2 | 7.00% | $V_0$ [pN, 20° C.]: | 2.21 |
| CPY-2-O2 | 6.00% | $\gamma_1$ [mPa · s, 20° C.]: | 231 |
| CPY-3-O2 | 6.00% | | |
| CY-3-O4 | 12.00% | | |
| CY-5-O4 | 12.00% | | |
| PCH-53 | 10.50% | | |
| CCH-34 | 5.50% | | |
| CCOC-3-3 | 2.00% | | |
| CCOC-4-3 | 2.00% | | |
| CCOC-3-5 | 2.00% | | |
| CBC-33 | 1.50% | | |
| PP-1-2V1 | 6.00% | | |

H45: Nematic Host-Mixture

| | | | |
|---|---|---|---|
| CY-5-O2 | 7.00% | Clearing point [° C.]: | 95 |
| CPY-2-O2 | 11.00% | Δn [589 nm, 20° C.]: | 0.1268 |
| CPY-3-O2 | 10.00% | $\epsilon_\parallel$ [1 kHz, 20° C.]: | 4.0 |
| PYP-2-3 | 6.00% | $\epsilon_\perp$ [1 kHz, 20° C.]: | 7.7 |
| PYP-2-4 | 7.00% | Δε [1 kHz, 20° C.]: | −3.7 |
| CC-4-V | 17.00% | $K_1$ [pN, 20° C.]: | 15.5 |
| CC-3-V1 | 9.00% | $K_3$ [pN, 20° C.]: | 15.2.0 |
| CCH-34 | 5.00% | $V_0$ [pN, 20° C.]: | 2.15 |
| CPYP-3-2 | 5.00% | $\gamma_1$ [mPa · s, 20° C.]: | 155 |
| CPYP-2-1 | 5.00% | | |
| CK-3-F | 9.00% | | |
| CK-5-F | 9.00% | | |

H46: Nematic Host-Mixture

| | | | |
|---|---|---|---|
| CY-3-O4 | 18.00% | Clearing point [° C.]: | 96 |
| CY-5-O2 | 10.00% | Δn [589 nm, 20° C.]: | 0.1275 |
| CCY-4-O2 | 10.00% | $\epsilon_\parallel$ [1 kHz, 20° C.]: | 4.0 |
| CCY-3-O3 | 10.00% | $\epsilon_\perp$ [1 kHz, 20° C.]: | 9.1 |
| CPY-2-O2 | 11.00% | Δε [1 kHz, 20° C.]: | −5.1 |
| CPY-3-O2 | 12.00% | $K_1$ [pN, 20° C.]: | 14.4 |
| PYP-2-3 | 5.00% | $K_3$ [pN, 20° C.]: | 15.6 |
| PYP-2-4 | 4.00% | $V_0$ [pN, 20° C.]: | 1.84 |

176
-continued

| | | | |
|---|---|---|---|
| CC-4-V | 13.00% | $\gamma_1$ [mPa · s, 20° C.]: | 253 |
| CPYP-3-2 | 7.00% | | |

Example M1

The compound of the formula I-8a-3

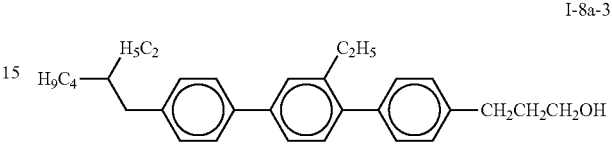

I-8a-3

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer). The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-8a-3, no alignment layer (e.g. no PI coating) is required anymore for PM-VA, PVA, MVA, and other analogue display technologies based on the combination Δε<0 and homeotropic orientation.

Example 1P a)

Polymer Stabilization of the LC Mixture of Example M1

The polymerizable derivative RM-1 (0.3%) is added to the nematic LC-mixture of Example M1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm²) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-8a-3 in combination with RM-1, no alignment layer is required anymore for PSA, PS-VA, and other analogue display technologies based on the combination Δε<0 and homeotropic orientation.

Example 1P b)

Polymer Stabilization of the LC Mixture of Example M1

The polymerizable derivative RM-41 (0.3%) is added to the nematic LC-mixture of Example M1. The resulting mixture is homogenised and filled into an "alignment-free" test cell (cell thickness d~4.0 µm, ITO coating on both sides (structured ITO in case of a multi-domain switching), no alignment layer and no passivation layer). The resulting cell is treated according to Example 1P a) and similar results are obtained.

By using additives like the compound of the formula I-8a-3 in combination with RM-41, no alignment layer is required anymore for PSA, PS-VA, and other analogue display technologies based on the combination $\Delta\epsilon<0$ and homeotropic orientation.

Examples M2 to M9 and 2P a) to 9P b)

The compound of the formula I-8a-3 (1.5%) is added to the nematic host mixtures H2-H9. The resulting 8 mixtures are homogenised and filled into an "alignment-free" test cell (cell thickness d~4.0 µm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M2-M9. The resulting mixtures are homogenised and filled into an "alignment-free" test cell (cell thickness d~4.0 µm, ITO coating on both sides (structured ITO in case of a multi-domain switching), no alignment layer and no passivation layer). The resulting cell is treated according to example 1P a). Equivalent results are obtained.

Examples 1P c) to 9P f)

Analogues mixtures like 1P a) to 9P b) are obtained by mixing the nematic LC mixtures M1 to M9 with RM-37 (0.3%), RM-61 (0.3%), RM-80 (0.3%) or RM-84 (0.3%), obtaining mixtures 1P c) to 9P f). These mixtures are treated according to Example 1P a). In all cases an improvement of the switching times is found.

Example M10

The compound of the formula I-1a-23

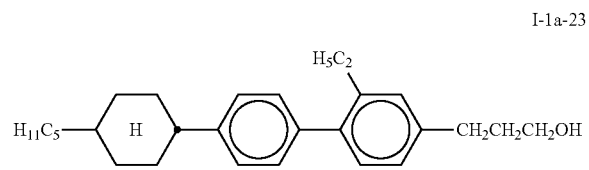

I-1a-23

(1.5%) is added to the nematic host mixture H1. The resulting mixture is homogenised and filled into an "alignment-free" test cell (cell thickness d~4.0 µm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-1a-23, no alignment layer (e.g. no PI coating) is required anymore for PM-VA, PVA, MVA, and other analogue display technologies based on the combination $\Delta\epsilon<0$ and homeotropic orientation.

Example 10P a)

Polymer Stabilization of the LC Mixture of Example M10

The polymerizable derivative RM-1 (0.3%) is added to the nematic LC-mixture of Example M10. The resulting mixture is homogenised and filled into an "alignment-free" test cell (cell thickness d~4.0 µm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-1a-23 in combination with RM-1, no alignment layer is required anymore for PSA, PS-VA, and other analogue display technologies based on the combination $\Delta\epsilon<0$ and homeotropic orientation.

Example 10P b)

Polymer Stabilization of the LC Mixture of Example M10

The polymerizable derivative RM-41 (0.3%) is added to the nematic LC-mixture of Example M10. The resulting mixture is homogenised and filled into an "alignment-free" test cell (cell thickness d~4.0 µm, ITO coating on both sides (structured ITO in case of a multi-domain switching), no alignment layer and no passivation layer). The resulting cell is treated according to Example 2P a) and similar results are obtained.

By using additives like the compound of the formula I-1a-23 in combination with RM-41, no alignment layer is required anymore for PSA, PS-VA, and other analogue display technologies based on the combination $\Delta\epsilon<0$ and homeotropic orientation.

Examples M11 to M18 and 11P a) to 18P b)

The compound of the formula I-1a-23 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M11-M18. The resulting mixtures are homogenised and filled into an "alignment-free" test cell (cell thickness d~4.0 μm, ITO coating on both sides (structured ITO in case of a multi-domain switching), no alignment layer and no passivation layer). The resulting cell is treated according to example 1P a). Equivalent results are obtained.

Examples 10P c) to 18P f)

Analogues mixtures like 1P a) to 9P b) are obtained by mixing the nematic LC mixtures M11 to M18 with RM-37 (0.3%), RM-61 (0.3%), RM-80 (0.3%) or RM-84 (0.3%), obtaining mixtures 10P c) to 18P f). These mixtures are treated according to Example 1P a). In all cases an improvement of the switching times is found.

Example M19

The compound of the formula I-4a-22

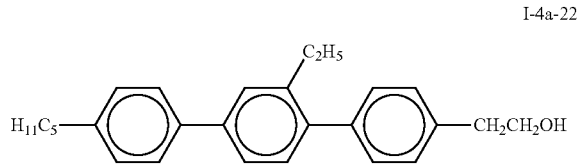

I-4a-22

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-4a-22, no alignment layer (e.g. no PI coating) is required anymore for PM-VA, PVA, MVA, and other analogue display technologies based on the combination Δε<0 and homeotropic orientation.

Example 19P a)

Polymer Stabilization of the LC Mixture of Example M19

The polymerizable derivative RM-1 (0.3%) is added to the nematic LC-mixture of Example M19. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-4a-22 in combination with RM-1, no alignment layer is required anymore for PSA, PS-VA, and other analogue display technologies based on the combination Δε<0 and homeotropic orientation.

Example 19P b)

Polymer Stabilization of the LC Mixture of Example M19

The polymerizable derivative RM-41 (0.3%) is added to the nematic LC-mixture of Example M19. The resulting mixture is homogenised and filled into an "alignment-free" test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-4a-22 in combination with RM-41, no alignment layer is required anymore for PSA, PS-VA, and other analogue display technologies based on the combination Δε<0 and homeotropic orientation.

Examples M20 to M27 and 20P a) to 27P b)

The compound of the formula I-4a-22 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M20-M27. The resulting mixtures are homogenised and filled into an "alignment-free" test cell (cell thickness d~4.0 μm, ITO coating on both sides (structured ITO in case of a multi-domain switching), no alignment layer and no passivation layer). Theresulting cell is treated according to example 1P a). Equivalent results are obtained.

Examples 19P c) to 27P f)

Analogues mixtures like 1P a) to 9P b) are obtained by mixing the nematic LC mixtures M20 to M27 with RM-37 (0.3%), RM-61 (0.3%), RM-80 (0.3%) or RM-84 (0.3%), obtaining mixtures 19P c) to 27P f). These mixtures are treated according to Example 1P a). In all cases an improvement of the switching times is found.

Example M28

The compound of the formula I-3a-22

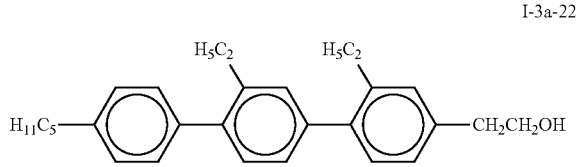

I-3a-22

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-3a-22, no alignment layer (e.g. no PI coating) is required anymore for PM-VA, PVA, MVA, and other analogue display technologies based on the combination $\Delta\varepsilon<0$ and homeotropic orientation.

Example 28P a)

Polymer Stabilization of the LC Mixture of Example M28

The polymerizable derivative RM-1 (0.3%) is added to the nematic LC-mixture of Example M28. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-3a-22 in combination with RM-1, no alignment layer is required anymore for PSA, PS-VA, and other analogue display technologies based on the combination $\Delta\varepsilon<0$ and homeotropic orientation.

Example 28P b)

Polymer Stabilization of the LC Mixture of Example M28

The polymerizable derivative RM-41 (0.3%) is added to the nematic LC-mixture of Example M28. The resulting mixture is homogenised and filled into an "alignment-free" test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-3a-22 in combination with RM-41, no alignment layer is required anymore for PSA, PS-VA, and other analogue display technologies based on the combination $\Delta\varepsilon<0$ and homeotropic orientation.

Examples M29 to M36 and 29P a) to 36P b)

The compound of the formula I-3a-22 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M29-M36. The resulting mixtures are homogenised and filled into an "alignment-free" test cell (cell thickness d~4.0 μm, ITO coating on both sides (structured ITO in case of a multi-domain switching), no alignment layer and no passivation layer). The resulting cell is treated according to example 1P a). Equivalent results are obtained.

Examples 28P c) to 36P f)

Analogues mixtures like 1P a) to 9P b) are obtained by mixing the nematic LC mixtures M29 to M36 with RM-37 (0.3%), RM-61 (0.3%), RM-80 (0.3%) or RM-84 (0.3%), obtaining mixtures 28P c) to 36P f). These mixtures are treated according to Example 1P a). In all cases an improvement of the switching times is found.

Example M37

The compound of the formula I-3a-23

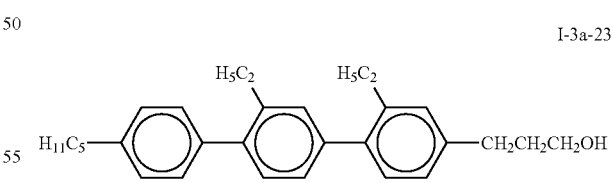

I-3a-23

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-3a-23, no alignment layer (e.g. no PI coating) is required anymore for PM-VA, PVA, MVA, and other analogue display technologies based on the combination Δε<0 and homeotropic orientation.

Example 37P a)

Polymer Stabilization of the LC Mixture of Example M37

The polymerizable derivative RM-1 (0.3%) is added to the nematic LC-mixture of Example M37. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-3a-23 in combination with RM-1, no alignment layer is required anymore for PSA, PS-VA, and other analogue display technologies based on the combination Δε<0 and homeotropic orientation.

Example 37P b)

Polymer Stabilization of the LC Mixture of Example M37

The polymerizable derivative RM-41 (0.3%) is added to the nematic LC-mixture of Example M37. The resulting mixture is homogenised and filled into an "alignment-free" test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-3a-23 in combination with RM-41, no alignment layer is required anymore for PSA, PS-VA, and other analogue display technologies based on the combination Δε<0 and homeotropic orientation.

Examples M38 to M45 and 38P a) to 45P b)

The compound of the formula I-3a-23 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M38-M45. The resulting mixtures are homogenised and filled into an "alignment-free" test cell (cell thickness d~4.0 μm, ITO coating on both sides (structured ITO in case of a multi-domain switching), no alignment layer and no passivation layer). The resulting cell is treated according to example 1P a). Equivalent results are obtained.

Examples 37P c) to 45P f)

Analogues mixtures like 1P a) to 9P b) are obtained by mixing the nematic LC mixtures M38 to M45 with RM-37 (0.3%), RM-61 (0.3%), RM-80 (0.3%) or RM-84 (0.3%), obtaining mixtures 37P c) to 45P f). These mixtures are treated according to Example 1P a). In all cases an improvement of the switching times is found.

Example M46

The compound of the formula I-5a-22

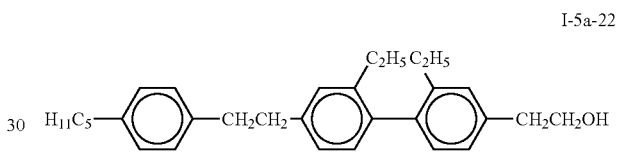

I-5a-22

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-5a-22, no alignment layer (e.g. no PI coating) is required anymore for PVA, MVA, and other analogue display technologies based on the combination Δε<0 and homeotropic orientation.

Example 46P a)

Polymer Stabilization of the LC Mixture of Example M46

The polymerizable derivative RM-1 (0.3%) is added to the nematic LC-mixture of Example M46. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-5a-22 in combination with RM-1, no alignment layer is required anymore for PSA, PS-VA, and other analogue display technologies based on the combination $\Delta\varepsilon<0$ and homeotropic orientation.

Example 46P b)

Polymer Stabilization of the LC Mixture of Example M46

The polymerizable derivative RM-41 (0.3%) is added to the nematic LC-mixture of Example M46. The resulting mixture is homogenised and filled into an "alignment-free" test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-5a-22 in combination with RM-41, no alignment layer is required anymore for PSA, PS-VA, and other analogue display technologies based on the combination $\Delta\varepsilon<0$ and homeotropic orientation.

Examples M47 to M54 and 47P a) to 54P b)

The compound of the formula I-5a-22 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M47-M54. The resulting mixtures are homogenised and filled into an "alignment-free" test cell (cell thickness d~4.0 μm, ITO coating on both sides (structured ITO in case of a multi-domain switching), no alignment layer and no passivation layer). The resulting cell is treated according to example 1P a). Equivalent results are obtained.

Examples 46P c) to 54P f)

Analogues mixtures like 1P a) to 9P b) are obtained by mixing the nematic LC mixtures M46 to M54 with RM-37 (0.3%), RM-61 (0.3%), RM-80 (0.3%) or RM-84 (0.3%), obtaining mixtures 46P c) to 54P f). These mixtures are treated according to Example 1P a). In all cases an improvement of the switching times is found.

Example M55

The compound of the formula I-9a-3

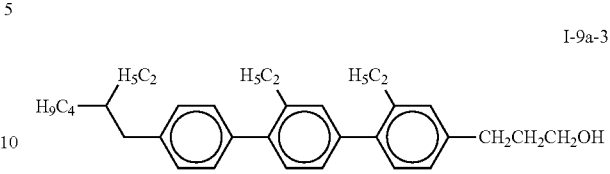

I-9a-3

(1.5%) is added to the nematic host mixture H1. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-9a-3, no alignment layer (e.g. no PI coating) is required anymore for PM-VA, PVA, MVA, and other analogue display technologies based on the combination $\Delta\varepsilon<0$ and homeotropic orientation.

Example 55P a)

Polymer Stabilization of the LC Mixture of Example M55

The polymerizable derivative RM-1 (0.3%) is added to the nematic LC-mixture of Example M55. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-9a-3 in combination with RM-1, no alignment layer is required anymore for PSA, PS-VA, and other analogue display technologies based on the combination $\Delta\varepsilon<0$ and homeotropic orientation.

Example 55P b)

Polymer Stabilization of the LC Mixture of Example M55

The polymerizable derivative RM-41 (0.3%) is added to the nematic LC-mixture of Example M55. The resulting mixture is homogenised and filled into an "alignment-free"

test cell (cell thickness d~4.0 μm, ITO coating on both sides (structured ITO in case of a multi-domain switching), no alignment layer and no passivation layer). The resulting cell is treated according to Example 1P a) and similar results are obtained.

By using additives like the compound of the formula I-9a-3 in combination with RM-41, no alignment layer is required anymore for PSA, PS-VA, and other analogue display technologies based on the combination Δε<0 and homeotropic orientation.

Examples M56 to M63 and 56P a) to 63P b)

The compound of the formula I-9a-3 (1.5%) is added to the nematic host mixtures H2-H9. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching.

The polymerizable derivative RM-1 (0.3%) or RM-41 (0.3%) is added to the nematic LC mixtures of Examples M56-M63. The resulting mixtures are homogenised and filled into an "alignment-free" test cell (cell thickness d~4.0 μm, ITO coating on both sides (structured ITO in case of a multi-domain switching), no alignment layer and no passivation layer). The resulting cell is treated according to example 1P a). Equivalent results are obtained.

Examples 55P c) to 63P f)

Analogues mixtures like 1P a) to 9P b) are obtained by mixing the nematic LC mixtures M55 to M63 with RM-37 (0.3%), RM-61 (0.3%), RM-80 (0.3%) or RM-84 (0.3%), obtaining mixtures 55P c) to 63P f). These mixtures are treated according to Example 1P a). In all cases an improvement of the switching times is found.

The voltage holding ratio (VHR) of the mixtures M1, M10, M19, M28, M37, M46 and M55 are reported in the table below:

| SA-Additive | wt. % | Initial VHR | VHR after 120° C., 2 h |
|---|---|---|---|
| Host H1 |  | 93.8 | 95.1 |
| I-8a-3 | 2.0 | 87.3 | 92.4 |
| I-1a-23 | 2.0 | 93.8 | 95.4 |
| I-4a-22 | 2.0 | 88.0 | 91.9 |
| I-3a-22 | 2.0 | 85.1 | 89.1 |
| I-5a-22 | 2.0 | 76.6 | 79.9 |
| I-9a-3 | 2.0 | 81.4 | 82.9 |
| I-3a-23 | 2.0 | 87.8 | 89.1 |

Example M64

1.5% of the compound of the formula I-1a-23

I-1a-23

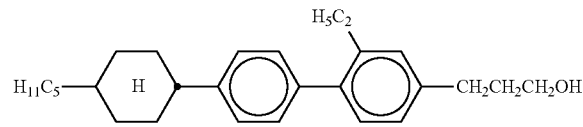

and
0.05% of the compound of the formula

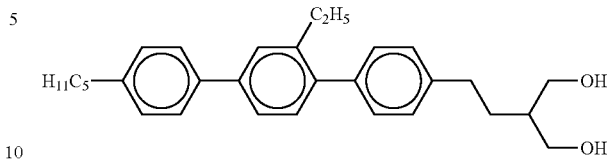

are added to the nematic host mixture H7. The resulting mixture is homogenised and filled into an "alignment-free" test cell (cell thickness d~4.0 μm, ITO coating on both sides (structured ITO in case of a multi-domain switching), no alignment layer and no passivation layer). The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-1a-23, no alignment layer (e.g. no PI coating) is required anymore for PM-VA, PVA, MVA, and other analogue display technologies based on the combination Δε<0 and homeotropic orientation.

Example 64P a)

Polymer Stabilization of the LC Mixture of Example M64

The polymerizable derivative RM-1 (0.2%) is added to the nematic LC-mixture of Example M64. The resulting mixture is homogenised and filled into an "alignment-free" test cell (cell thickness d~4.0 μm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system. Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-1a-23 in combination with RM-1, no alignment layer is required anymore for PSA, PS-VA, and other analogue display technologies based on the combination Δε<0 and homeotropic orientation.

Examples M65 to M111 and 65P a) to 111P b)

The compound of the formula I-3a-23 (1.5%) is added to the nematic host mixtures H10-H46. The resulting 8 mixtures are homogenised and filled into an "alignment-free" test cell (cell thickness d~4.0 μm, ITO coating on both sides (structured ITO in case of a multi-domain switching), no alignment layer and no passivation layer).

The LC-mixtures show a spontaneous homeotropic (vertical) orientation with respect to the surface of the substrates. The orientation is stable until the clearing point and the resulting VA-cell can be reversibly switched. Crossed polarizers are needed to display the switching. The polymerizable derivative RM-1 (0.3%) or RM-41 (0.3%) is added to the nematic LC mixtures of Examples M65-M111. The resulting mixtures are homogenised and filled into an "alignment-free" test cell (cell thickness d~4.0 µm, ITO coating on both sides (structured ITO in case of a multi-domain switching), no alignment layer and no passivation layer). The resulting cell is treated according to example 1P a). Equivalent results are obtained.

Examples 65P c) to 111P f)

Analogues mixtures like 1P a) to 9P b) are obtained by mixing the nematic LC mixtures M38 to M45 with RM-37 (0.3%), RM-61 (0.3%), RM-80 (0.3%) or RM-84 (0.3%), obtaining mixtures 37P c) to 45P f). These mixtures are treated according to Example 1P a). In all cases an improvement of the switching times is found.

Example M112

The compound of the formula I-5a-22

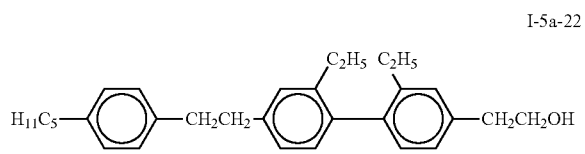

I-5a-22

(1.5%) is added to the nematic host mixture H46. The resulting mixture is homogenised and filled into an "alignment-free" test cell (cell thickness d~4.0 µm, ITO coating on both sides (structured ITO in case of a multi-domain switching), no alignment layer and no passivation layer).

The LC-mixture shows a spontaneous homeotropic (vertical) orientation with respect to the surface of the substrates. The orientation is stable until the clearing point and the resulting VA-cell can be reversibly switched. Crossed polarizers are needed to display the switching.

By using additives like the compound of the formula I-5a-22, no alignment layer (e.g. no PI coating) is required anymore for PVA, MVA, and other analogue display technologies based on the combination Δε<0 and homeotropic orientation.

Example 112P a)

Polymer Stabilization of the LC Mixture of Example M112

The polymerizable derivative RM-1 (0.3%) is added to the nematic LC-mixture of Example M112. The resulting mixture is homogenised and filled into an "alignment-free" test cell (cell thickness d~4.0 µm, ITO coating on both sides (structured ITO in case of a multi-domain switching), no alignment layer and no passivation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched even at high temperatures. The switching times are reduced, compared to the not polymerized system.

Additives like Irganox 1076 (BASF) may be added (e.g. 0.001%) for preventing spontaneous polymerization. UV-cut filter may be used during polymerization for preventing damage of the mixtures (e.g. 340 nm cut-filter).

By using additives like the compound of the formula I-5a-22 in combination with RM-1, no alignment layer is required anymore for PSA, PS-VA, and other analogue display technologies based on the combination Δε<0 and homeotropic orientation.

Example 112P b)

Polymer Stabilization of the LC Mixture of Example M112

The polymerizable derivative RM-41 (0.3%) is added to the nematic LC-mixture of Example M112. The resulting mixture is homogenised and filled into an "alignment-free" test cell (cell thickness d~4.0 µm, ITO coating on both sides (structured ITO in case of a multi-domain switching), no alignment layer and no passivation layer). The resulting cell is treated according to Example 1P a) and similar results are obtained.

By using additives like the compound of the formula I-5a-22 in combination with RM-41, no alignment layer is required anymore for PSA, PS-VA, and other analogue display technologies based on the combination Δε<0 and homeotropic orientation.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European Application No. 13005833.2, filed Dec. 16, 2013 are incorporated by reference herein.

The invention claimed is:

1. Liquid-crystalline medium based on a mixture of polar compounds wherein the mixture comprises at least one compound of the formula I,

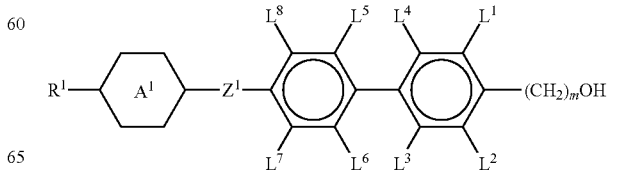

in which

R¹ denotes a straight-chain alkyl or alkoxy radical having 1 to 15 C atoms, where, in addition, one or more CH₂ groups in these radicals may each be replaced, independently of one another, by —C≡C—, —CF₂O—, —CH=CH—, —◇—, —◇◇—, —CO—O—, or —O—CO— in such a way that O atoms are not linked directly to one another, and in which, in addition, one or more H atoms may be replaced by halogen,

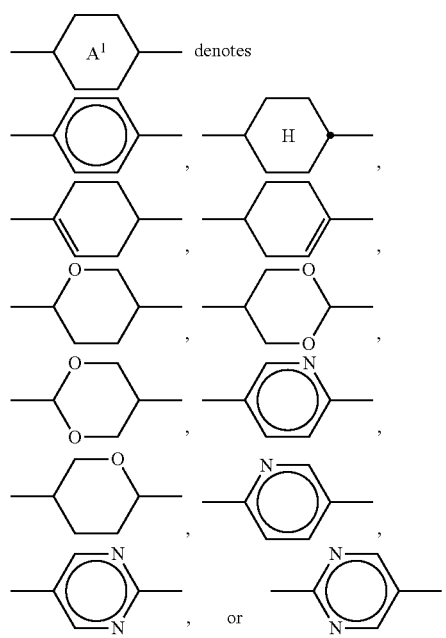

Z¹ denotes a single bond, —CH₂CH₂—, —CH=CH—, —CF₂O—, —OCF₂—, —CH₂O—, —OCH₂—, —COO—, —OCO—, —C₂F₄—, —CF=CF—, —C₂F₄—, —CHFCHF—, —CH₂CHF—, —CFHCF₂—, —CF₂CHF—, —CHFCH₂—, —CH₂CF₂O—, or —CH=CHCH₂O—, L¹ to L⁸ each, independently of one another, denote H or alkyl with 1-8 carbon atoms, provided that at least one of L¹ to L⁸ denotes alkyl with 1-8 carbon atoms.

m denotes 0, 1, 2, 3, 4, 5 or 6.

2. Liquid-crystalline medium according to claim 1 which further comprises at least one polymerisable compound.

3. Liquid-crystalline medium according to claim 1 wherein the mixture contains 0.01 to 10% by weight of the compound of the formula I based on the mixture as a whole.

4. Liquid-crystalline medium according to claim 1 wherein the at least one compound of the formula I is selected from the following group of compounds of the formula I-1 to I-9,

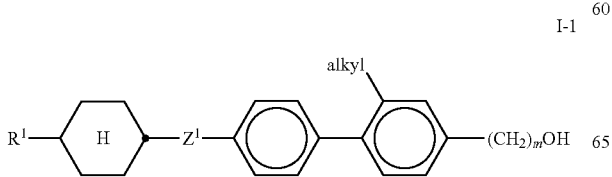

I-1

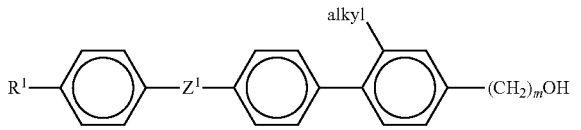

I-2

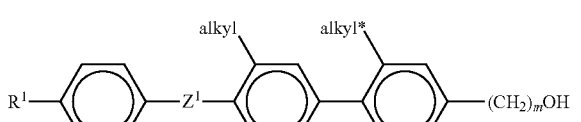

I-3

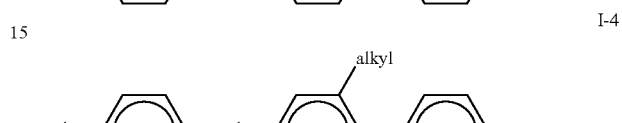

I-4

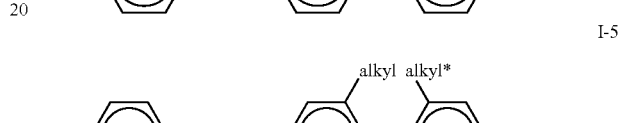

I-5

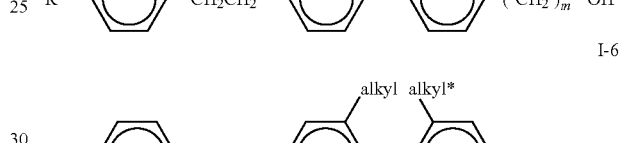

I-6

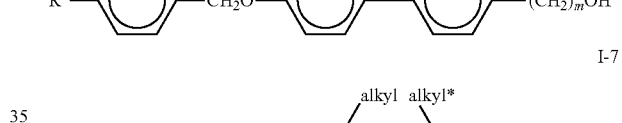

I-7

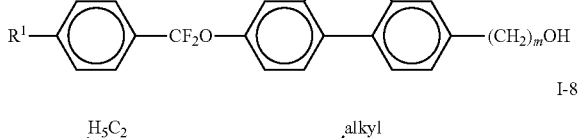

I-8

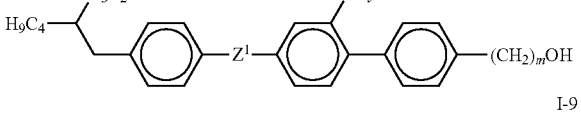

I-9

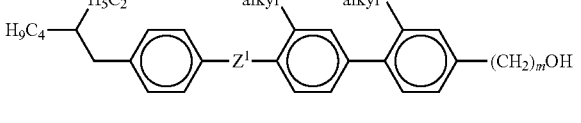

in which R¹, Z¹ and m have the meanings as defined in claim 1 and alkyl and alkyl* each independently denote a straight-chain alkyl radical having 1 to 8 carbon atoms.

5. Liquid-crystalline medium according to claim 2, wherein the polymerisable compound is selected from the compounds of the formula M $$R^{Ma}\text{-}A^{M1}\text{-}(Z^{M1}\text{-}A^{M2})_{m1}\text{-}R^{Mb} \qquad M$$

in which the individual radicals have the following meanings:

$R^{Ma}$ and $R^{Mb}$ each, independently of one another, denote P, P-Sp-, H, halogen, SF₅, NO₂, an alkyl, alkenyl or alkynyl group, P denotes a polymerisable group, Sp denotes a spacer group or a single bond, $A^{M1}$ and $A^{M2}$ each, independently of one another, denote an aromatic, heteroaromatic, alicyclic or heterocyclic group, having 4 to 25 ring atoms, which may also encompass or contain fused rings, and which may optionally be mono- or polysubstituted by L, L denotes P, P-Sp-, F, Cl, Br, I, $SF_5$, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, $Y^1$ denotes halogen, $Z^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, $CR^0R^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, or —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one group from the group $R^{Ma}$, $R^{Mb}$ and the substituents L present denotes a group P or P-Sp- or contains at least one group P or P-Sp-.

6. Liquid-crystalline medium according to claim 5, wherein the polymerisable compound of the formula M is selected from the group of compounds of the formula M1 to M41, M1
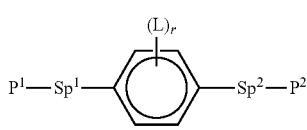

M2
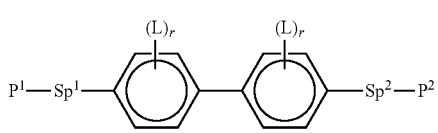

M3
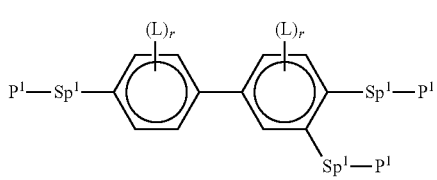

M4
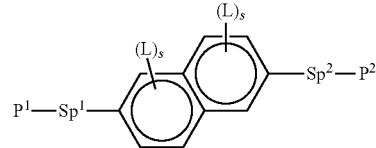

M5
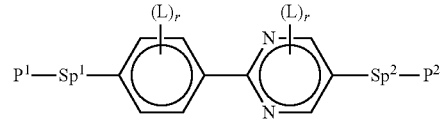

M6
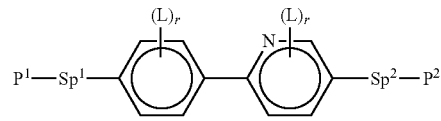

M7
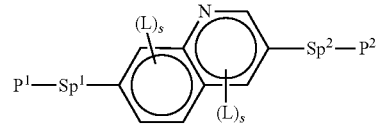

M8
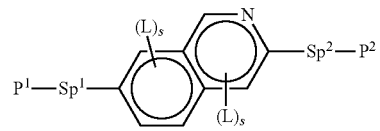

M9
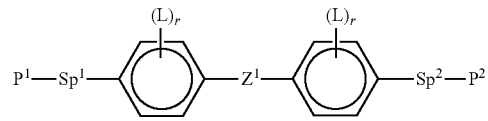

M10
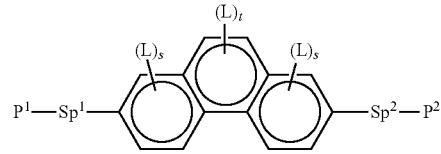

M11
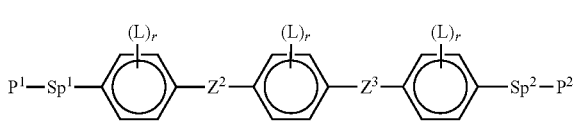

M12
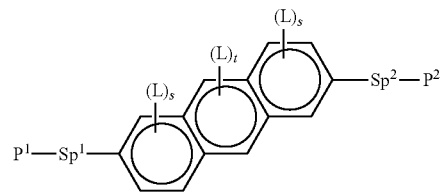

M13
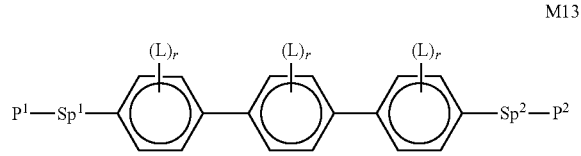

-continued

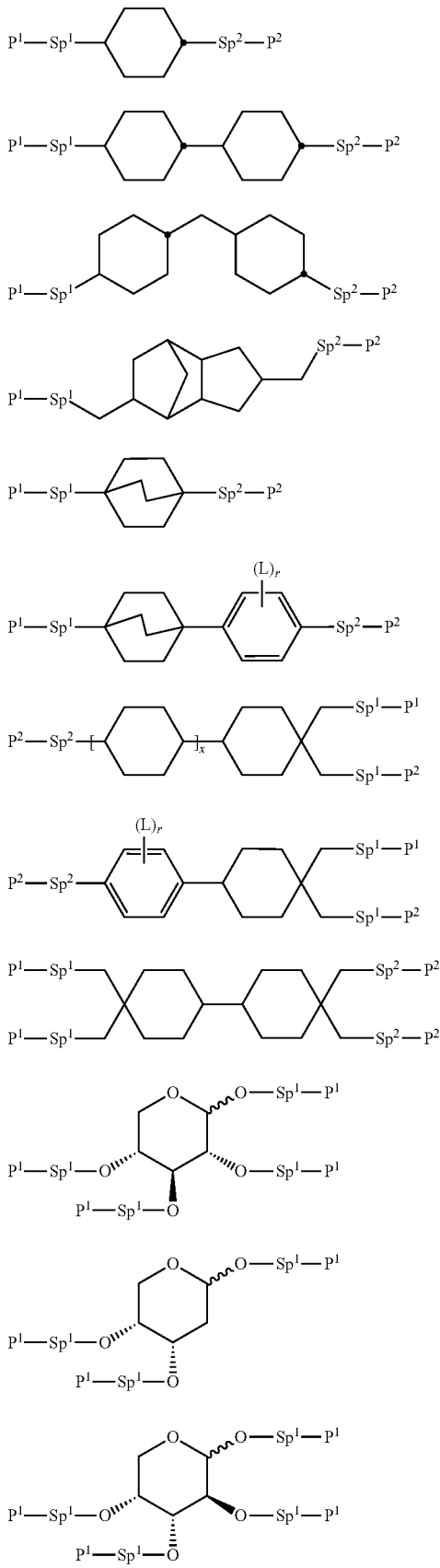

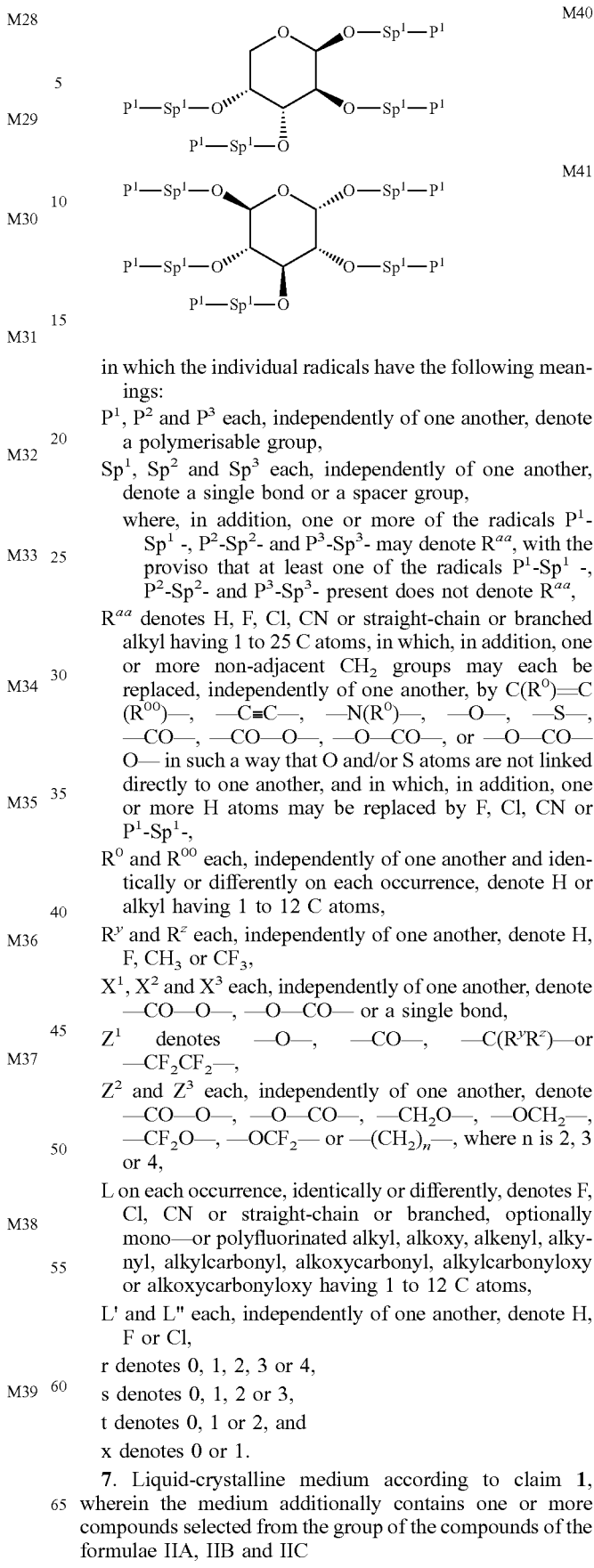

in which the individual radicals have the following meanings:

$P^1$, $P^2$ and $P^3$ each, independently of one another, denote a polymerisable group, $Sp^1$, $Sp^2$ and $Sp^3$ each, independently of one another, denote a single bond or a spacer group, where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may be replaced by F, Cl, CN or $P^1$-$Sp^1$-, $R^0$ and $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN or straight-chain or branched, optionally mono—or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

7. Liquid-crystalline medium according to claim 1, wherein the medium additionally contains one or more compounds selected from the group of the compounds of the formulae IIA, IIB and IIC

IIA

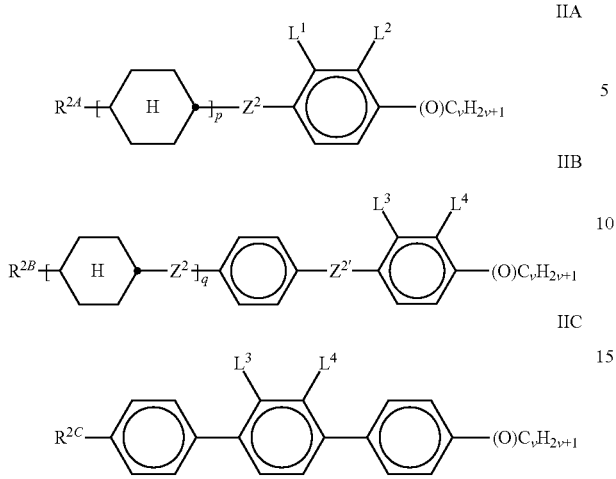

IIB

IIC in which
R²ᴬ, R²ᴮ and R²ᶜ each, independently of one another, denote H, an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

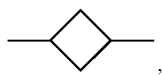

—C≡C—, —CF₂O—, —OCF₂—, , —OC—O— or —O—CO— in such a way that O atoms are not linked directly to one another, L$^{1-4}$ each, independently of one another, denote F, Cl, CF₃ or OCHF₂

Z² and Z²' each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF—, or —CH=CHCH₂O—, (O)C$_v$H$_{2v+1}$ denotes OC$_v$H$_{2v+1}$ or C$_v$H$_{2v+1}$, p denotes 0, 1 or 2, q denotes 0 or 1, and v denotes 1 to 6.

8. Liquid-crystalline medium according to claim 1, wherein the medium additionally contains one or more compounds of the formula III,

III

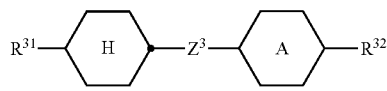

in which
R³¹ and R³² each, independently of one another, denote a straight-chain alkyl, alkoxyalkyl or alkoxy radical having up to 12 C atoms, and

-continued

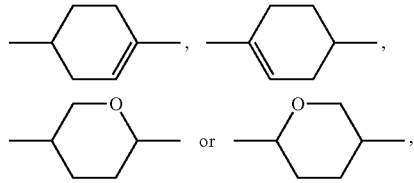

and

Z³ denotes a single bond, —CH₂CH₂—, —CH=CH—, —CF₂O—, —OCF₂—, —CH₂O—, —OCH₂—, —COO—, —OCO—, —C₂F₄—, —C₄H₈—, or —CF=CF—.

9. Liquid-crystalline medium according to claim 1, wherein the medium additionally contains at least one compound of the formulae L-1 to L-11,

L-1

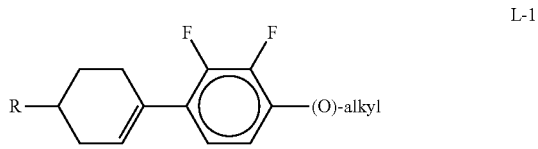

L-2

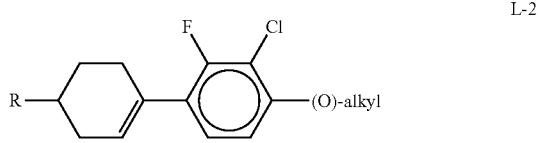

L-3

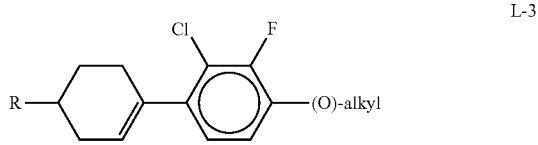

L-4

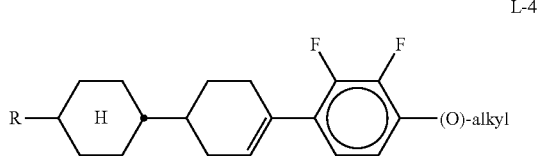

L-5

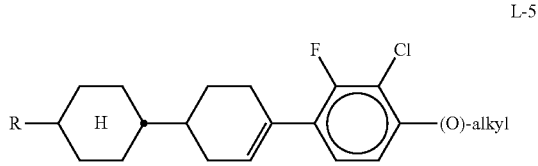

L-6

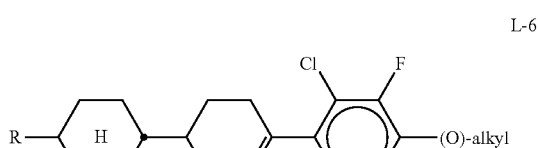

L-7

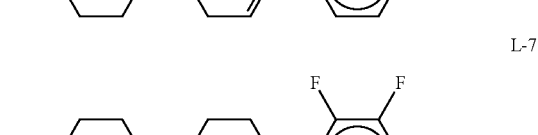

-continued

L-8
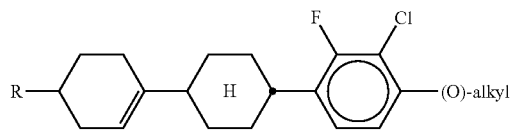

L-9
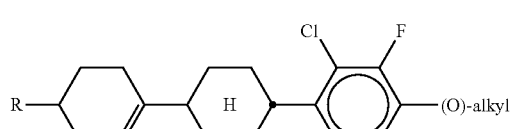

L-10
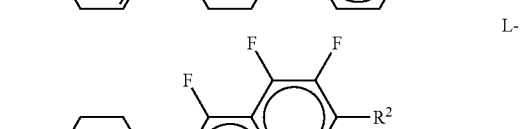

L-11
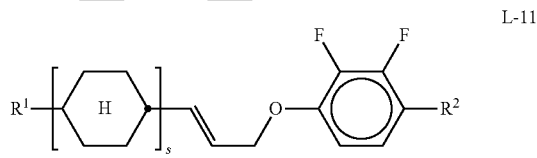

in which

R, R¹ and R² each, independently of one another, denote H, an alkyl having 1-6C atoms or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

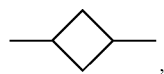

—C≡C—, —CF₂O—, —OCF₂—, —CH=CH—, —OC—O— or —O—CO— in such a way that O atoms are not linked directly to one another, (O)-alkyl denotes O-alkyl or alkyl, and s denotes 1 or 2.

10. Liquid-crystalline medium according to claim 1, wherein the medium additionally comprises one or more terphenyls of the formulae T-1 to T-23, T-1
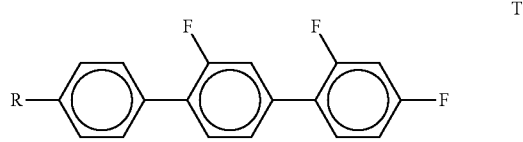

T-2
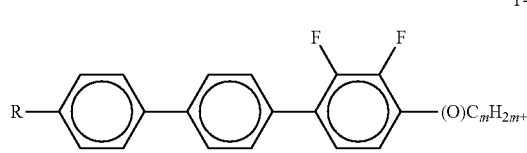

-continued

T-3
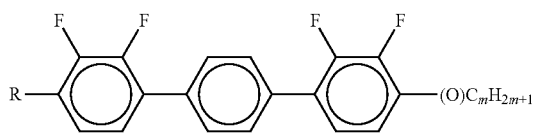

T-4
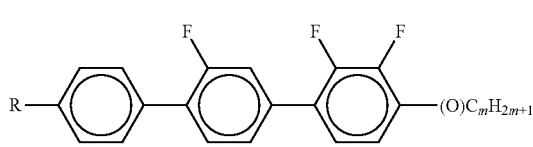

T-5
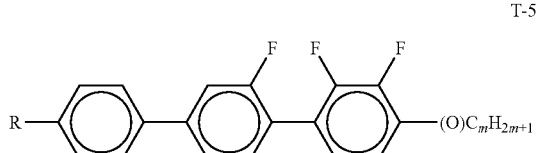

T-6
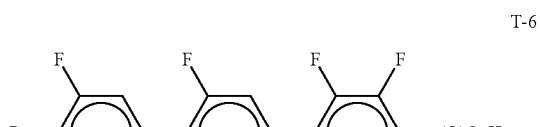

T-7
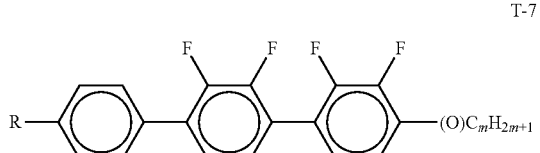

T-8
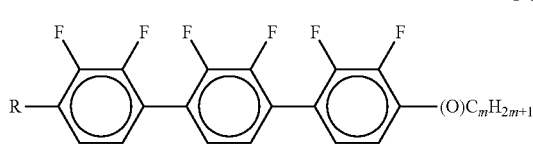

T-9
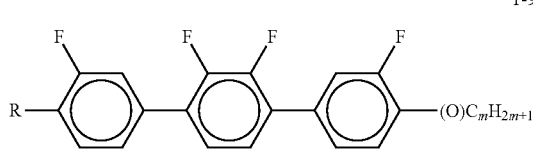

T-10
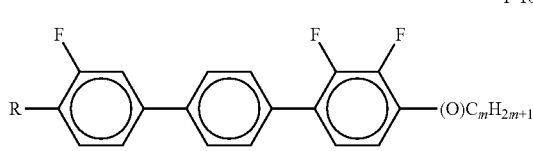

T-11
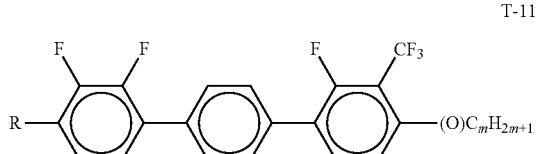

T-12
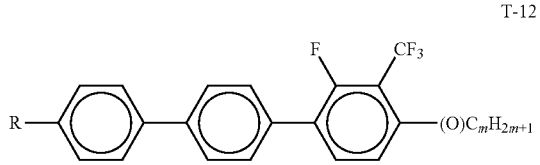

T-13
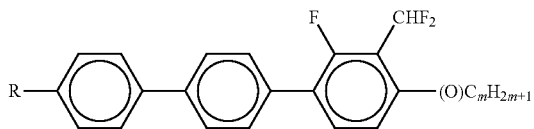
T-14
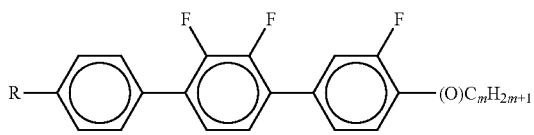
T-15
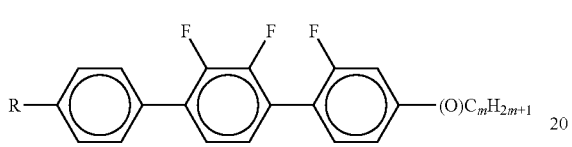
T-16
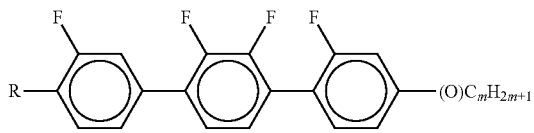
T-17
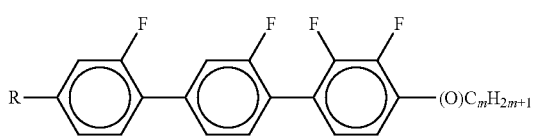
T-18
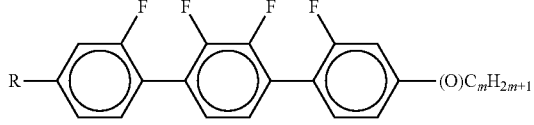
T-19
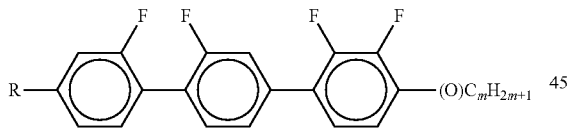
T-20
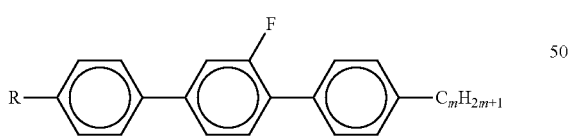
T-21
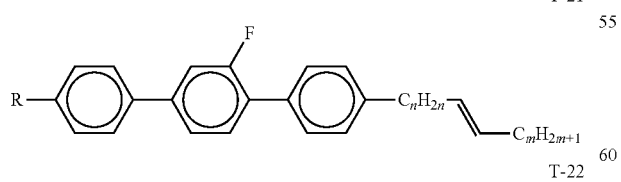
T-22
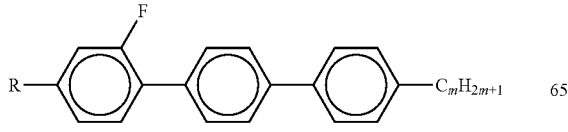
T-23
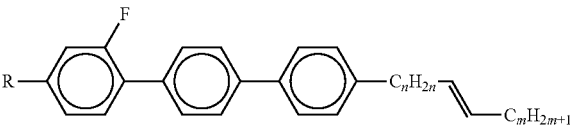
in which
R denotes a straight-chain alkyl or alkoxy radical having 1-7 C atoms,
$(O)C_mH_{2m+1}$ denotes $OC_mH_{2m+1}$ or $C_mH_{2m+1}$,
m denotes 0, 1, 2, 3, 4, 5 or 6, and
n denotes 0, 1, 2, 3 or 4.
11. Liquid-crystalline medium according to claim 1, wherein the medium additionally comprises one or more compounds of the formulae O-1 to O-17,
O-1
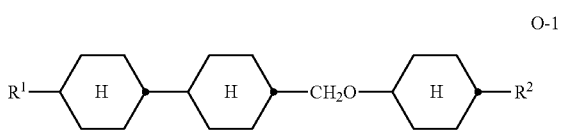
O-2
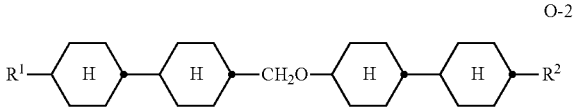
O-3
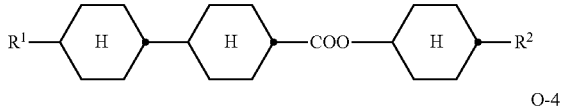
O-4
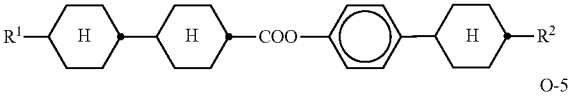
O-5
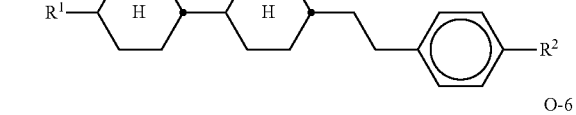
O-6
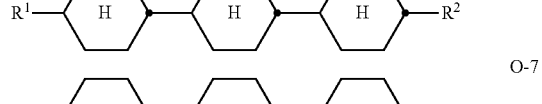
O-7
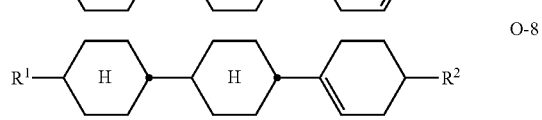
O-8
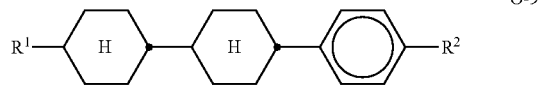
O-9
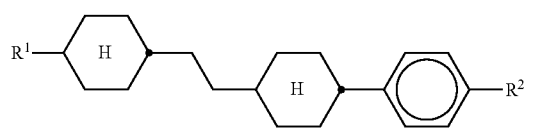
O-10

205

-continued

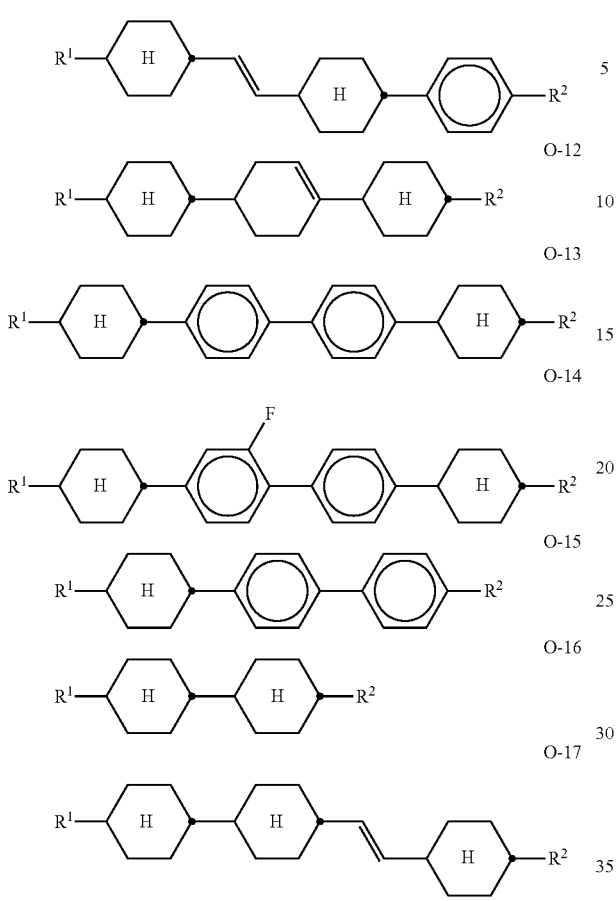

O-11
O-12
O-13
O-14
O-15
O-16
O-17 in which R¹ and R² each, independently of one another, denote H, an alkyl or alkenyl radical having up to 15 C atoms which is unsubstituted, monosubstituted by CN or CF₃ or at least monosubstituted by halogen, where, in addition, one or more CH₂ groups in these radicals may be replaced by —O—, —S—,

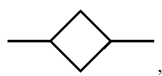

—C≡C—, —CF₂O—, —OCF₂—, —CH═CH—, —OC—O— or —O—CO— in such a way that O atoms are not linked directly to one another.

12. Liquid-crystalline medium according to claim 1, wherein the medium additionally contains one or more indane compounds of the formula In,

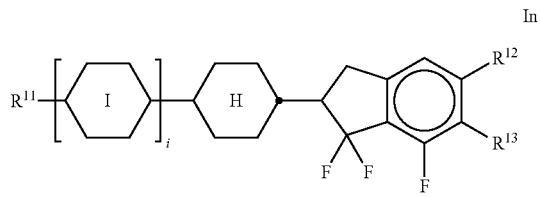

In

206 in which
R¹¹, R¹², R¹³ denote a straight-chain alkyl, alkoxy, alkoxyalkyl or alkenyl radical having 1-5 C atoms,
R¹² and R¹³ additionally also denote H or halogen,

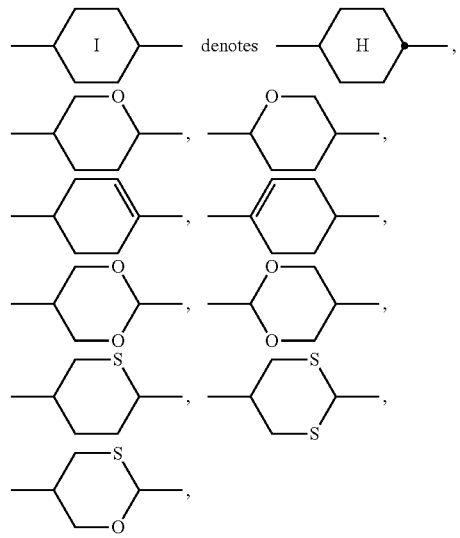

and
i denotes 0, 1 or 2.

13. Liquid-crystalline medium according to claim 1, wherein the medium additionally contains one or more UV absorbers, antioxidants, nanoparticles or free-radical scavengers.

14. Process for the preparation of a liquid-crystalline medium according to claim 1, which comprises mixing at least one self-aligning compound of the formula I with at least two liquid-crystalline compounds, and optionally with at least one polymerisable compound and optionally one or more additives.

15. A method for preparing an electro-optical display which comprises incorporating a liquid crystal medium according to claim 1 in an electro-optical display.

16. A method according to claim 15 wherein said liquid crystal medium is incorporated in an electro-optical display to provide a self-aligning VA mode.

17. Electro-optical display having active-matrix or passive-matrix addressing, which comprises, as dielectric, a liquid-crystalline medium according to claim 1.

18. Electro-optical display according to claim 17, characterised in that it is a VA, PM-VA, PSA or PS-VA display.

19. A compound of the formula I

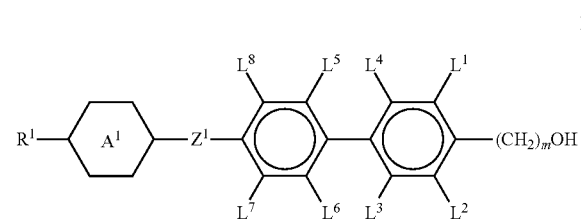

I in which
R¹ denotes a straight-chain alkyl or alkoxy radical having 1 to 15 C atoms, where, in addition, one or more CH₂ groups in these radicals may each be replaced, independently of one another, by —C≡C—, —CF₂O—, —CH═CH—,

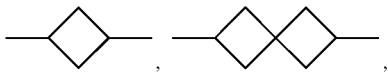

—O—, —CO—O—, or —O—CO— in such a way that O atoms are not linked directly to one another, and in which, in addition, one or more H atoms may be replaced by halogen,

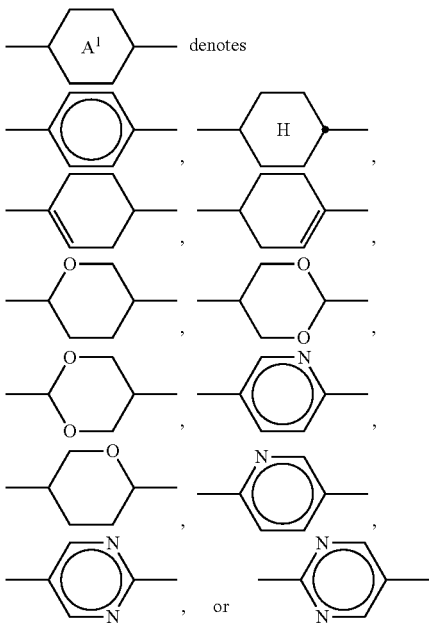

Z¹ denotes a single bond, —CH₂CH₂—, —CH═CH—, —CF₂O—, —OCF₂—, —CH₂O—, —OCH₂—, —COO—, —OCO—, —C₂F₄—, —CF═CF—, —C₂F₄—, —CHFCHF—, —CH₂CHF—, —CFHCF₂—, —CF₂CHF—, —CHFCH₂—, —CH₂CF₂O—, or —CH═CHCH₂O—, L¹ to L⁸ each, independently of one another, denote H or alkyl with 1-8 carbon atoms, provided that at least one of L¹ to L⁸ denotes alkyl with 1-8 carbon atoms, and m denotes 0, 1, 2, 3, 4, 5 or 6.

20. Liquid-crystalline medium according to claim 5, wherein:
at least one of the radicals R$^{Ma}$ and R$^{Mb}$ denotes or contains a group P or P-Sp-,
A$^{M1}$ and A$^{M2}$ each, independently of one another, denote an aromatic, or alicyclic group, having 4 to 25 ring C atoms, which may also encompass or contain fused rings, and which may optionally be mono- or polysubstituted by L, and
L denotes P, P-Sp-, H, halogen, SF₅, NO₂, an alkyl, alkenyl or alkynyl group.

21. Liquid-crystalline medium according to claim 6, wherein:
P¹, P² and P³ each, independently of one another, denote an acrylate, methacrylate, fluoroacrylate, oxetane, vinyl, vinyloxy or epoxide group, Sp¹, Sp² and Sp³ each, independently of one another, denote a single bond, —(CH₂)$_{p1}$—, —(CH₂)$_{p1}$—O—, —(CH₂)$_{p1}$—CO—O— or —(CH₂)$_{p1}$—O—CO—O—, in which p1 is an integer from 1 to 12, and where the linking to the adjacent ring in the last-mentioned groups takes place via the O atom,
where, in addition, one or more of the radicals P¹-Sp¹-, P²-Sp²- and P³-Sp³- may denote R$^{aa}$, with the proviso that at least one of the radicals P¹-Sp¹-, P²-Sp²- and P³-Sp³- present does not denote R$^{aa}$, and
R$^{aa}$ denotes a straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy group having 1 to 12 C atoms, where the alkenyl and alkynyl radicals have at least two C atoms and the branched radicals have at least three C atoms.

22. A compound according to claim 19, wherein at least one of L¹ to L⁸ denotes straight-chain alkyl with 2-8 carbon atoms.

23. A liquid crystalline medium according to claim 1, wherein the mixture comprises at least one compound of formula I wherein at least one of L¹ to L⁸ denotes straight-chain alkyl with 2-8 carbon atoms.

24. A liquid crystalline medium according to claim 1, wherein the at least one compound of formula I is one of the following compounds

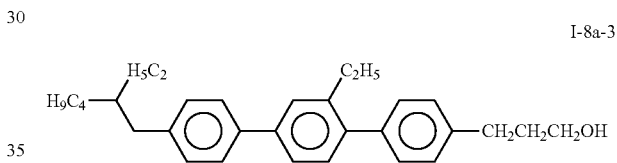

I-8a-3

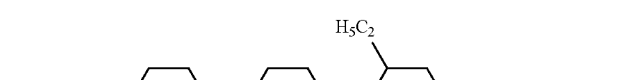

I-1a-23

I-4a-22

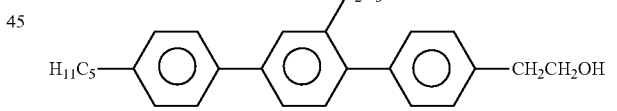

I-3a-22

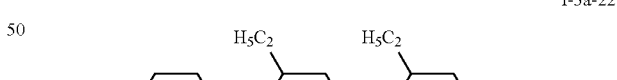

I-3a-23

I-5a-22

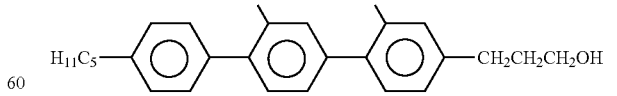

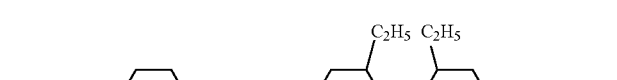

-continued
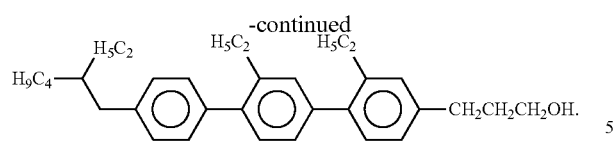
25. A liquid crystalline medium according to claim 1, wherein the at least one compound of formula I is the following compound:
I-5a-22
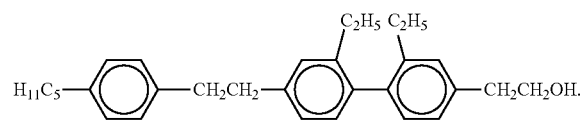
* * * * *